US011358509B2

(12) United States Patent
Warhurst et al.

(10) Patent No.: US 11,358,509 B2
(45) Date of Patent: Jun. 14, 2022

(54) AUTOMATED CARGO VEHICLE RAMP DEPLOYMENT SYSTEM AND ASSOCIATED METHODS

(71) Applicant: EMHIP, LLC, Clearwater, FL (US)

(72) Inventors: Peter Warhurst, Windermere, FL (US); Roy Hensler, Clearwater, FL (US); Robert Perry Allison, Tierra Verde, FL (US)

(73) Assignee: EMHIP, LLC, Clearwater, FL (US)

( * ) Notice: Subject to any disclaimer, the term of this patent is extended or adjusted under 35 U.S.C. 154(b) by 0 days.

(21) Appl. No.: 17/410,082

(22) Filed: Aug. 24, 2021

(65) Prior Publication Data
US 2021/0380029 A1    Dec. 9, 2021

Related U.S. Application Data

(63) Continuation of application No. 17/150,940, filed on Jan. 15, 2021.

(60) Provisional application No. 62/980,236, filed on Feb. 22, 2020.

(51) Int. Cl.
*B60P 1/43*    (2006.01)

(52) U.S. Cl.
CPC ................ *B60P 1/435* (2013.01); *B60P 1/43* (2013.01)

(58) Field of Classification Search
CPC .. B60P 1/43; B60P 1/431; B60P 1/435; B65F 2003/0269; B61B 13/04; B61C 13/04
USPC .................................... 105/30; 414/522, 537
See application file for complete search history.

(56) References Cited

U.S. PATENT DOCUMENTS

| | | | | |
|---|---|---|---|---|
| 3,599,810 A | * | 8/1971 | Wanko | B60P 1/445 414/558 |
| 3,851,854 A | * | 12/1974 | Roybal | B66B 9/025 254/7 C |
| 4,114,944 A | * | 9/1978 | Joynt | B60P 1/431 296/50 |
| 5,026,243 A | * | 6/1991 | Dell | B65G 69/30 14/71.1 |
| 5,466,083 A | * | 11/1995 | Hogg | A01B 59/004 403/45 |

(Continued)

FOREIGN PATENT DOCUMENTS

| | | | | |
|---|---|---|---|---|
| DE | 4108739 A1 | * | 9/1992 | B60P 1/43 |
| EP | 0205353 A2 | * | 12/1986 | B65F 3/08 |

(Continued)

*Primary Examiner* — James Keenan
(74) *Attorney, Agent, or Firm* — Shumaker, Loop & Kendrick, LLP; James D. Miller

(57) ABSTRACT

An automated cargo vehicle ramp deployment system includes a controller and a power source connected thereto, a ramp located at the existing cargo vehicle, a first automated ramp displacement mechanism for configured to selectively displace the ramp from a first position to a second position defined along a perimeter of the existing cargo vehicle while the ramp is maintained at a vertically oriented position, a second automated ramp displacement mechanism for configured to selectively displace the ramp from one of the first position and the second position to a third position, and a third automated ramp displacement mechanism for selectively adjusting a longitudinal length of the ramp while the ramp is statically disposed at a third position.

7 Claims, 102 Drawing Sheets

(56) References Cited

U.S. PATENT DOCUMENTS

| | | | | |
|---|---|---|---|---|
| 6,825,628 | B2 * | 11/2004 | Heigl | A61G 3/061 |
| | | | | 318/266 |
| 6,991,277 | B1 * | 1/2006 | Esler | B60P 1/435 |
| | | | | 296/26.08 |
| 7,284,781 | B2 * | 10/2007 | Grant | B60P 1/435 |
| | | | | 296/57.1 |
| 7,500,817 | B2 * | 3/2009 | Furrer | A01C 15/003 |
| | | | | 198/311 |
| 7,832,975 | B1 * | 11/2010 | Mitchell | B60P 1/43 |
| | | | | 414/537 |
| 8,794,859 | B1 * | 8/2014 | Patterson | B29C 49/78 |
| | | | | 403/102 |
| 8,926,254 | B2 * | 1/2015 | Pocobello | A61G 3/061 |
| | | | | 414/537 |
| 9,061,435 | B1 * | 6/2015 | Proudfoot | B26D 5/007 |
| 10,814,773 | B1 * | 10/2020 | Rainone | B60P 7/083 |
| 2006/0075586 | A1 * | 4/2006 | Senior | A47F 7/00 |
| | | | | 14/69.5 |
| 2006/0251502 | A1 * | 11/2006 | Scharfenberger | B60P 1/4471 |
| | | | | 414/537 |
| 2007/0207020 | A1 * | 9/2007 | Samuels | A61G 3/067 |
| | | | | 414/537 |
| 2013/0223963 | A1 * | 8/2013 | Kramlick | B60P 3/07 |
| | | | | 414/537 |
| 2020/0290494 | A1 * | 9/2020 | Key | B60P 1/36 |

FOREIGN PATENT DOCUMENTS

| | | | | |
|---|---|---|---|---|
| FR | 2511660 | A1 * | 2/1983 | B65F 3/08 |
| FR | 2890345 | A1 * | 3/2007 | B60P 1/431 |
| JP | 06171503 | A * | 6/1994 | B60P 1/431 |

* cited by examiner

Ramp Electrical Layout
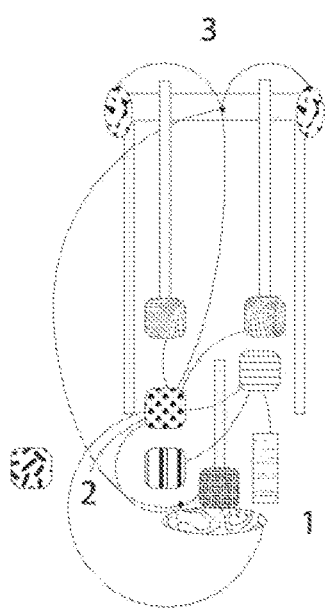
1. Docking limit switch, stop movement to right
2. Limit switch, stop movement to left
3. Limit switch, Stop downward movement and Activates lights
- Controller
- Circuit breakers, Fuse panel
- Wireless Receiver
- Wireless Transmitter-UI
- Intelligent Lithium Battery system
- Car/Trolley
- LED Ramp lights
RAMS are 12V Linear actuators 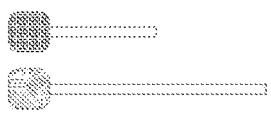
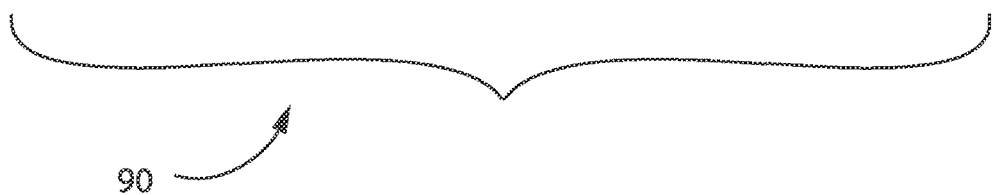
90
FIG. 62

← Hunter - Prepare For Rent
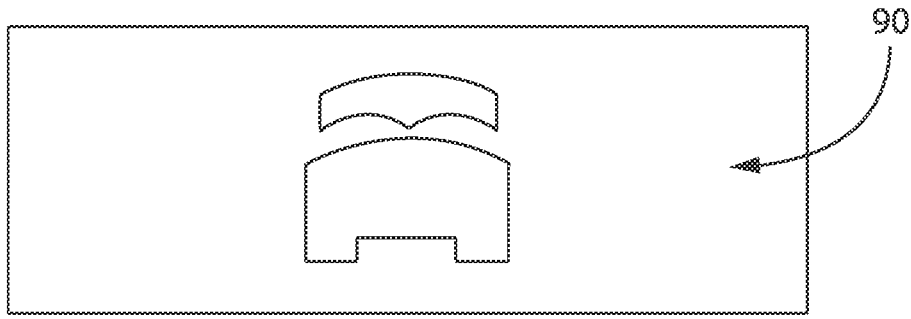
90
Hunter
1-16 · Ready by 8:15 AM
All Ready!
Container
 8' - Load First, Doors Facing Sideways
 8' - Load Second, Doors Rear Facing
Truck Cabin
 Place Keys in cupholder
 Leave 4 locks
 Wipe floor to remove footprints
 Record Milage
FIG. 72

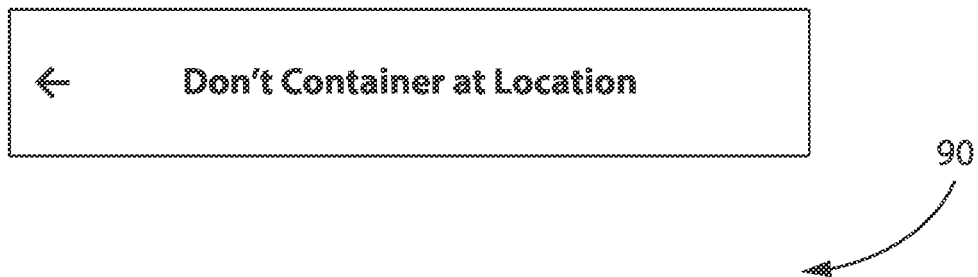
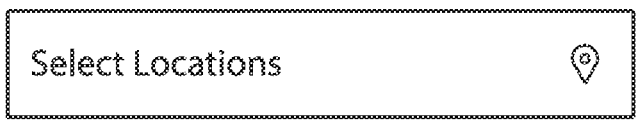
FIG. 75

← Load Container onto Moving Truck

NFK-N53 is loaded with 90

16-38

DONE

← Load Container onto Moving Truck

Red Rover Largo now has 90

16-38

DONE

FIG. 81

← Load Container onto Moving Truck

What Container are you loading onto truck 1-16?  90

Select a Container 16-3

16-36

16-37

16-38

| 1 | 2 ABC | 3 DEF |
| 4 GHI | 5 JKL | 6 MNO |
| 7 PQRS | 8 UVW | 9 XYZ |
|  | 0 | ⌫ |

FIG. 83

← Load Container onto Moving Truck

Which Fleet Truck?    90

NFK

NFK-N53 (Florida)

FIG. 90

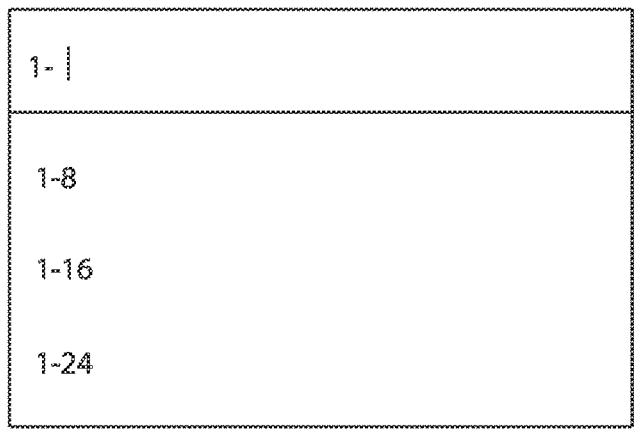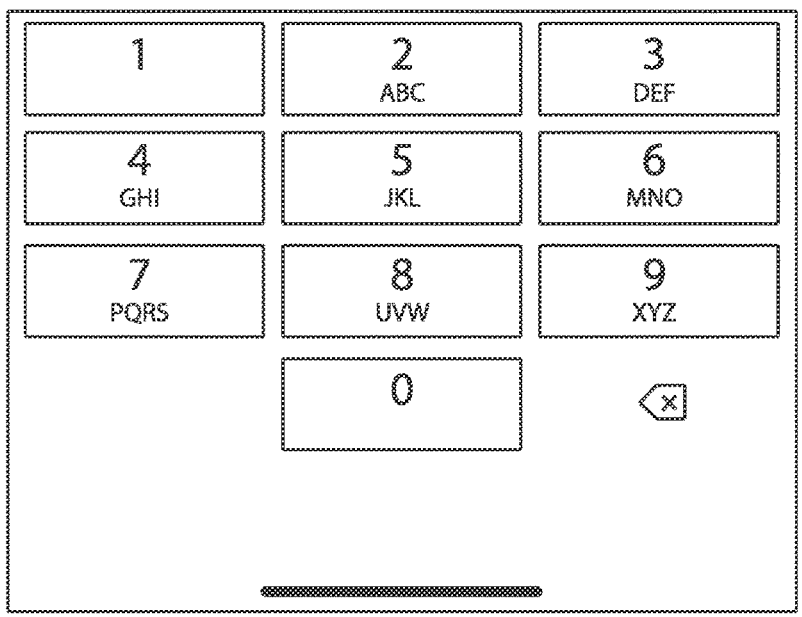
FIG. 92

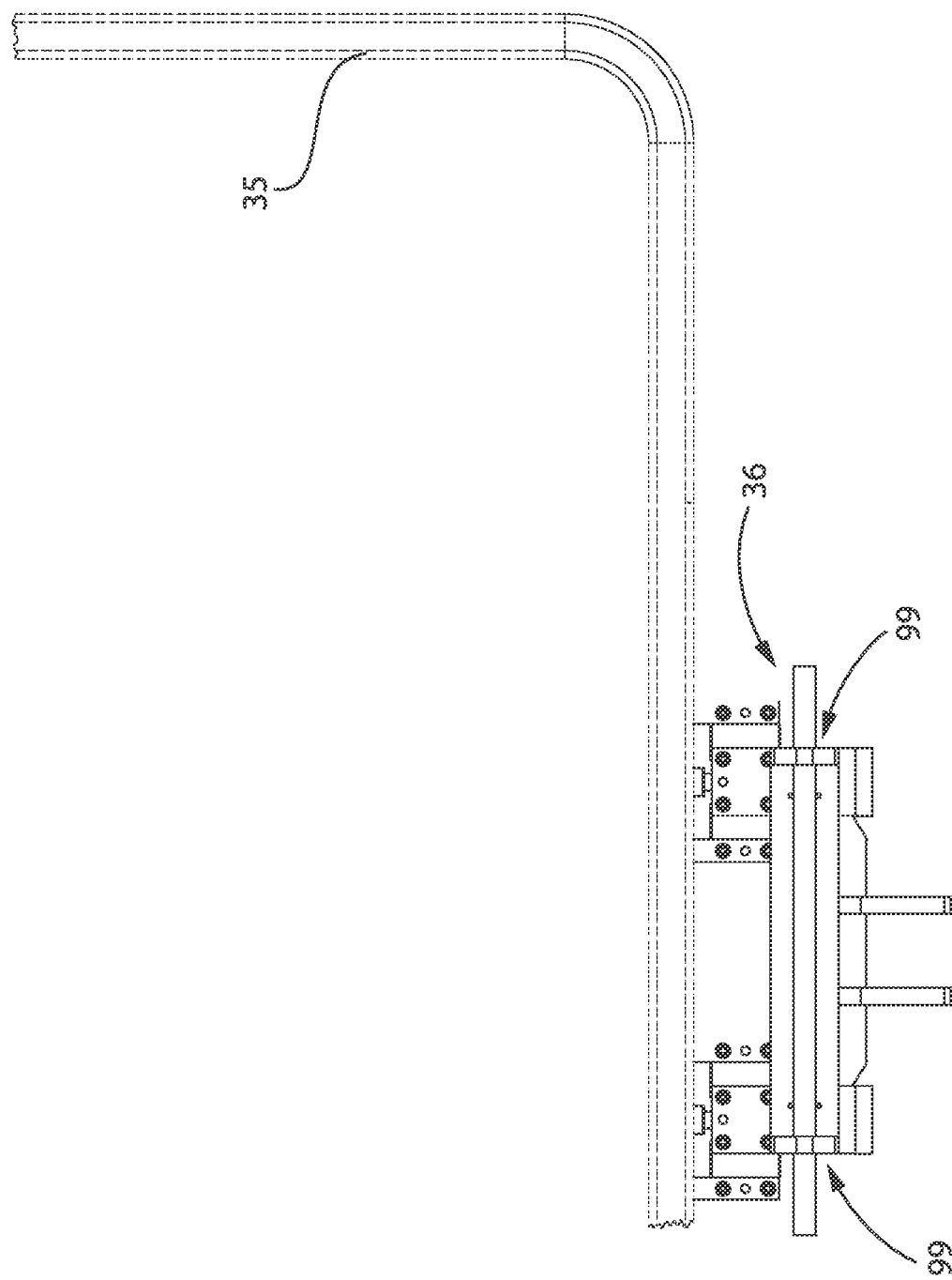

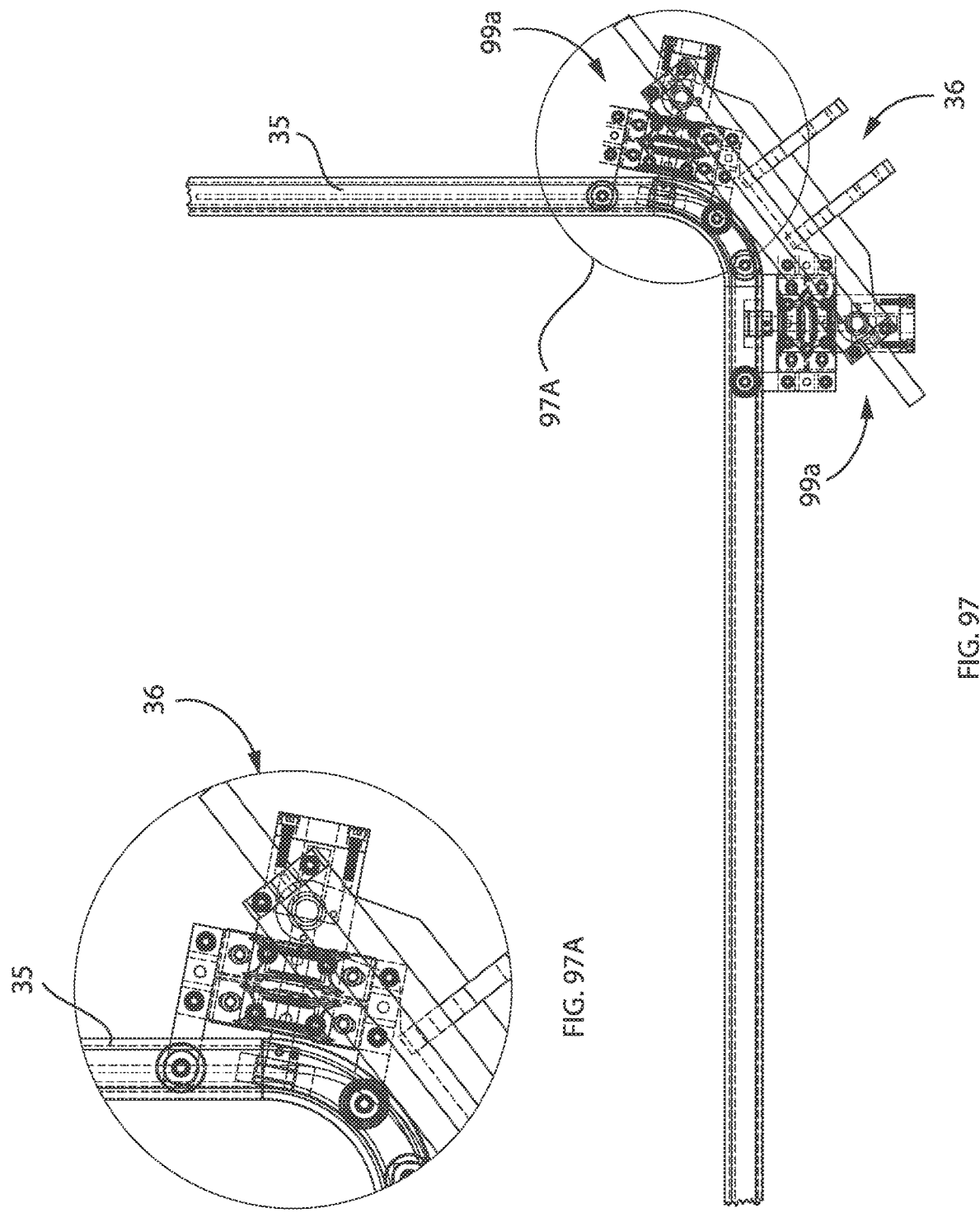

AUTOMATED CARGO VEHICLE RAMP DEPLOYMENT SYSTEM AND ASSOCIATED METHODS

CROSS REFERENCE TO RELATED APPLICATIONS

This is a continuation patent application claim the benefit of and priority to non-provisional patent application Ser. No. 17/150,940, filed Jan. 15, 2021, which claims the benefit of and priority to U.S. provisional patent application No. 62/980,236 filed on Feb. 22, 2020, both of which are incorporated by reference herein in their entireties.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to ramp deployment systems and, more particularly, to an automated cargo vehicle ramp deployment system for configured to selectively displace a ramp along a perimeter of a cargo vehicle during loading and unloading operating conditions.

Prior Art

It used to be, if you were moving yourself or needed storage, you had about two options. Option one, rent a vehicle, pick it up, load it up, drive it to the storage unit you rented, unload it, drive back to the vehicle rental place, drive home. And when it was time to pick your stuff up again, well, you know the drill, just in reverse. Option two was, pay through the nose for the luxury of someone to bring a storage unit to you and hope it's delivered when you need it, have it sit there for a while—good luck with that if you live in an apartment—then hope it's picked up when you need it gone.

Furthermore, different cargo vehicles have loading/unloading doors positioned on different sides of the perimeter of the cargo vehicle. This makes it difficult to use a conventional ramp stored at a rear side of the cargo vehicle. For example, a traditional ramp can weigh between 150-200 lbs. With seven different configurations, the doors can be positioned anywhere on all three sides of the cargo vehicle; on either longitudinal side and the end. Many configurations have multiple doors which will require repositioning the ramp several times. Then depending on the circumstances, the ramp may need to be as short as seven feet and as long as fourteen feet.

Accordingly, a need remains for an automated cargo vehicle ramp deployment system in order to overcome at least one of the above-noted shortcomings. The exemplary embodiment(s) satisfy such a need by an automated cargo vehicle ramp deployment system that is convenient and easy to use, durable in design, versatile in its applications, and designed for configured to selectively displace a ramp along a perimeter of a cargo vehicle during loading and unloading operating conditions.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide an automated cargo vehicle ramp deployment system for configured to selectively displace a ramp along a perimeter of a cargo vehicle during loading and unloading operating conditions. These and other objects, features, and advantages of the non-limiting exemplary embodiment(s) are provided by a cargo transport vehicle including at least one cargo transport container, a ramp, a ramp deployment system operably coupled to the ramp and configured to selectively displace the ramp along a perimeter of the at least one cargo transport container, a controller, and a power source in communication with the ramp deployment system. Advantageously, the ramp deployment system is configured to selectively displace the ramp along at least one of a first travel path defined along a perimeter of the at least one cargo transport container, a second travel path defined about a fulcrum pivot axis adjacent to the at least one cargo transport container, and a third travel path defined along a longitudinal length of the ramp and exterior of the at least one cargo transport container.

In a non-limiting exemplary embodiment, the ramp deployment system includes a first ramp displacement mechanism configured to selectively displace the ramp from a first position to a second position defined along the first travel path.

In a non-limiting exemplary embodiment, the ramp deployment system further includes a second ramp displacement mechanism configured to selectively displace the ramp from one of the first position and the second position to a third position defined along the second travel path.

In a non-limiting exemplary embodiment, the ramp deployment system further includes a third ramp displacement mechanism configured to selectively adjust a longitudinal length of the ramp along the third travel path while the ramp is disposed at the third position. Notably, each of the first ramp displacement mechanism, the second ramp displacement mechanism, and the third ramp displacement mechanism is operatively coupled to the controller and the power source, such that a user is able to selectively control the movement of the ramp as desired at the cargo transport container.

In a non-limiting exemplary embodiment, the first ramp displacement mechanism includes a guide rail attached to at least a portion of a perimeter of the existing cargo vehicle, a trolley operably attached to the ramp and having a plurality of rollers rotatably engaged with the guide rail, and at least one drive motor operably coupled to the trolley and positioned along the guide rail. Advantageously, the at least one drive motor is configured to displace the trolley in a forward and opposed rearward direction along the guide rail.

In a non-limiting exemplary embodiment, the guide rail includes an upper rail and a lower rail each operably coupled to the trolley.

In a non-limiting exemplary embodiment, the trolley includes a first roller assembly having a plurality of first bearings and a plurality of first rollers, a second roller assembly having a plurality of second bearings and a plurality of second rollers, and a plurality of motor-mounting plates. Advantageously, the first roller assembly and the second roller assembly are independently pivoted along a first rotation axis and a second rotation axis, respectively, while traveling around a corner of the guide rail along the first travel path.

In a non-limiting exemplary embodiment, the trolley includes a center link bracket intermediately disposed between the first roller assembly and the second roller assembly.

In a non-limiting exemplary embodiment, the second ramp displacement mechanism includes a ramp pivot shaft pivotally coupled to the trolley, a plurality of ramp pivot blocks engaged with the ramp pivot shaft, a turn buckle operably coupled to the center link bracket, and at least one actuator operably coupled to the turn buckle. Advantageously, the ramp is connected to the turn buckle and the ramp pivot shaft and rotates in clockwise and counterclockwise directions about the fulcrum pivot axis along the second travel path.

In a non-limiting exemplary embodiment, the third ramp displacement mechanism includes a plurality of telescopically adjustable support legs attached to the ramp, and a power-drive piston operably coupled to the telescopically adjustable support legs. Advantageously, the telescopically adjustable support legs are configured to selectively extend and retract a longitudinal length of the ramp along the third travel path upon receiving a user input at the controller.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

FIG. 62 is an electrical schematic diagram showing the interrelationship between some of the electrical components of the present disclosure, in accordance with a non-limiting exemplary embodiment of the present disclosure;

FIGS. 65-93 illustrate chronological graphical user interface screenshots of a software app 90, which enables a user to reserve, pickup, and drop-off a cargo transport vehicle, in accordance with a non-limiting exemplary embodiment of the present disclosure;

FIG. 96 is a top plan view showing the trolley traveling along a linear portion of the guide rail, in accordance with a non-limiting exemplary embodiment of the present disclosure;

FIG. 97 is a top plan view showing the trolley traveling along a curvilinear portion (corner) of the guide rail wherein the first roller assembly independently rotates relative to the second roller assembly, in accordance with a non-limiting exemplary embodiment of the present disclosure;

FIG. 97A is an enlarged top plan view of section 97A taken in FIG. 97, in accordance with a non-limiting exemplary embodiment of the present disclosure;

Figure 100:
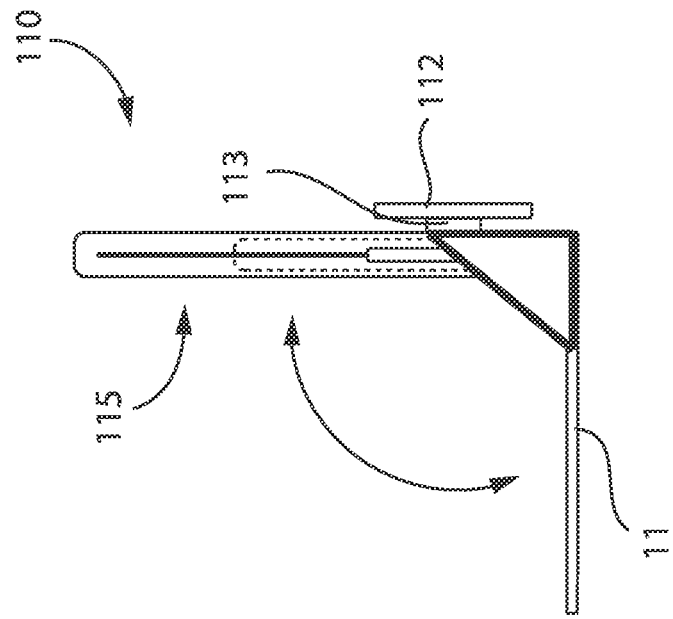
Figure 99:
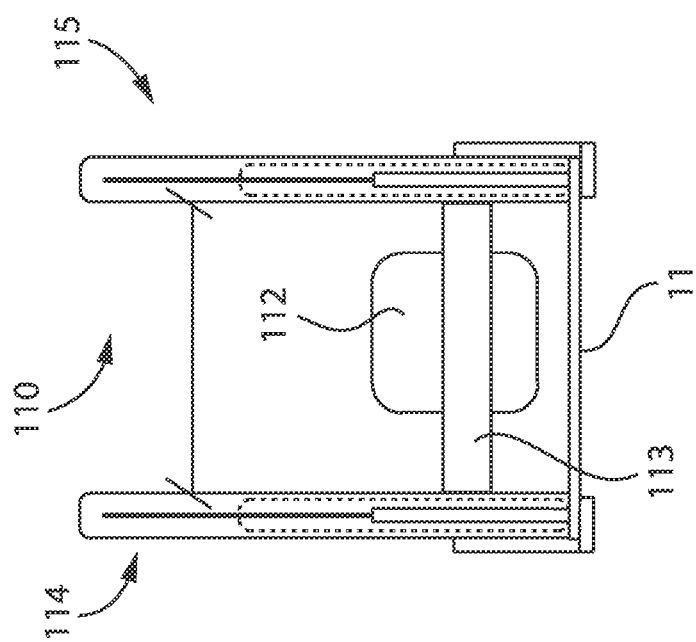
FIG. 99 is a front elevational view showing a power-actuated vertical ramp lifting mechanism attached to the vehicle, in accordance with a non-limiting exemplary embodiment of the present disclosure.
Figure 101:
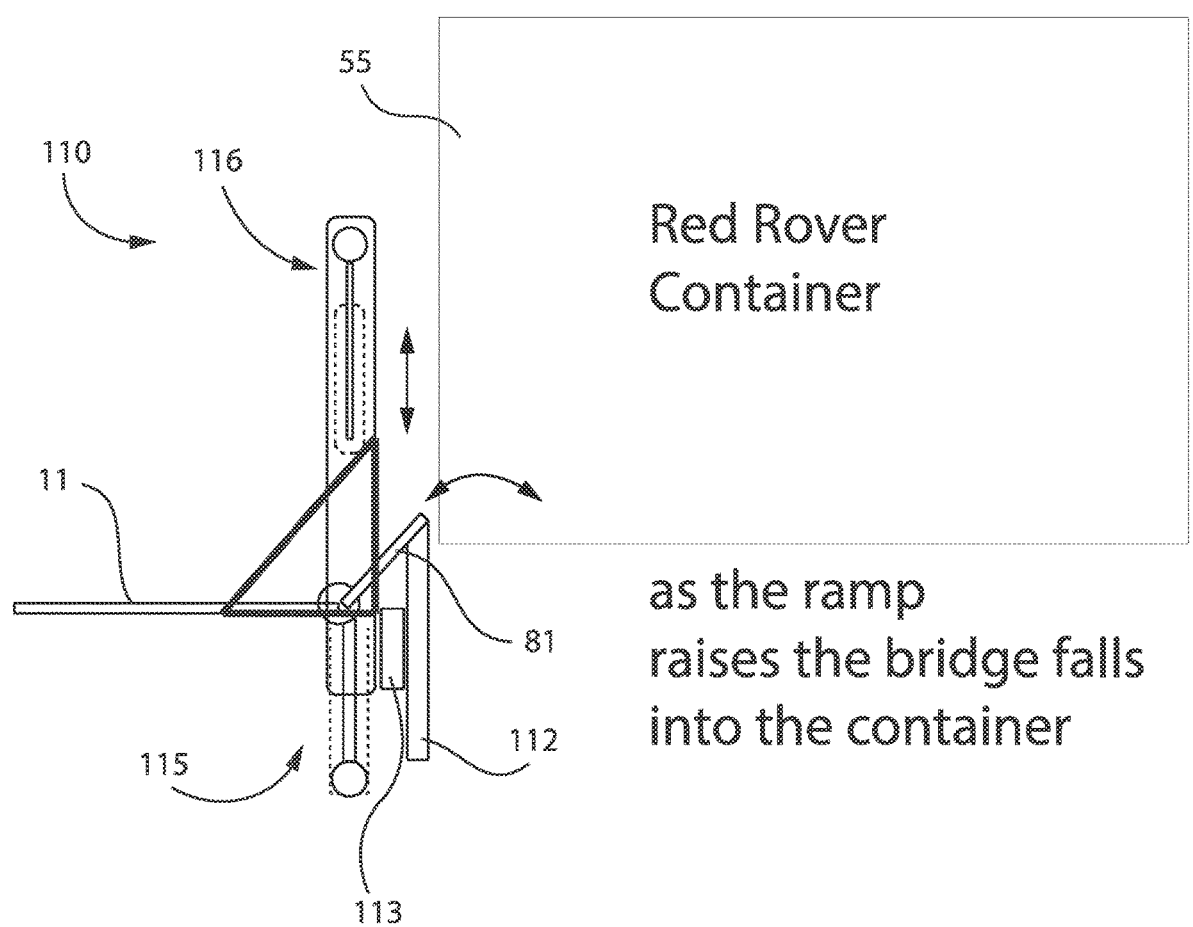

FIG. 100 is a side elevational view of the power-actuated vertical ramp lifting mechanism shown in FIG. 99, in accordance with a non-limiting exemplary embodiment of the present disclosure; and FIG. 101 is another side elevational view of the power-actuated vertical ramp lifting mechanism shown in FIG. 99 wherein vertical motion is achieved, in accordance with a non-limiting exemplary embodiment of the present disclosure.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means±15% of the numerical.

If used herein, "substantially" means largely if not wholly that which is specified but so close that the difference is insignificant.

The terms "car" and "trolley" are interchangeable used throughout this disclosure.

The terms "vehicle" and "truck" are interchangeable used throughout this disclosure.

The terms "ramp deployment mechanism" and "ramp displacement mechanism" are interchangeable used throughout this disclosure.

Figure 1:
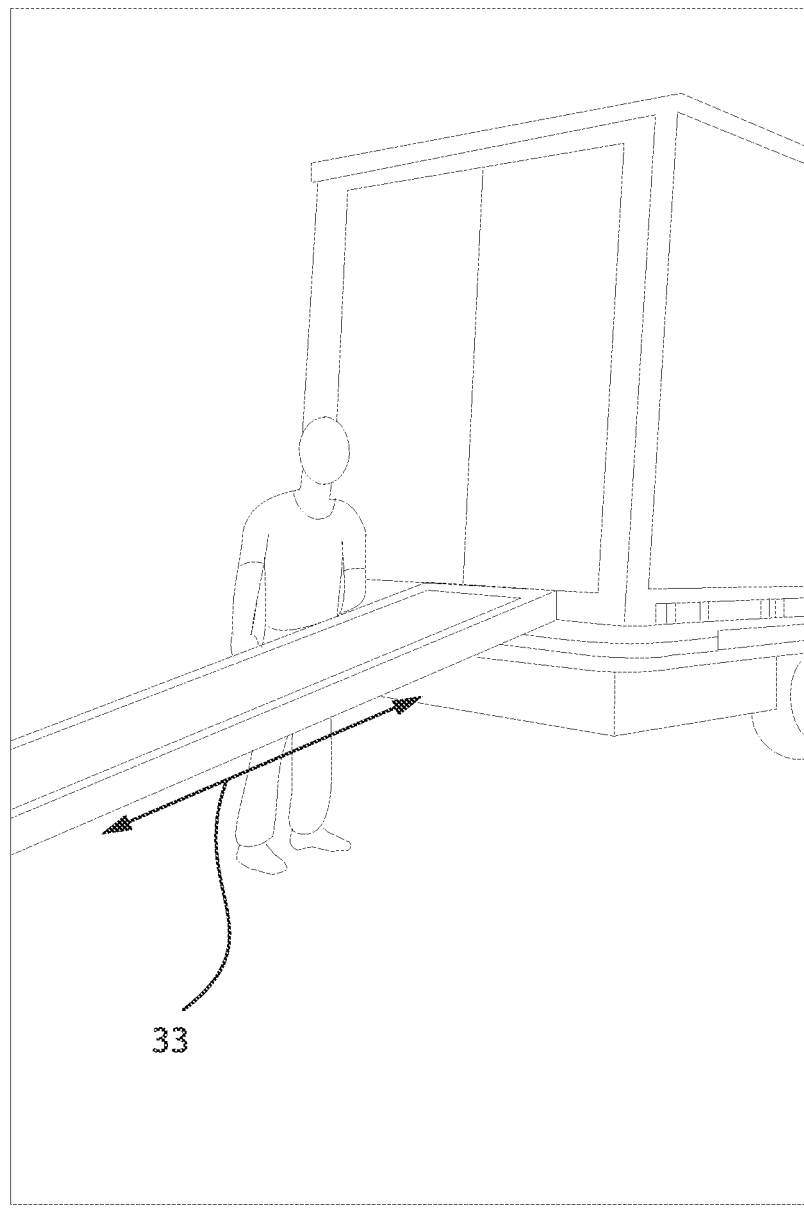
FIG. 1 is a perspective view of a cargo transport vehicle employing an automated cargo vehicle ramp deployment system wherein the ramp is extended and lowered, and the cargo container doors are open, in accordance with a non-limiting exemplary embodiment of the present disclosure.
Figure 1A:
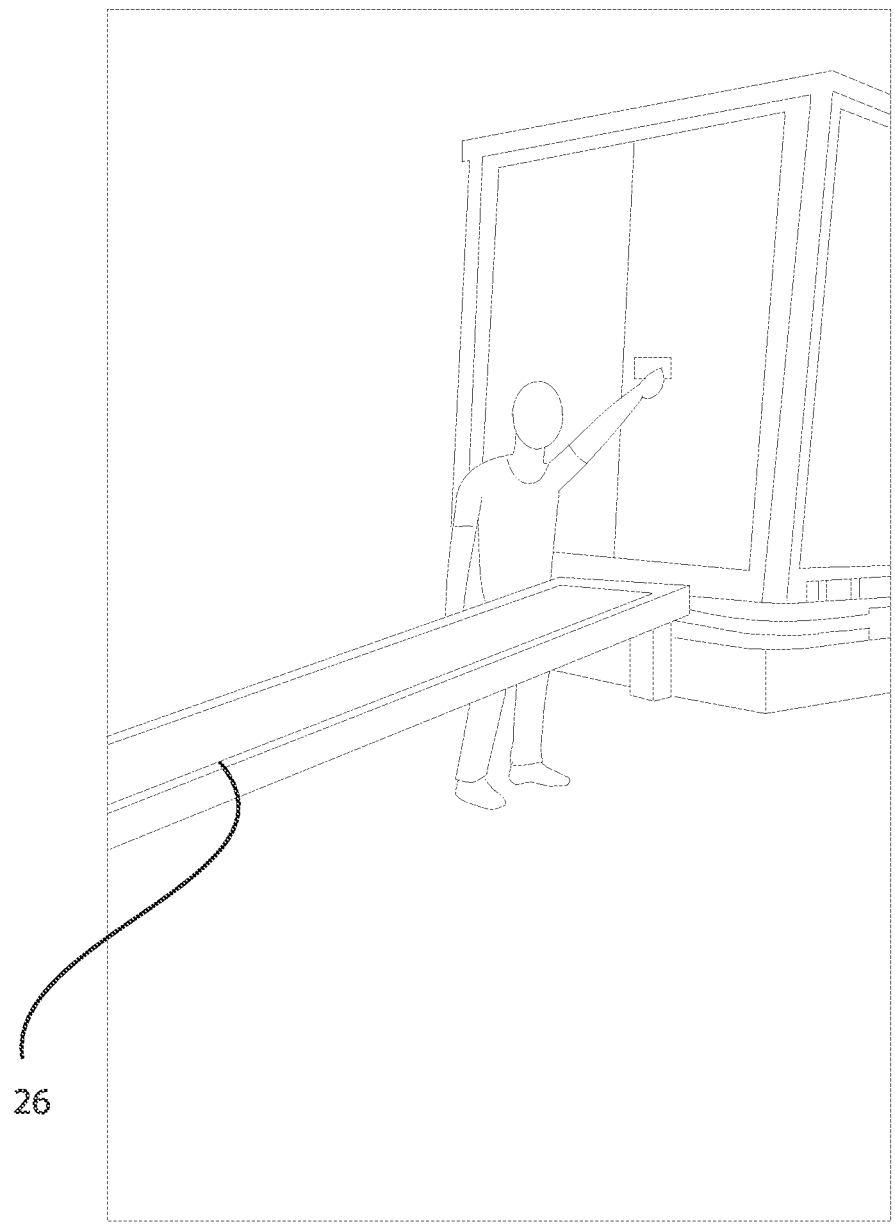
FIG. 1A is a perspective view of the cargo transport vehicle shown in FIG. 1 wherein the ramp is extended and lowered, and the cargo container doors are closed, in accordance with a non-limiting exemplary embodiment of the present disclosure.
Figure 1B:
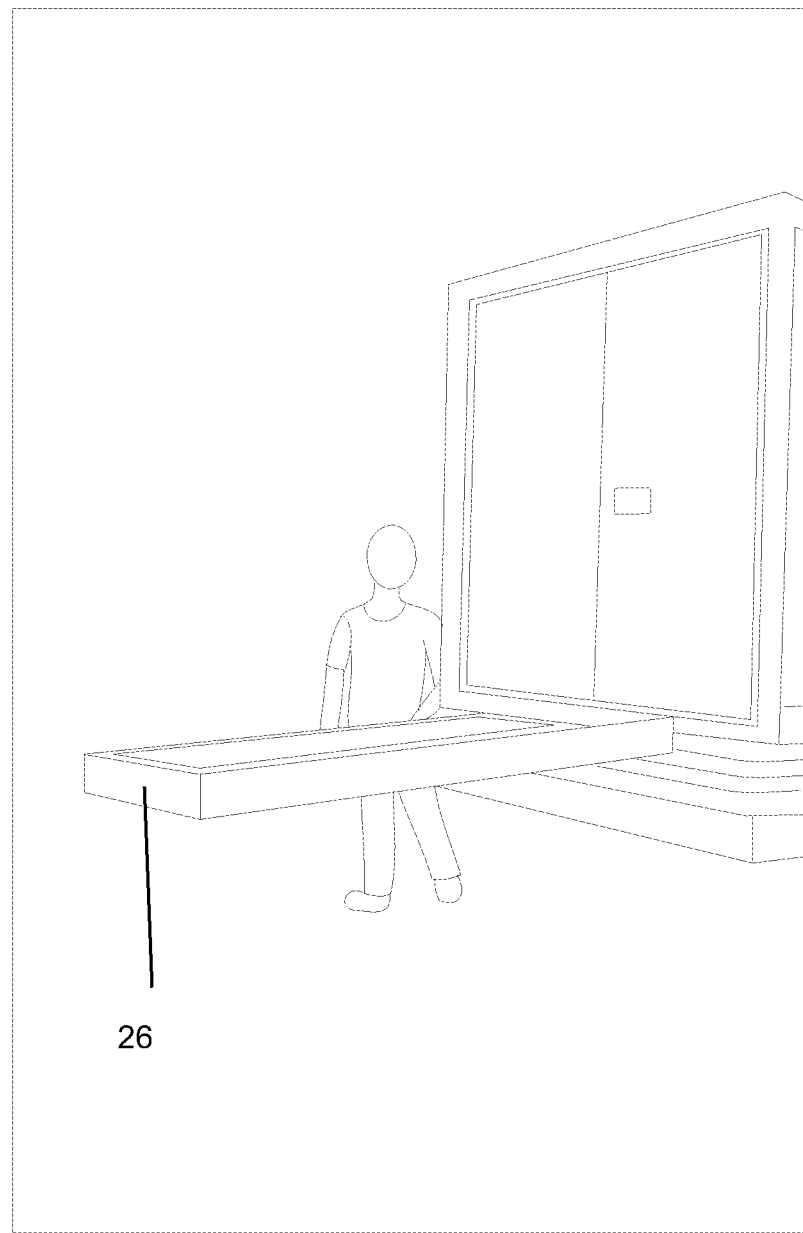
FIG. 1B is a perspective view of the cargo transport vehicle shown in FIG. 1 wherein the ramp is retracted and raised to a horizontal position, in accordance with a non-limiting exemplary embodiment of the present disclosure.
Figure 1C:
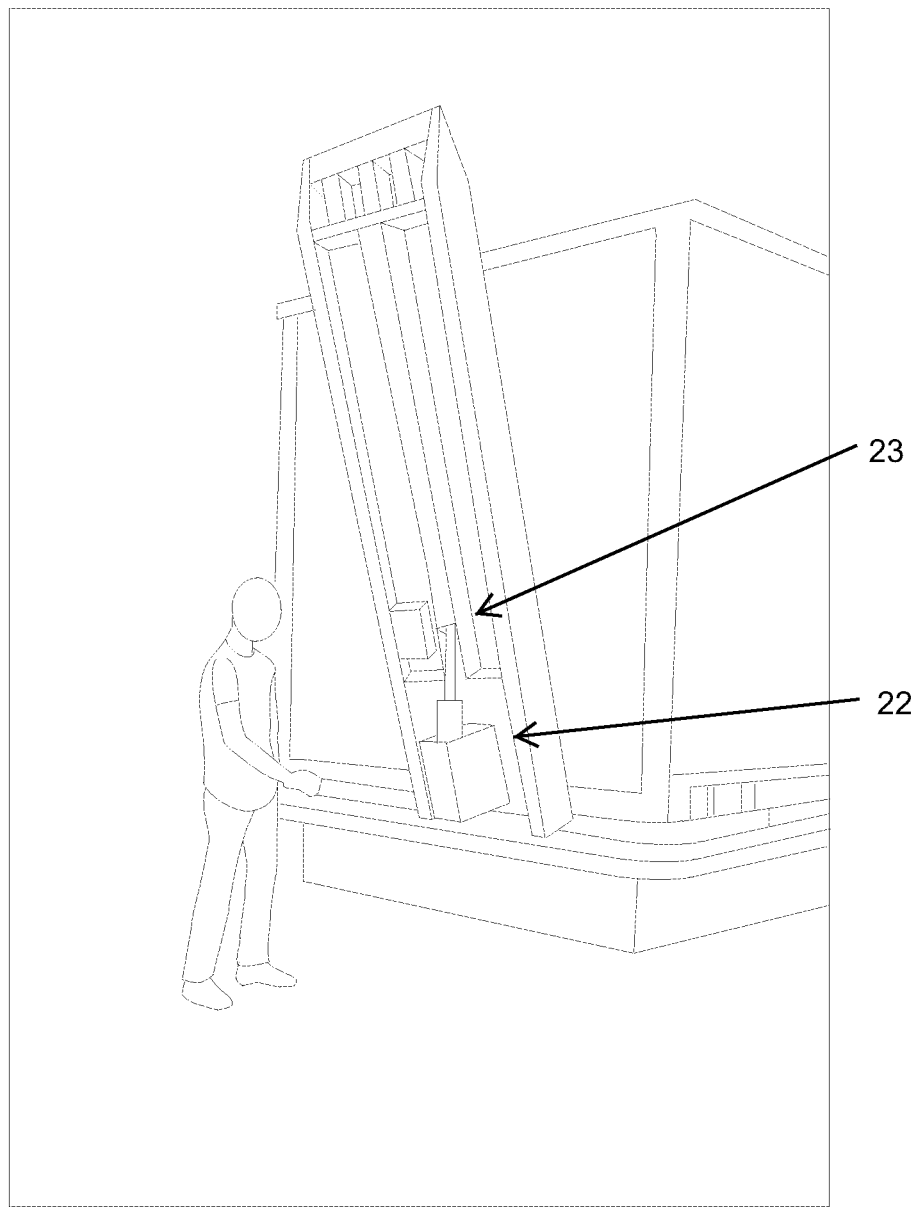
FIG. 1C is a perspective view of the cargo transport vehicle shown in FIG. 1 wherein the ramp is further raised to almost a vertical position, in accordance with a non-limiting exemplary embodiment of the present disclosure.
Figure 1D:
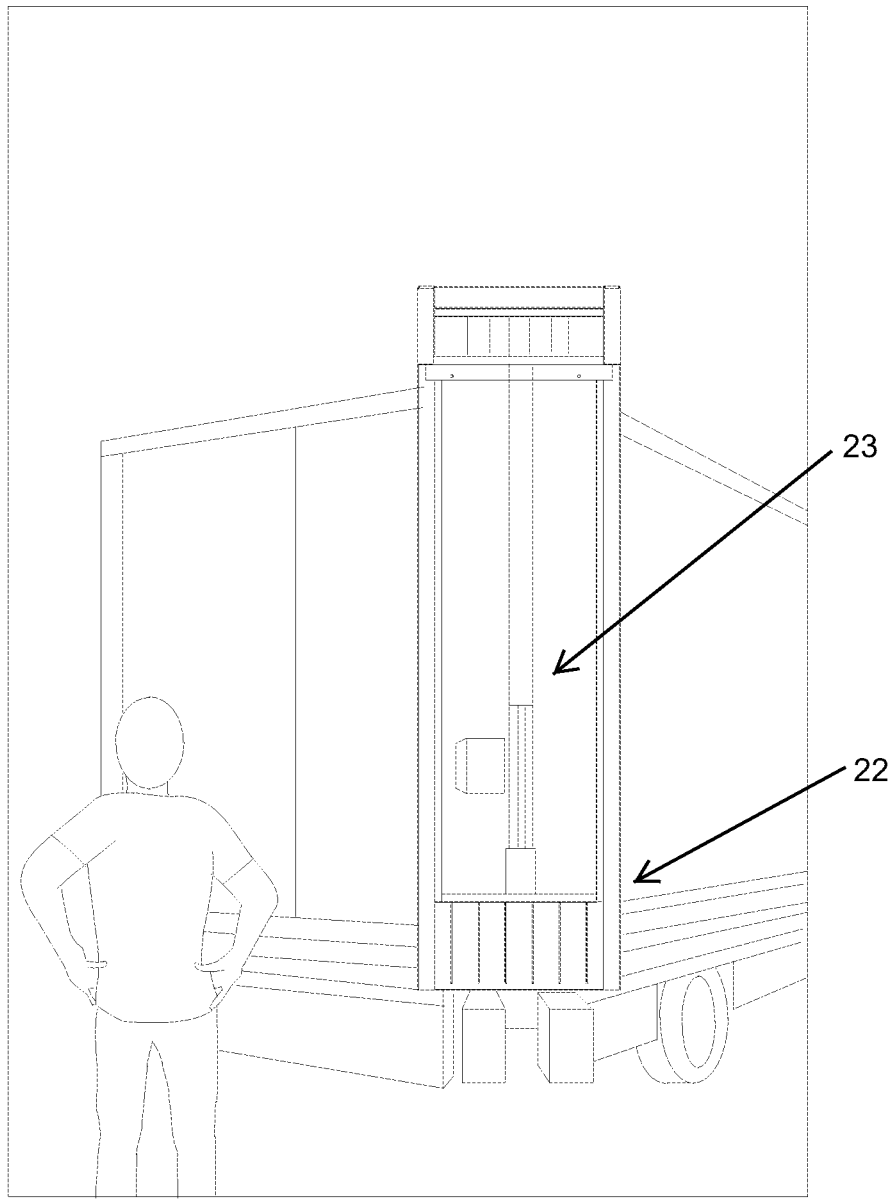
FIG. 1D is a perspective view of the cargo transport vehicle shown in FIG. 1 wherein the ramp is raised to the vertical position and displaced along a guide rail around a perimeter of the vehicle, in accordance with a non-limiting exemplary embodiment of the present disclosure.
Figure 1E:
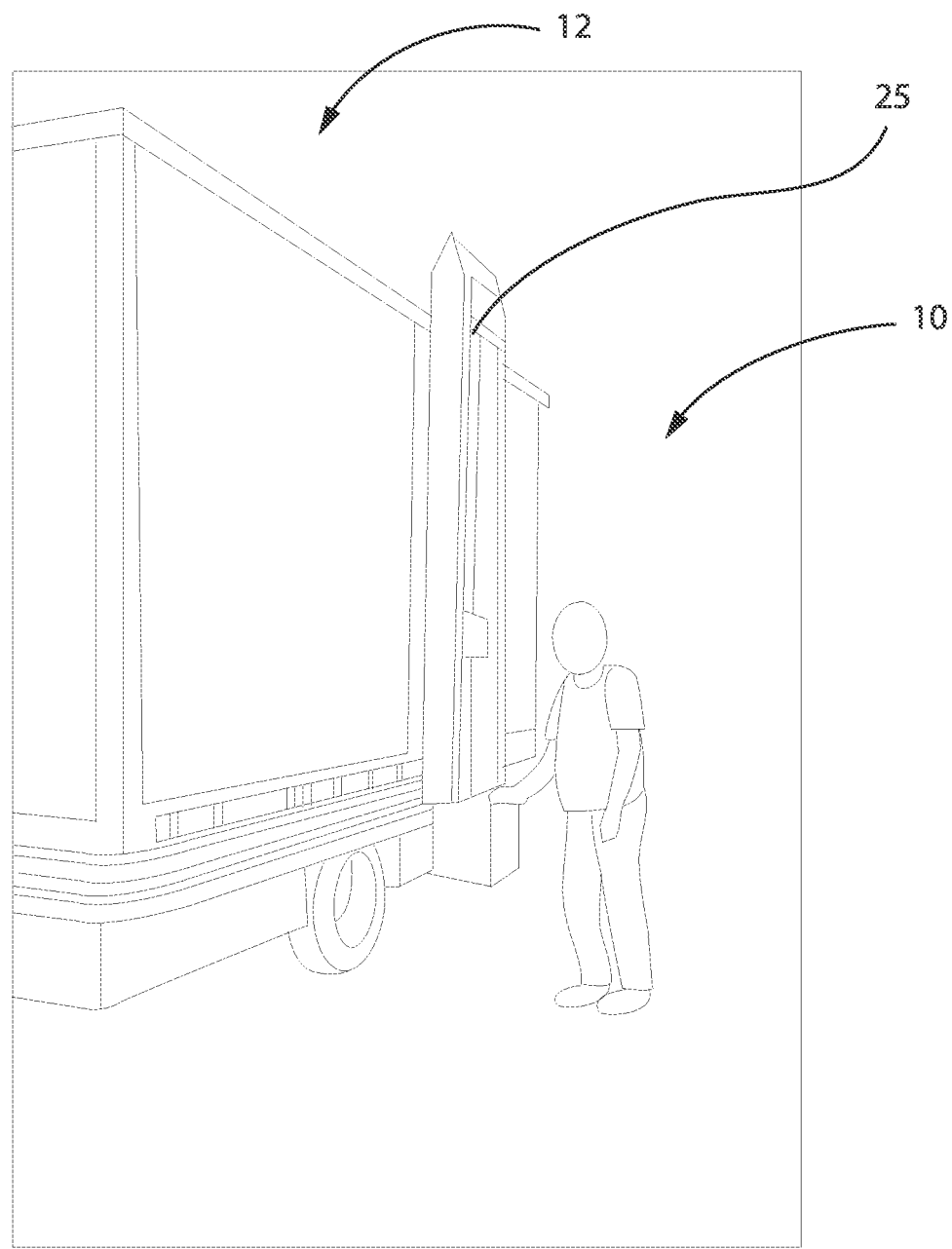
FIG. 1E is a perspective view of the cargo transport vehicle shown in FIG. 1 wherein the ramp is further displaced along the guide rail towards a resting position at a front of the vehicle, in accordance with a non-limiting exemplary embodiment of the present disclosure.
Figure 1F:
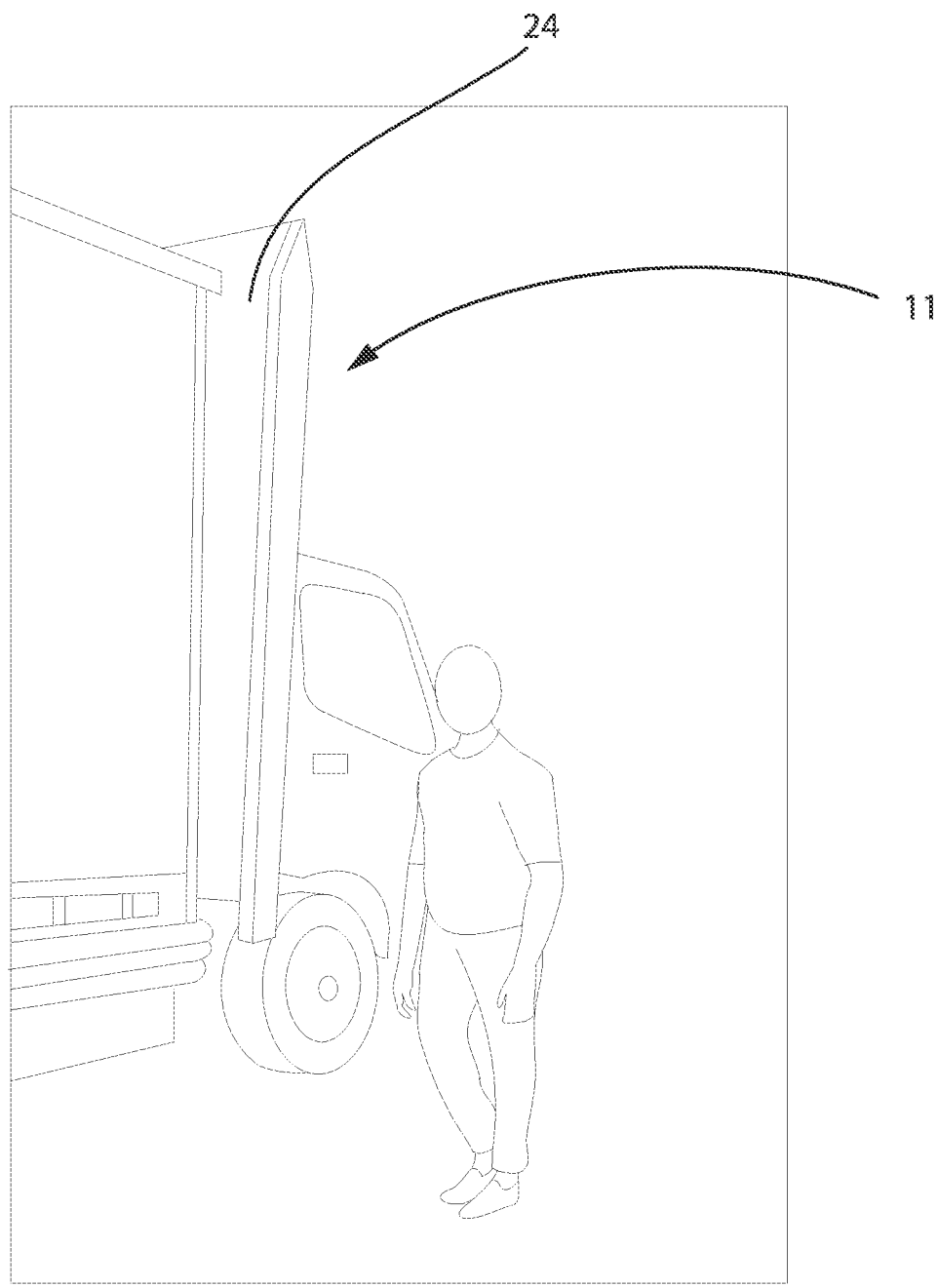
FIG. 1F is a perspective view of the cargo transport vehicle shown in FIG. 1 wherein the ramp is returned to the resting position at the front of the vehicle, in accordance with a non-limiting exemplary embodiment of the present disclosure.
Figure 2:
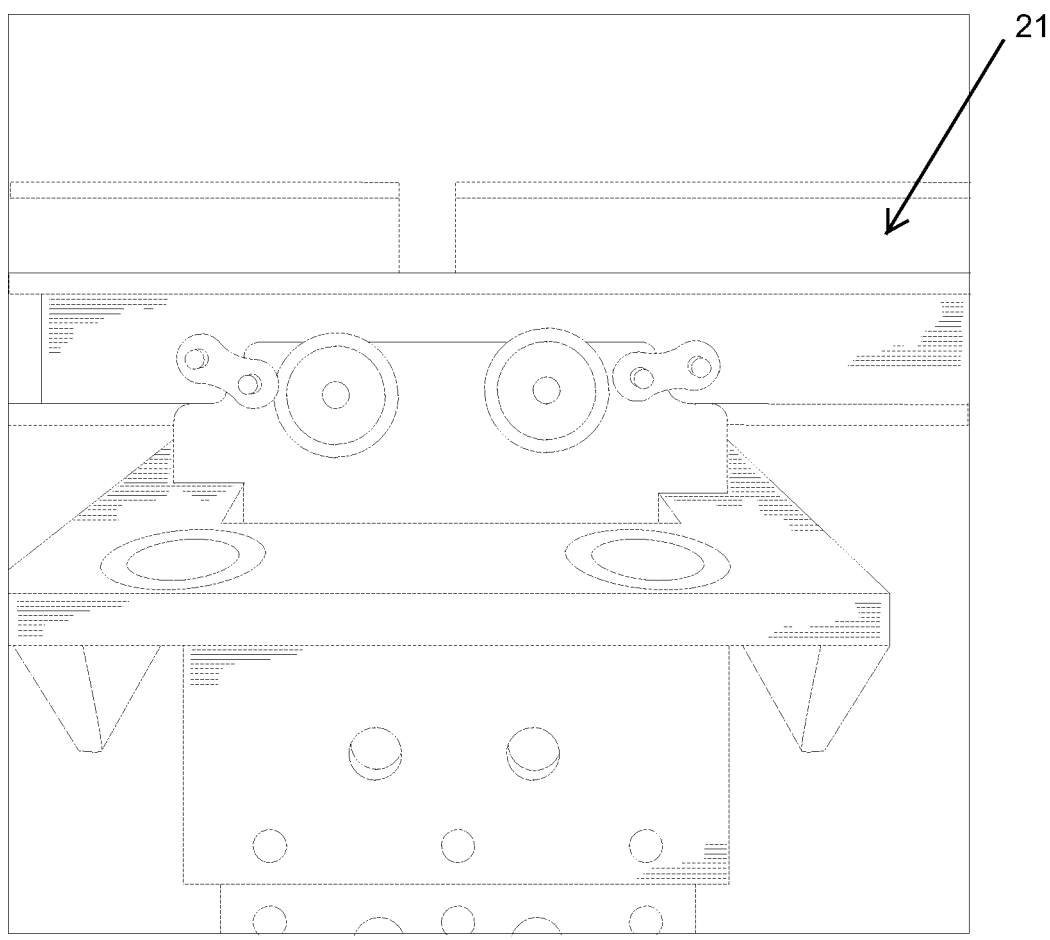
FIG. 2 is a top plan view of a trolley, in accordance with a non-limiting exemplary embodiment of the present disclosure.
Figure 3:
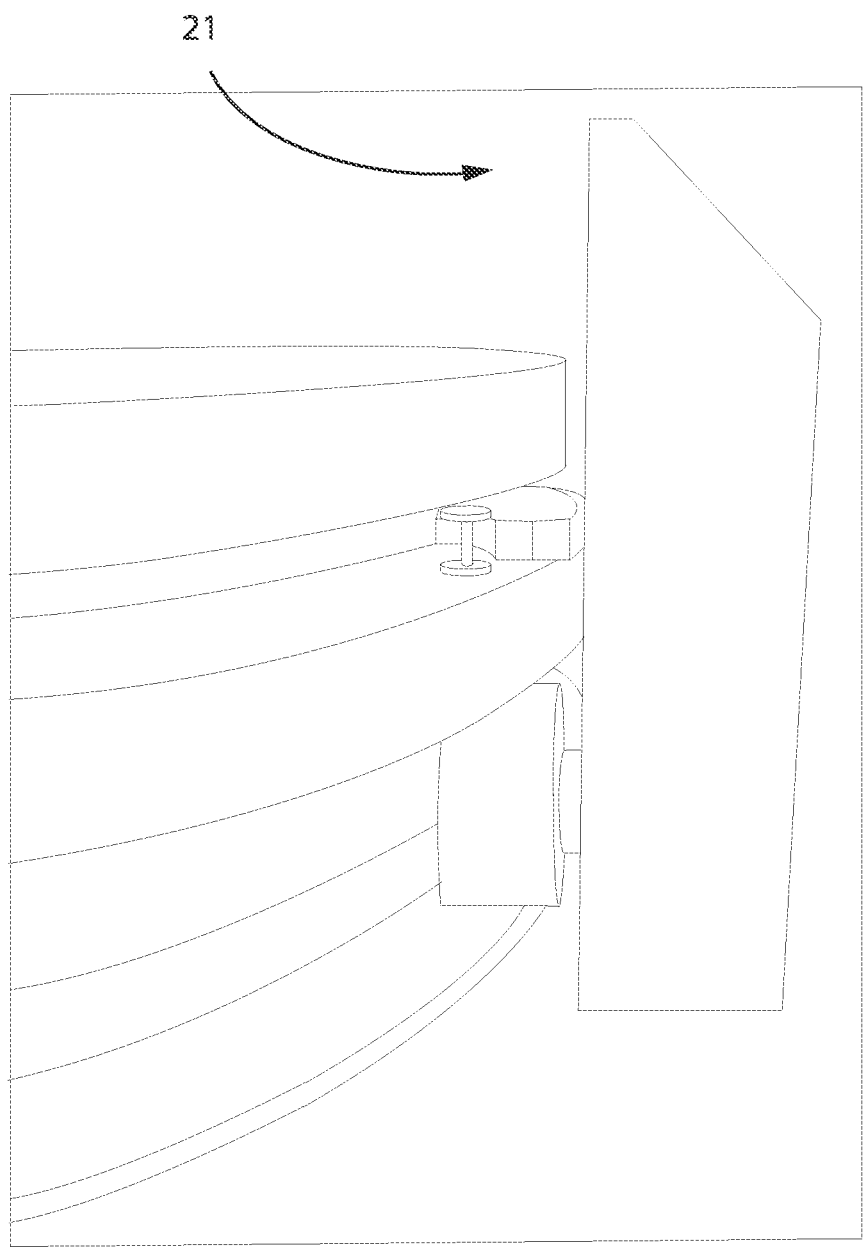
FIG. 3 is an enlarged side elevational view of the trolley traveling along the guide rail, in accordance with a non-limiting exemplary embodiment of the present disclosure.
Figure 4:
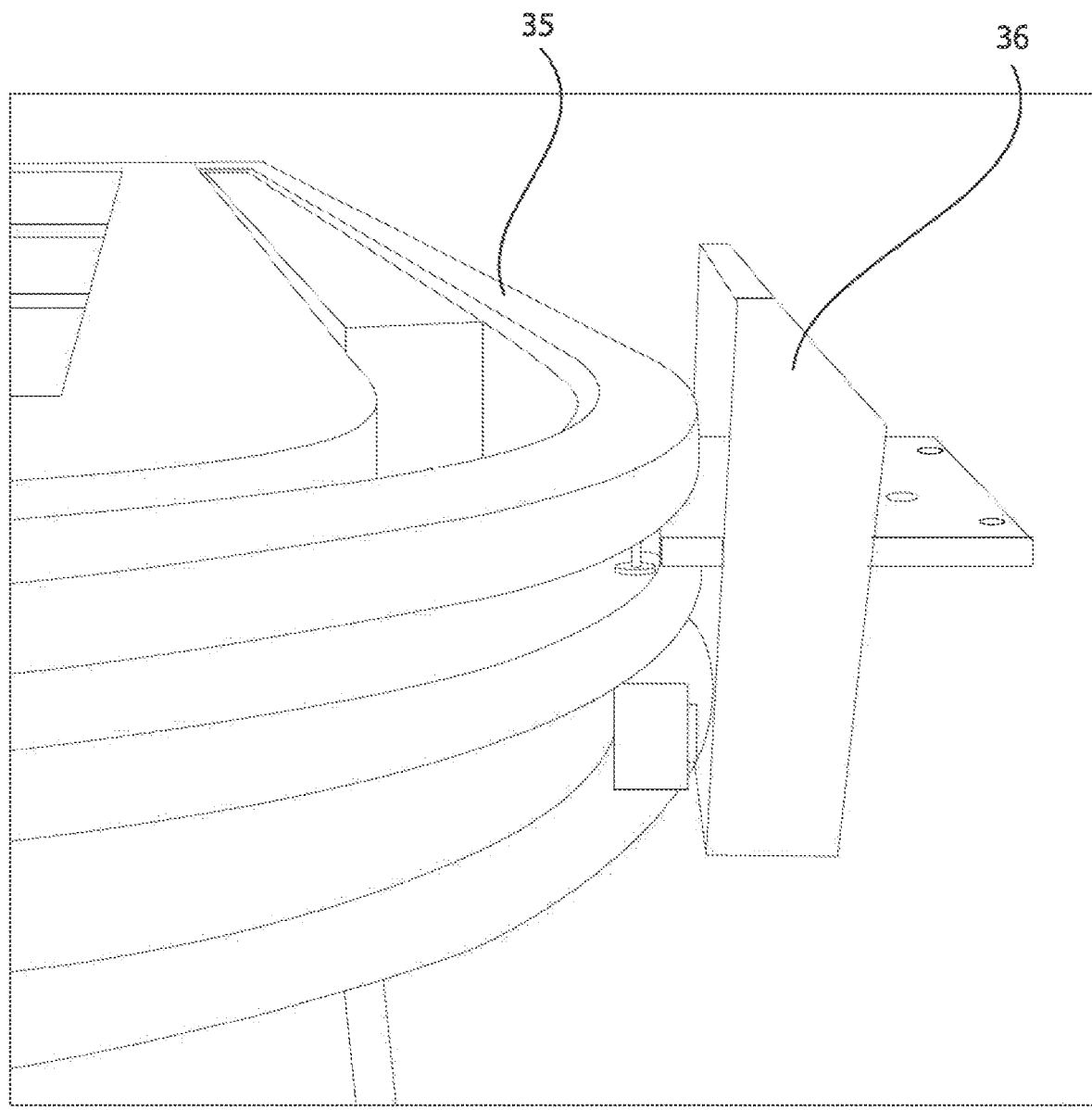
FIG. 4 is an enlarged perspective view of the trolley traveling along the guide rail, in accordance with a non-limiting exemplary embodiment of the present disclosure.
Figure 5:
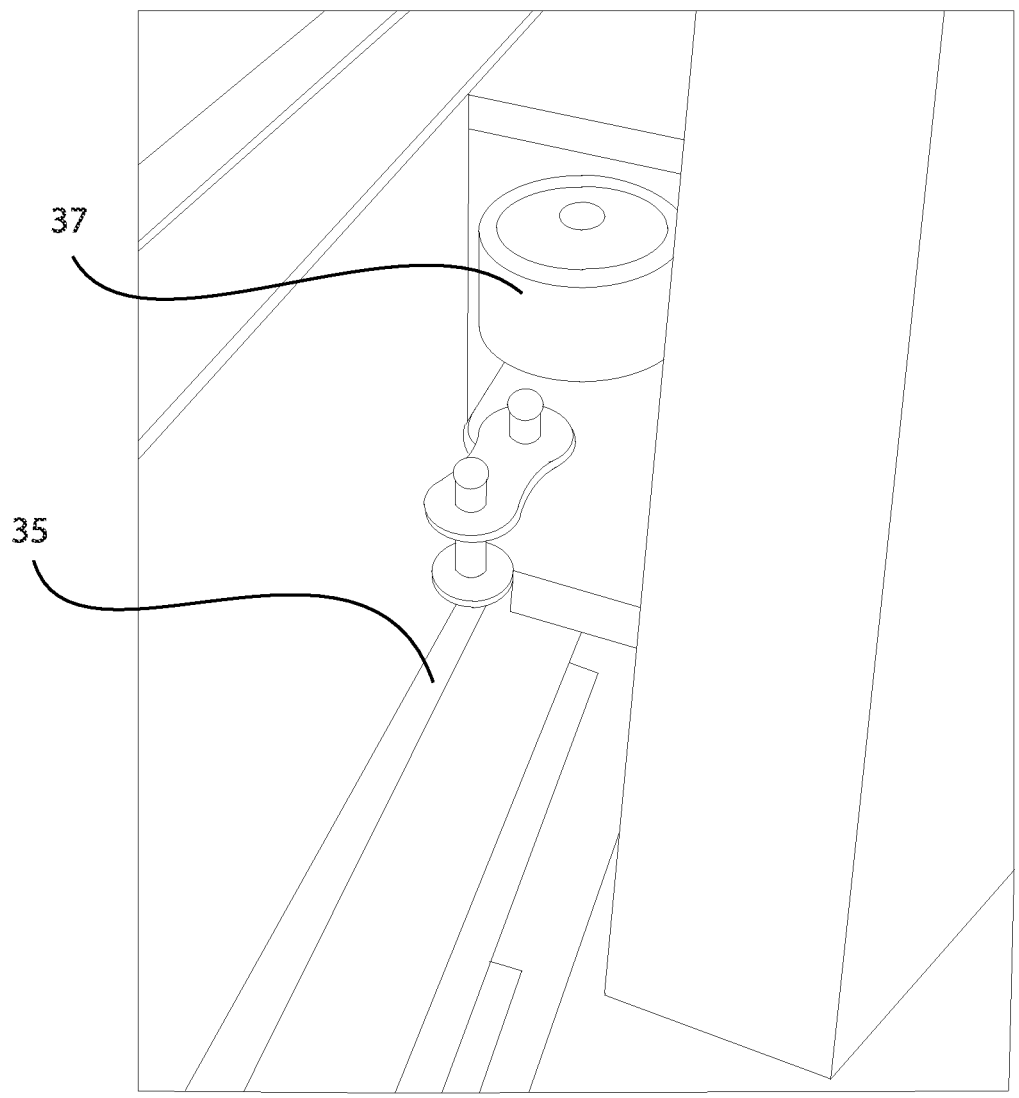
FIG. 5 is an enlarged perspective view showing the interconnection of the trolley and guide rail, in accordance with a non-limiting exemplary embodiment of the present disclosure.
Figure 6:
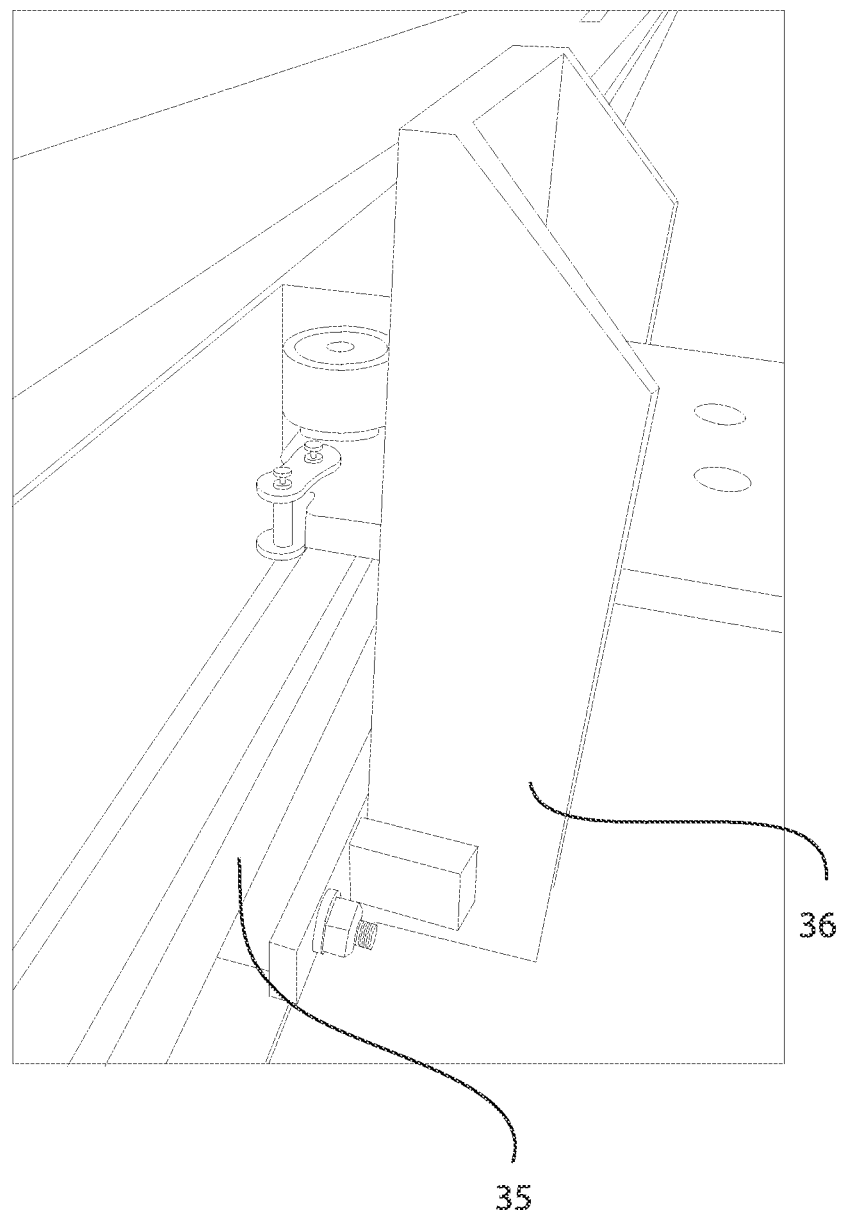
FIG. 6 is another enlarged perspective view showing the interconnection of the trolley and guide rail, in accordance with a non-limiting exemplary embodiment of the present disclosure.
Figure 7:
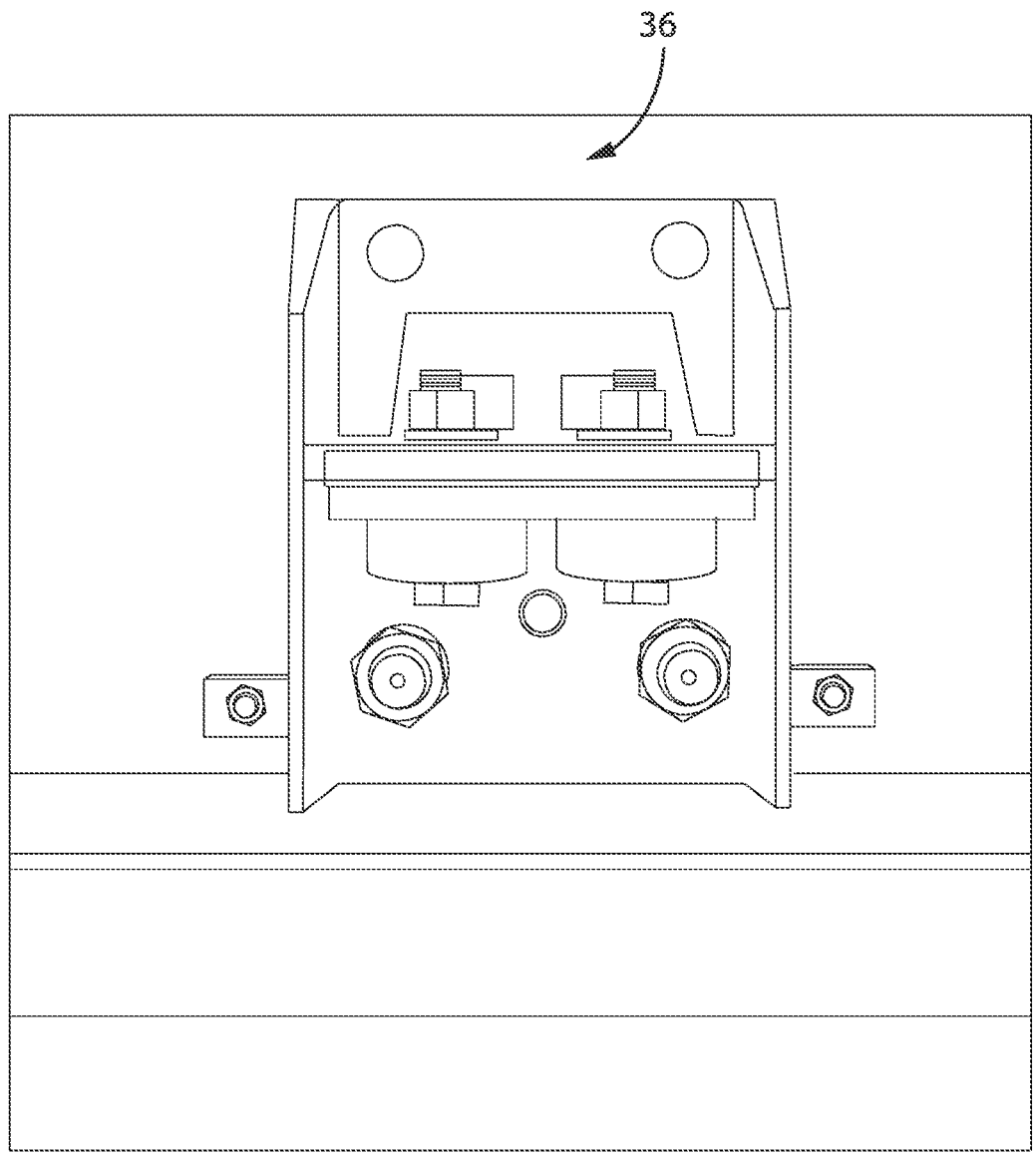
FIG. 7 is rear elevational view of the trolley, in accordance with a non-limiting exemplary embodiment of the present disclosure.
Figure 8:
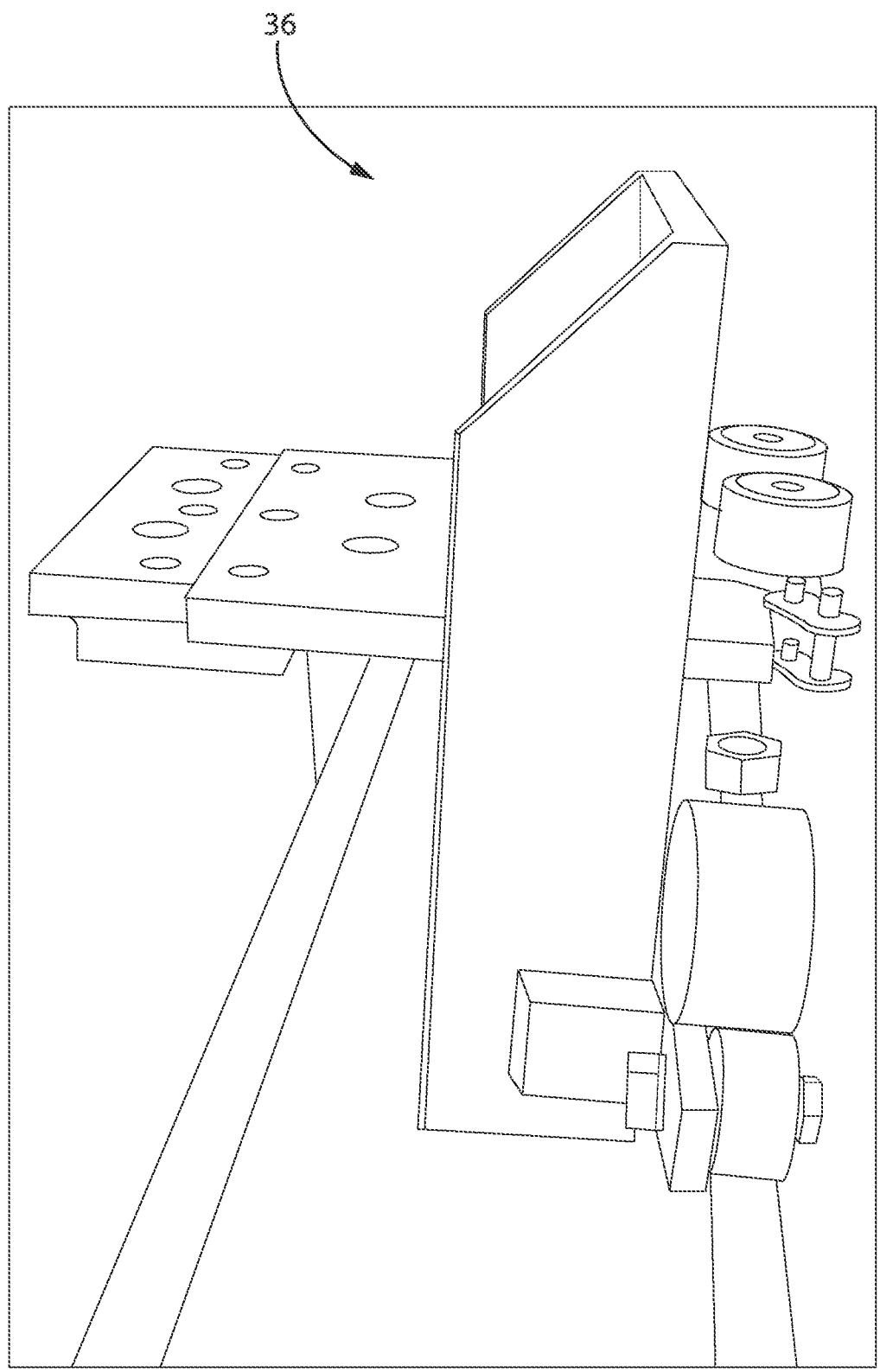
FIG. 8 is another side elevational view of the trolley, in accordance with a non-limiting exemplary embodiment of the present disclosure.
Figure 9:
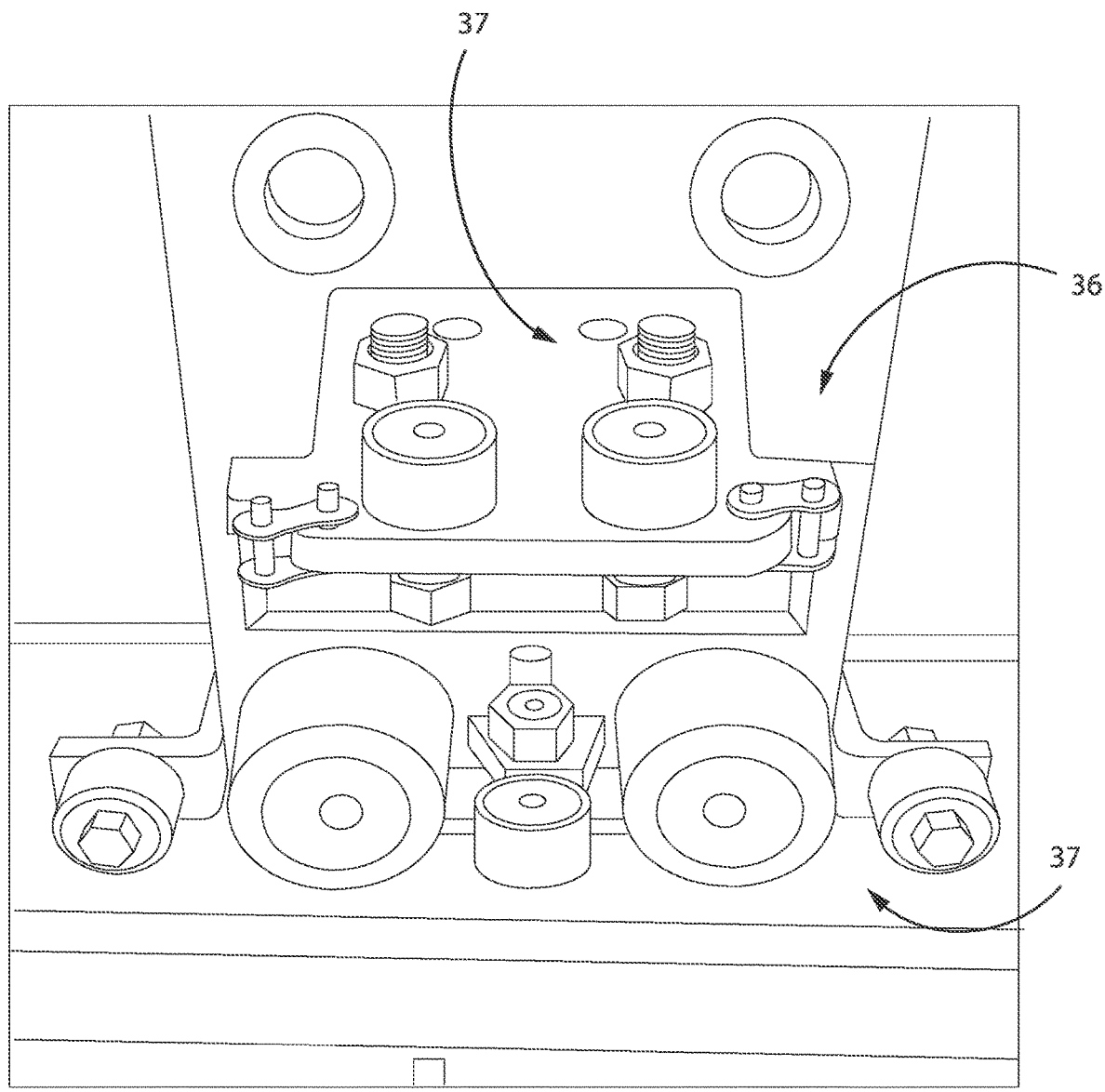
FIG. 9 is another perspective view of the trolley, in accordance with a non-limiting exemplary embodiment of the present disclosure.
Figure 10:
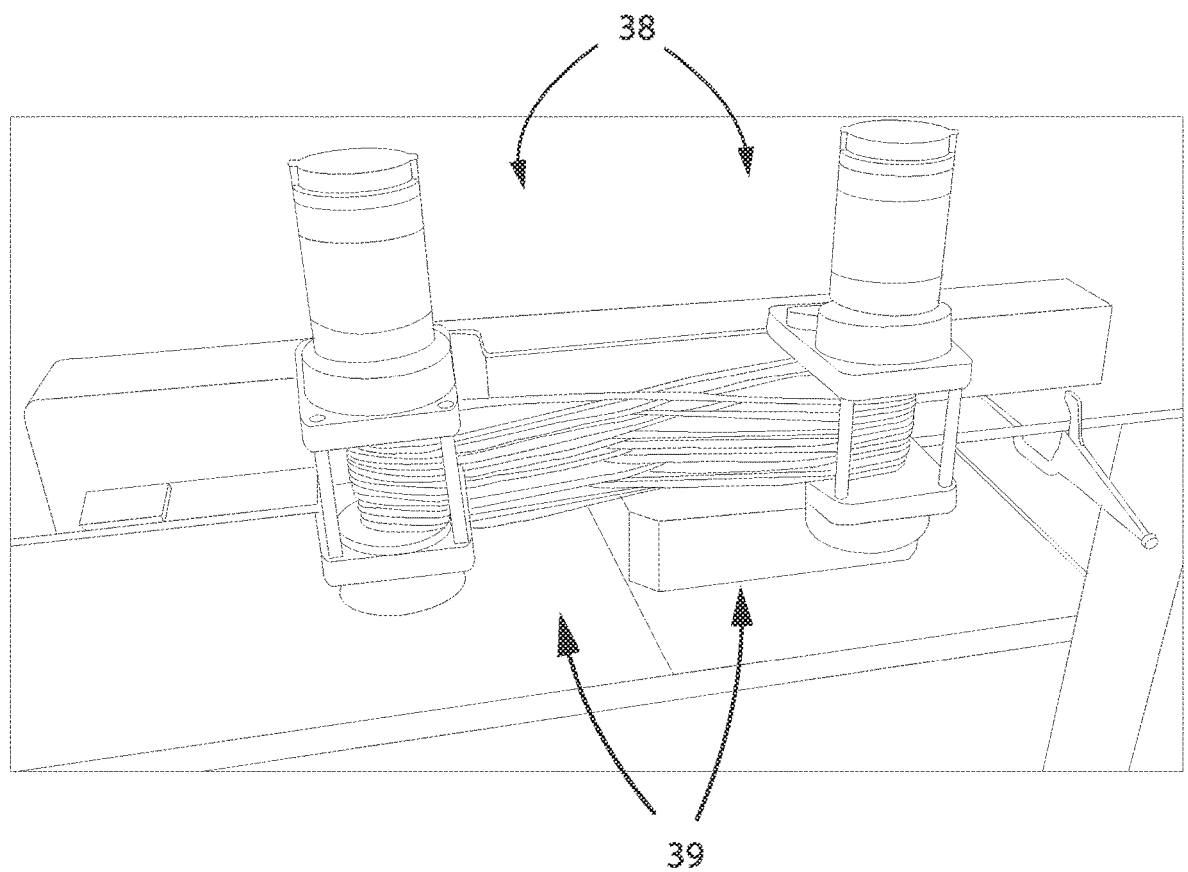
FIG. 10 is a perspective view of a winch cable system, in accordance with a non-limiting exemplary embodiment of the present disclosure.
Figure 11:
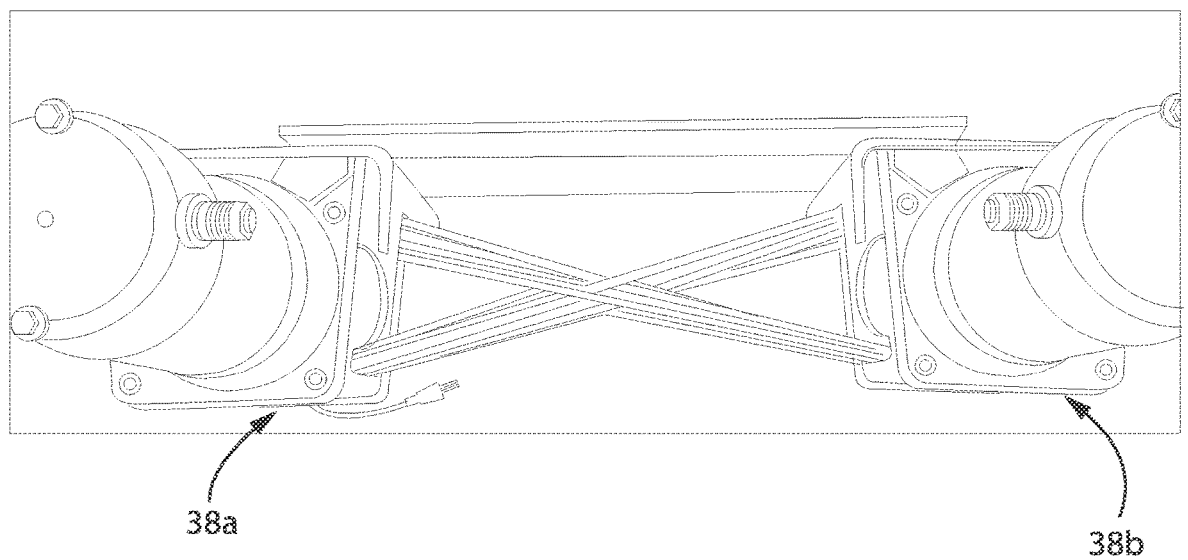
FIG. 11 is a top plan view of the winch cable system, in accordance with a non-limiting exemplary embodiment of the present disclosure.
Figure 12:
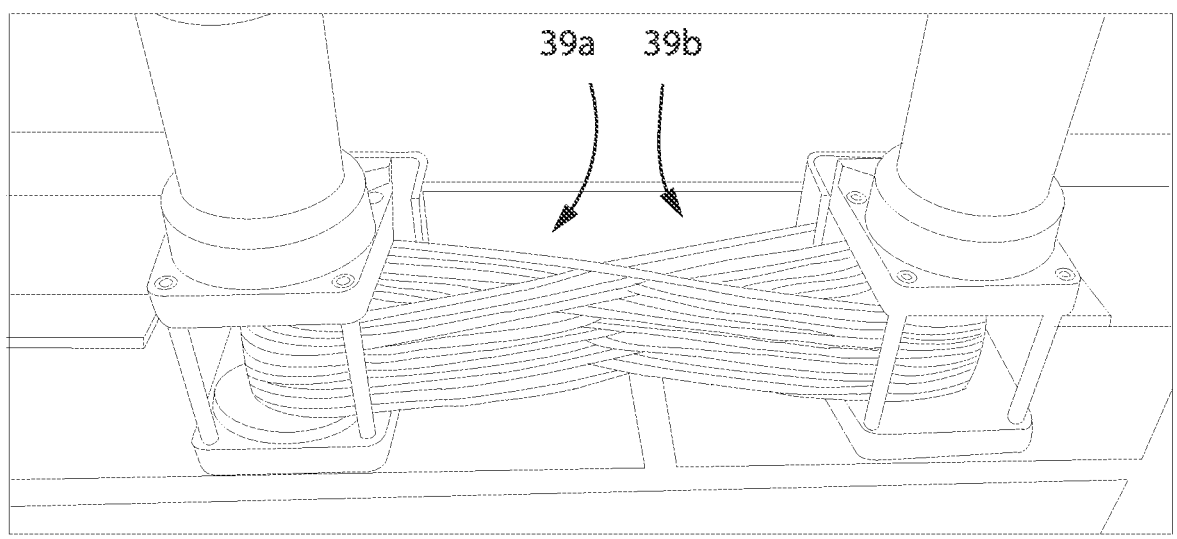
FIG. 12 is another perspective view of the winch cable system, in accordance with a non-limiting exemplary embodiment of the present disclosure.
Figure 13:
FIG. 13 is yet another enlarged perspective view showing the interconnection of the trolley and guide rail, in accordance with a non-limiting exemplary embodiment of the present disclosure.
Figure 14:
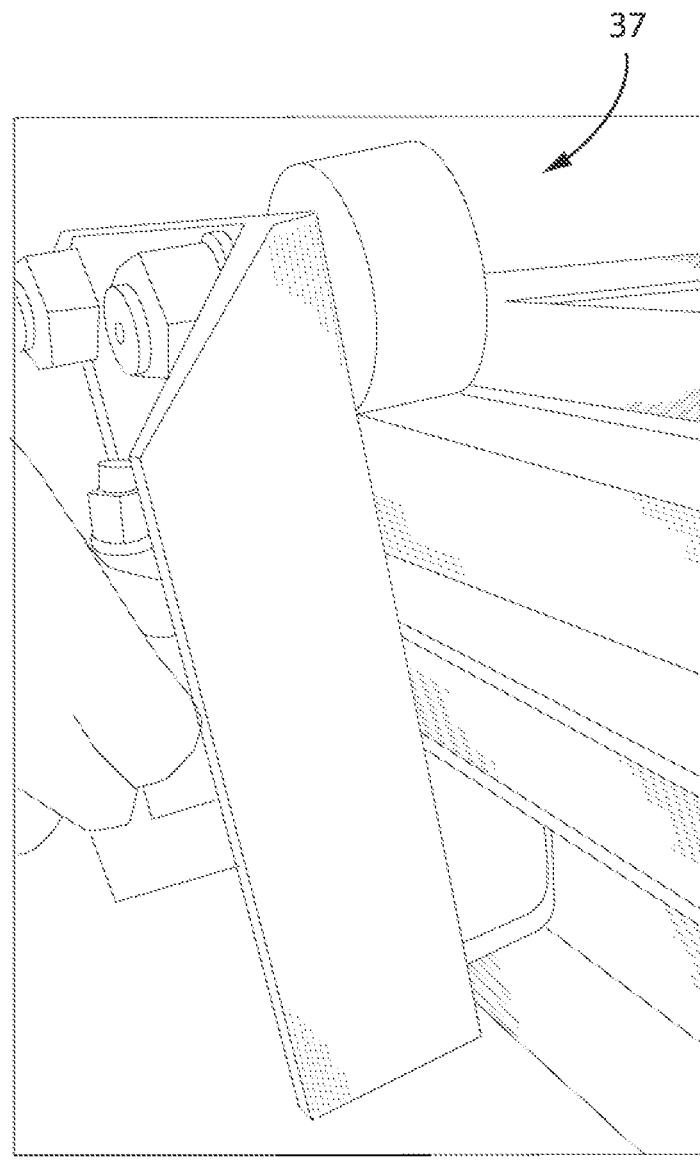
FIG. 14 is yet another enlarged perspective view showing the interconnection of the trolley and guide rail, in accordance with a non-limiting exemplary embodiment of the present disclosure.
Figure 15:
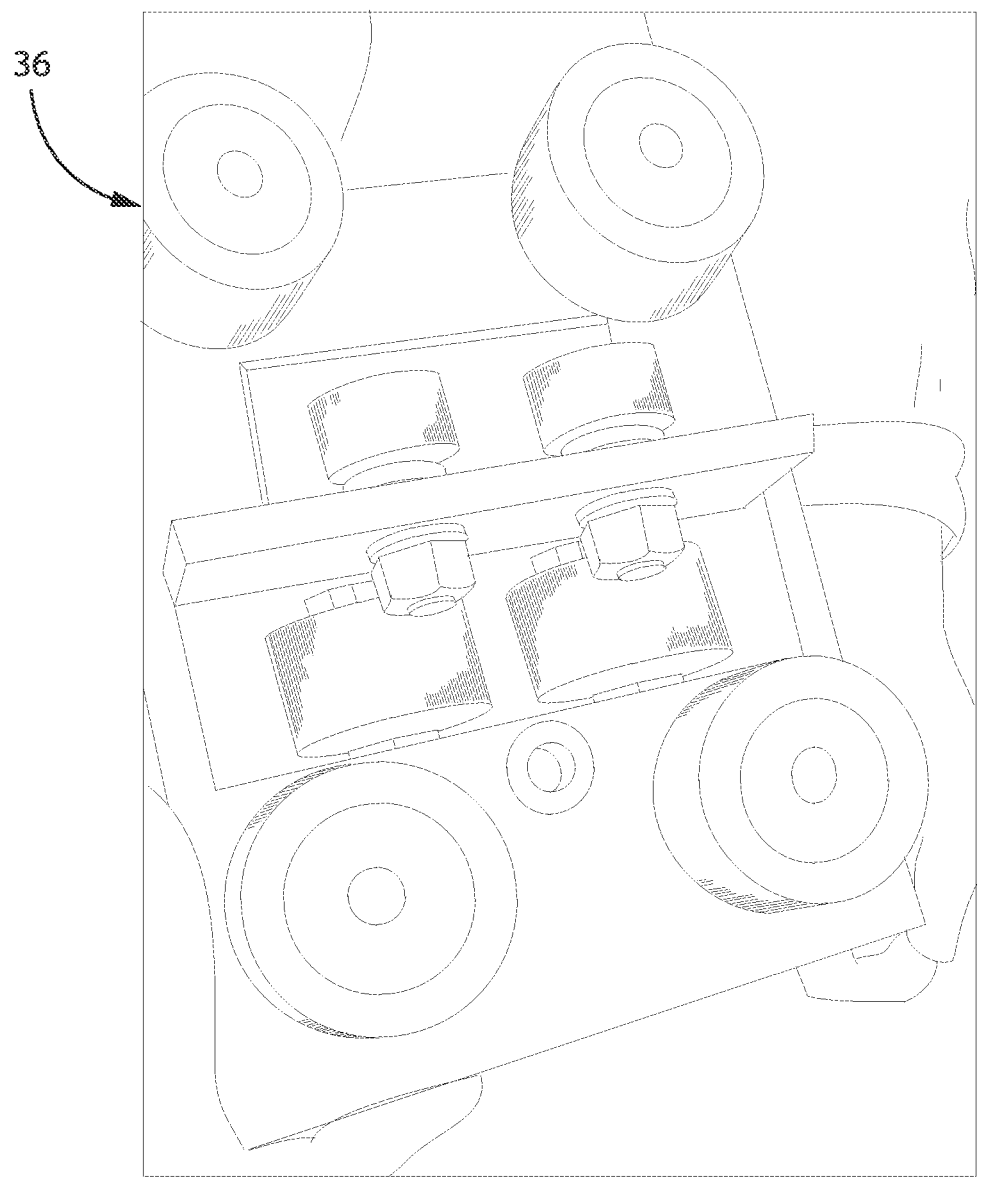
FIG. 15 is yet another perspective view of the trolley, in accordance with a non-limiting exemplary embodiment of the present disclosure.
Figure 16:
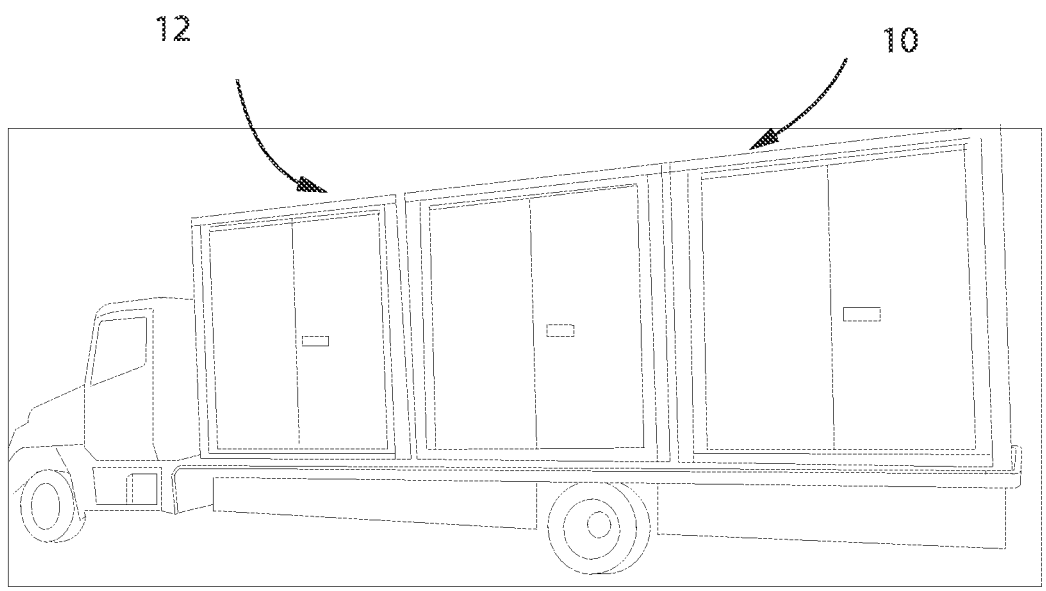
FIG. 16 is perspective view of another cargo transport vehicle employing the automated cargo vehicle ramp deployment system, in accordance with a non-limiting exemplary embodiment of the present disclosure.
Figure 17:
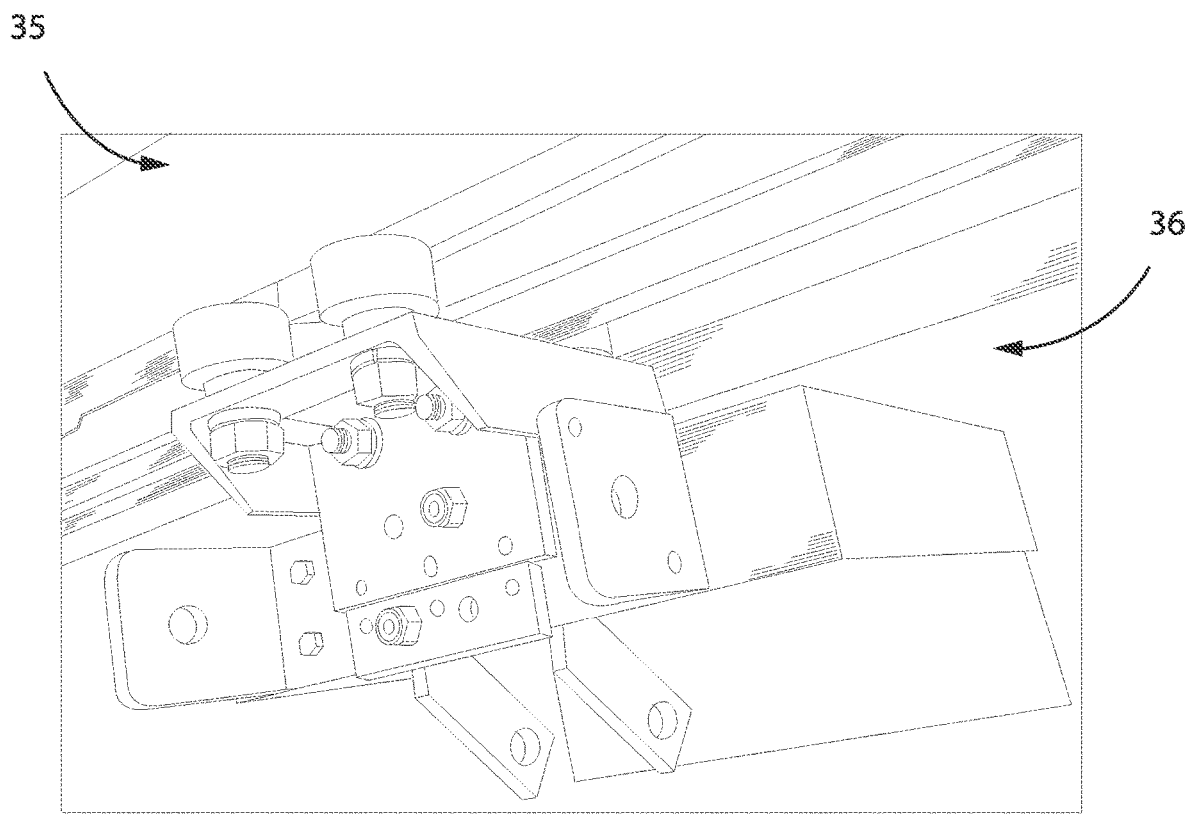
FIG. 17 is yet another enlarged perspective view showing the interconnection of the trolley and guide rail, in accordance with a non-limiting exemplary embodiment of the present disclosure.
Figure 18:
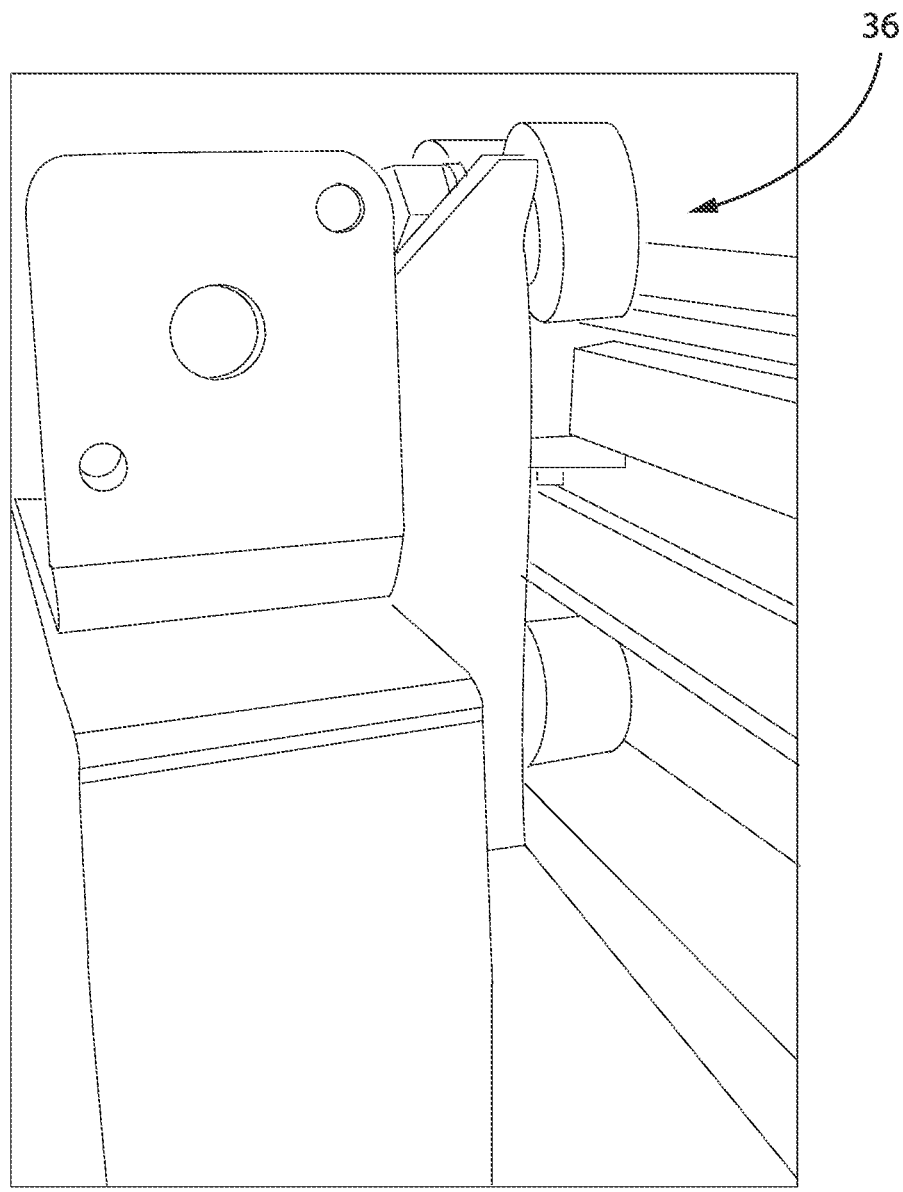
FIG. 18 is yet another enlarged perspective view showing the interconnection of the trolley and guide rail, in accordance with a non-limiting exemplary embodiment of the present disclosure.
Figure 19:
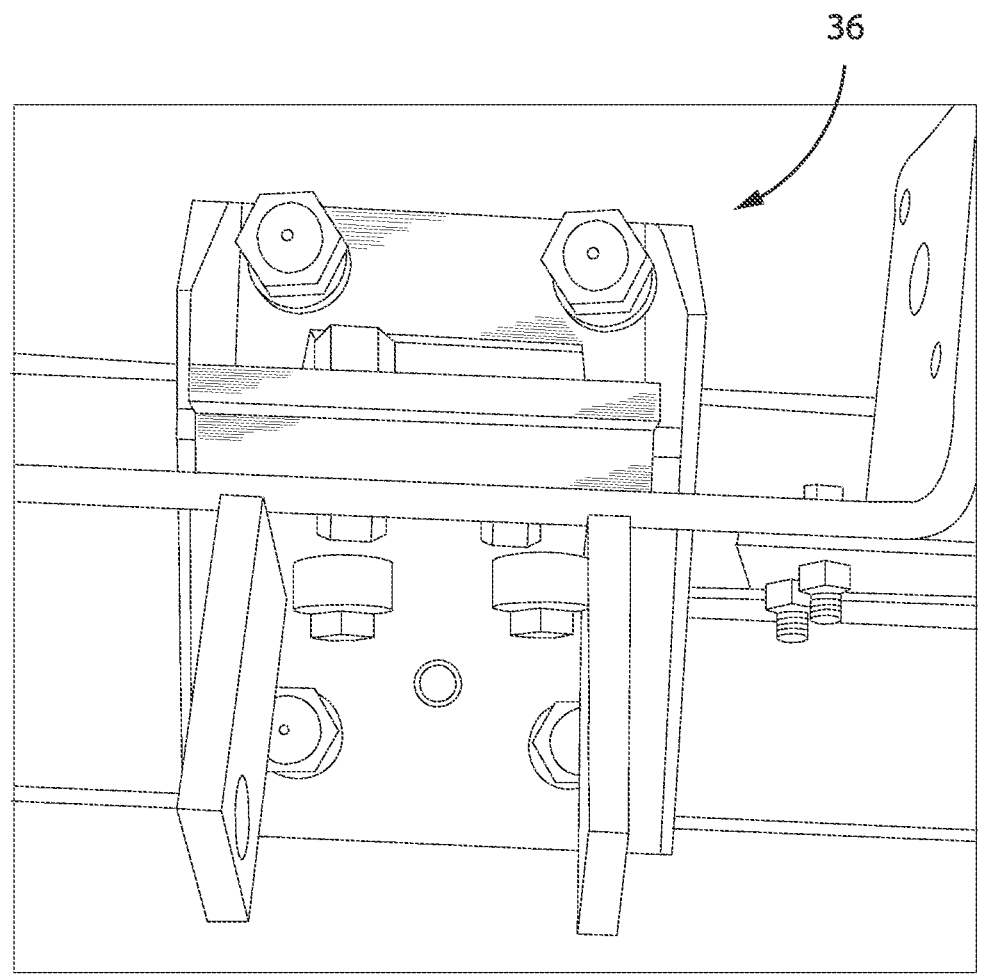
FIG. 19 is yet another top plan view showing the interconnection of the trolley and guide rail, in accordance with a non-limiting exemplary embodiment of the present disclosure.
Figure 20:
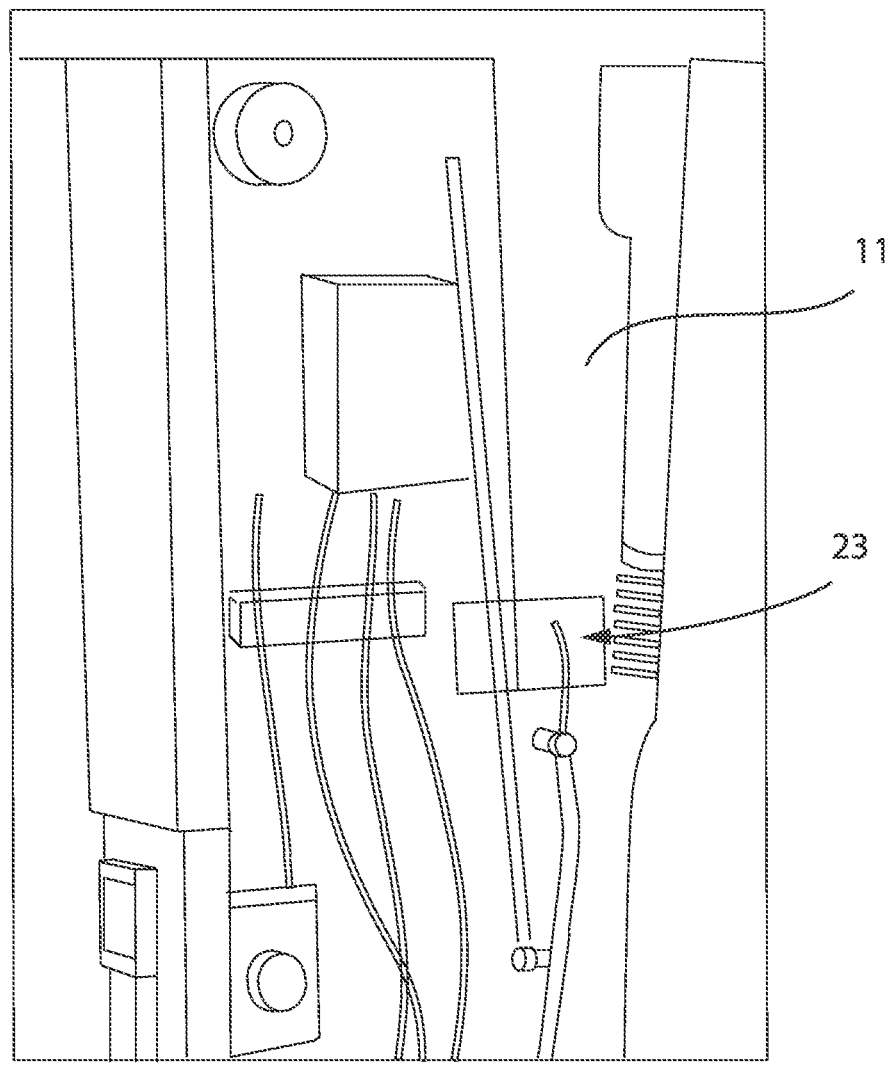
FIG. 20 is yet another perspective view showing the ramp raised to the vertical position and returned to its resting location, in accordance with a non-limiting exemplary embodiment of the present disclosure.
Figure 21:
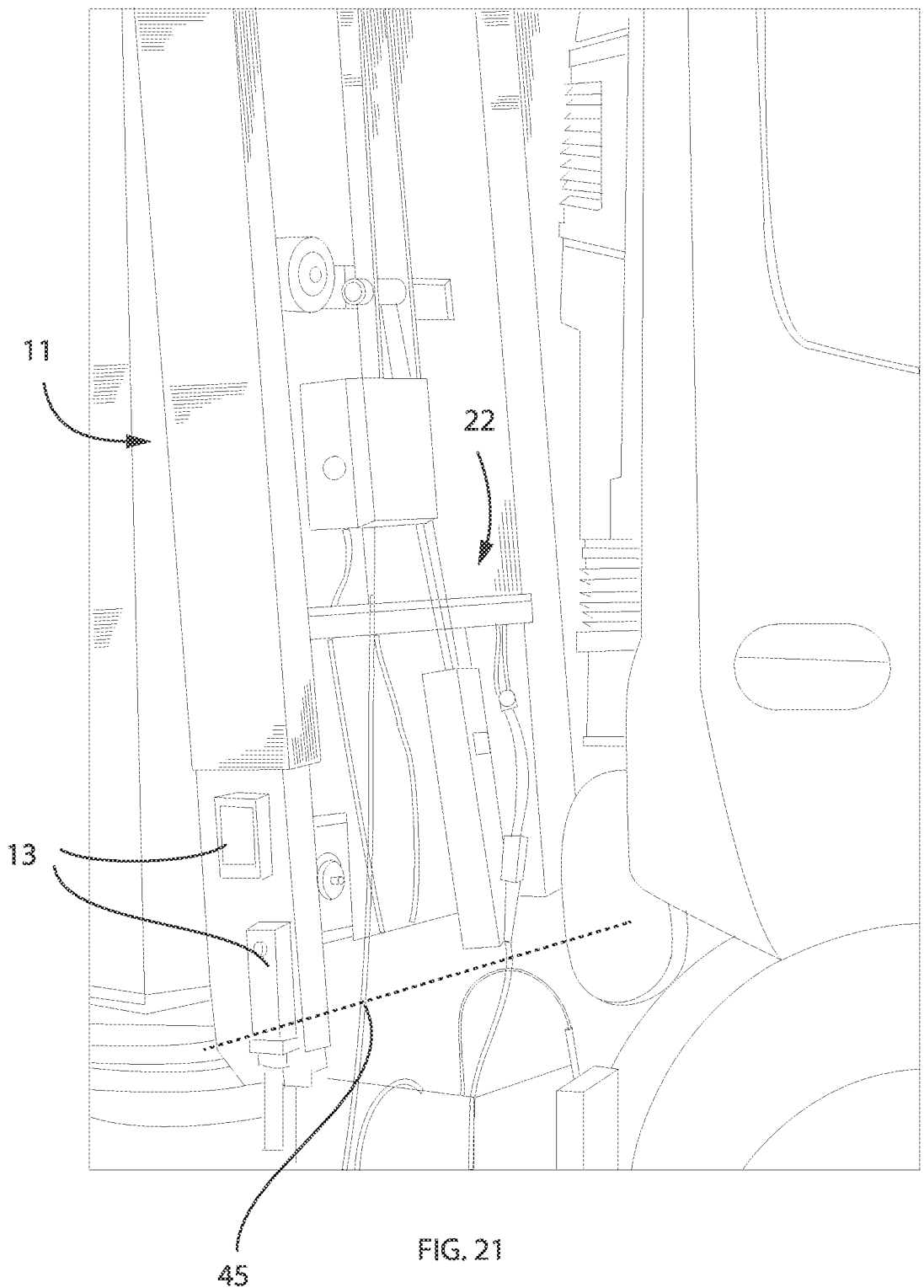
FIG. 21 is yet another enlarged perspective view of the ramp shown in FIG. 20, in accordance with a non-limiting exemplary embodiment of the present disclosure.
Figure 22:
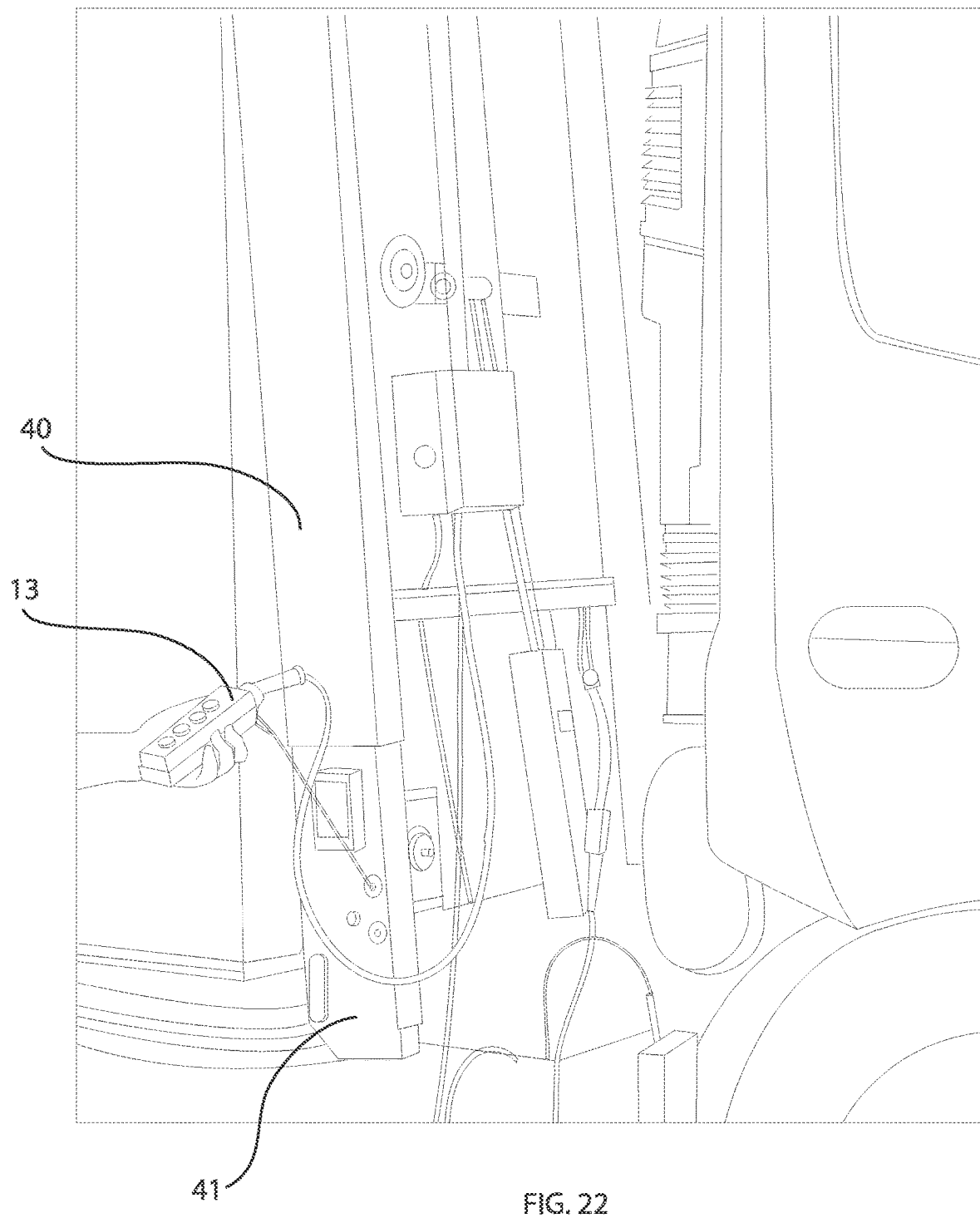
FIG. 22 is yet another enlarged perspective view of the ramp shown in FIG. 20, in accordance with a non-limiting exemplary embodiment of the present disclosure.
Figure 23:
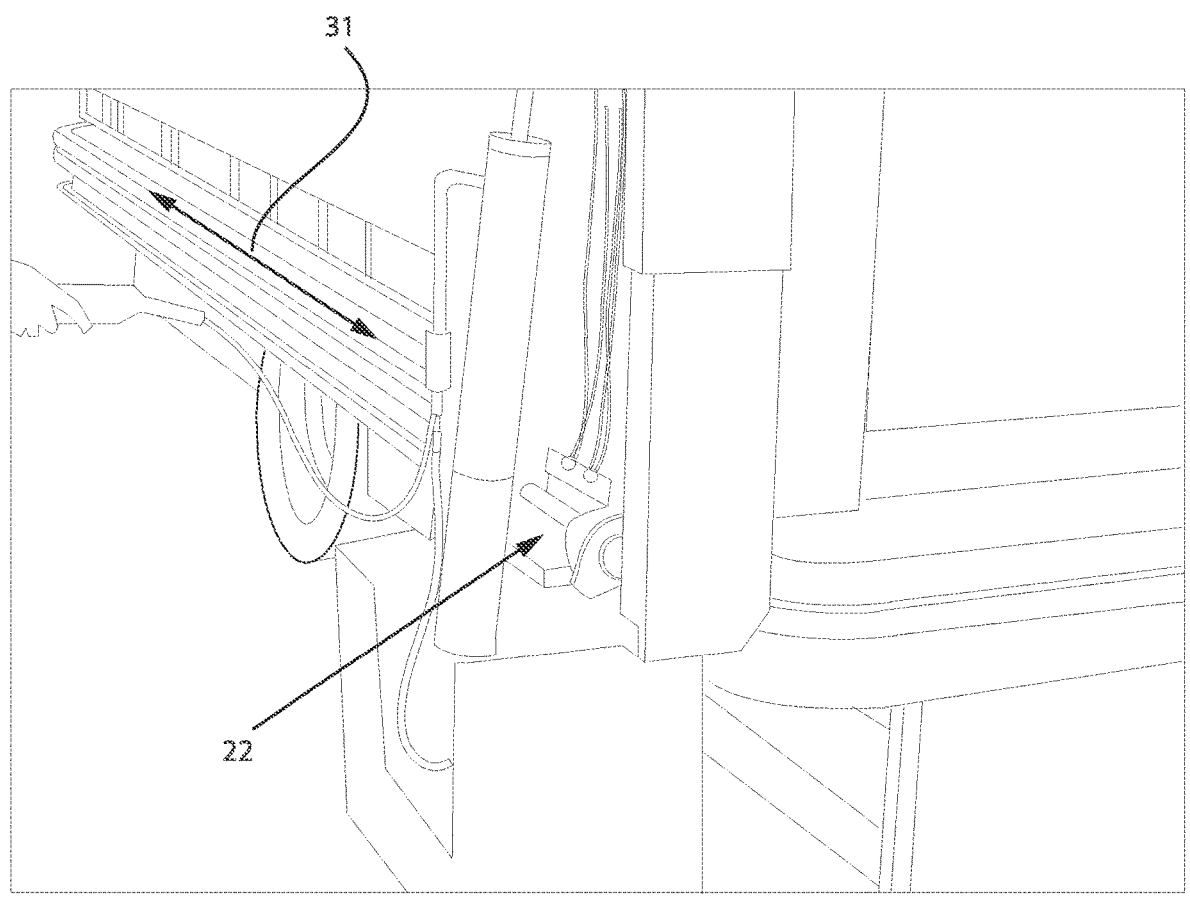
FIG. 23 is yet another enlarged perspective view of the ramp displaced along the perimeter of the guide rail away from its resting location, in accordance with a non-limiting exemplary embodiment of the present disclosure.
Figure 24:
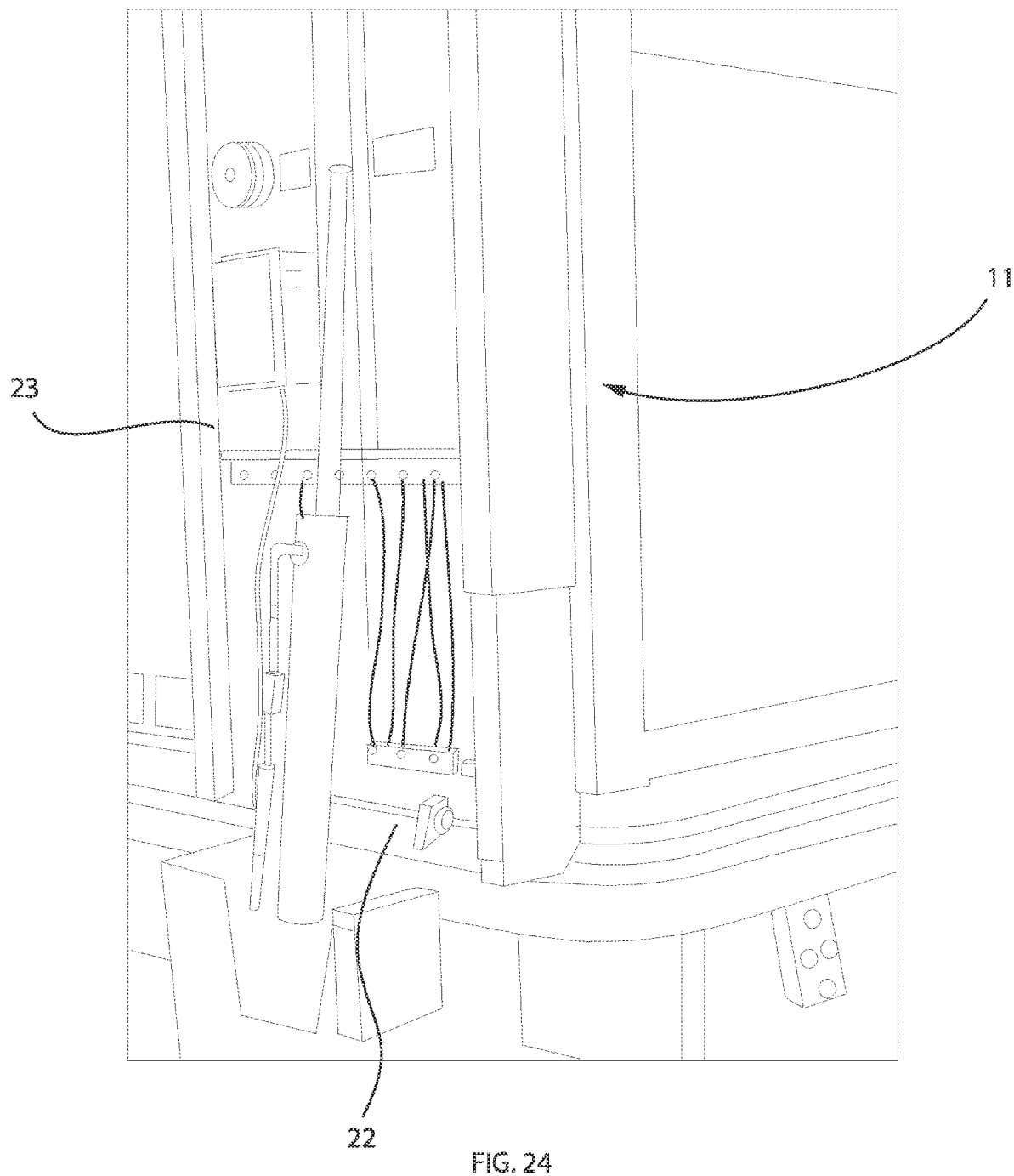
FIG. 24 is yet another enlarged perspective view of the ramp displaced along the perimeter of the guide rail away from its resting location, in accordance with a non-limiting exemplary embodiment of the present disclosure.
Figure 25:
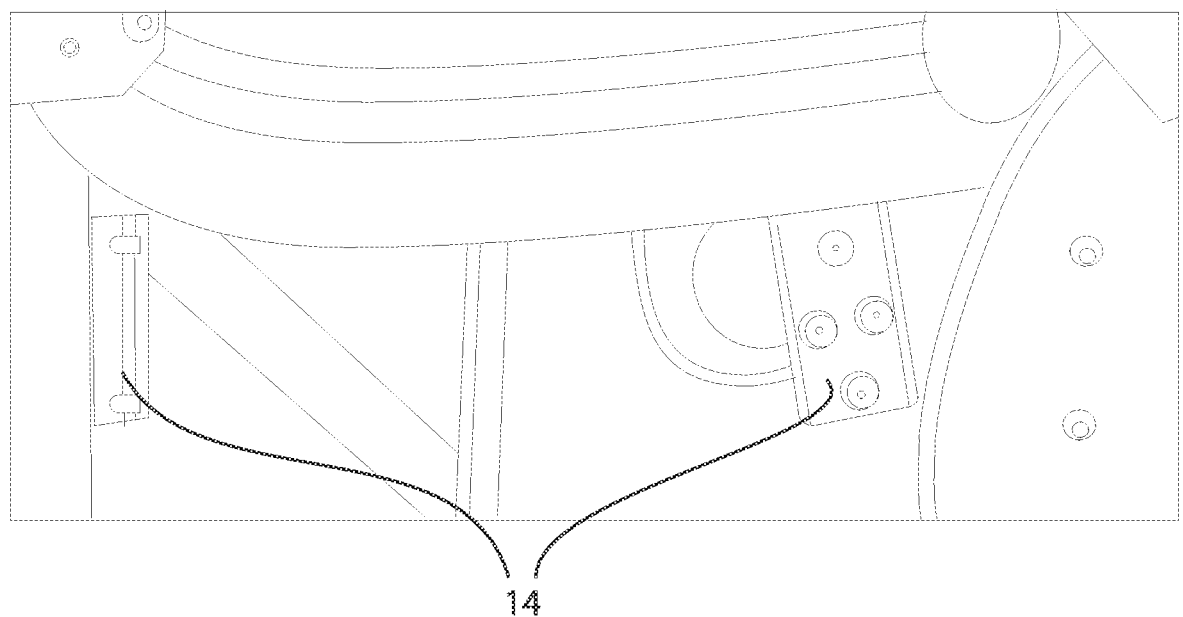
FIG. 25 is a perspective view of the power source recharging unit, in accordance with a non-limiting exemplary embodiment of the present disclosure.
Figure 26:
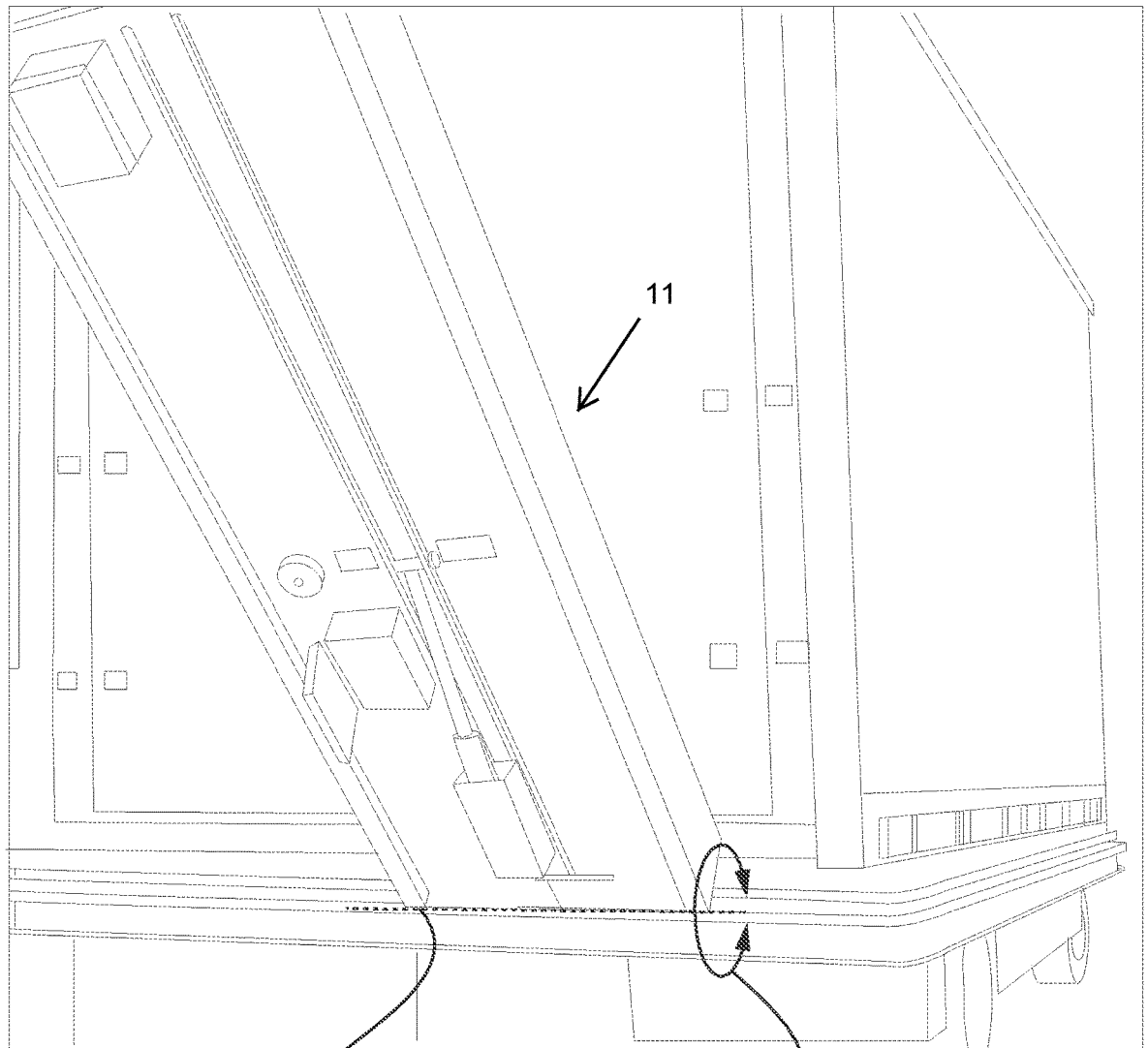
FIG. 26 is yet another enlarged perspective view of the ramp partially lowered from a raised vertical position, in accordance with a non-limiting exemplary embodiment of the present disclosure.
Figure 27:
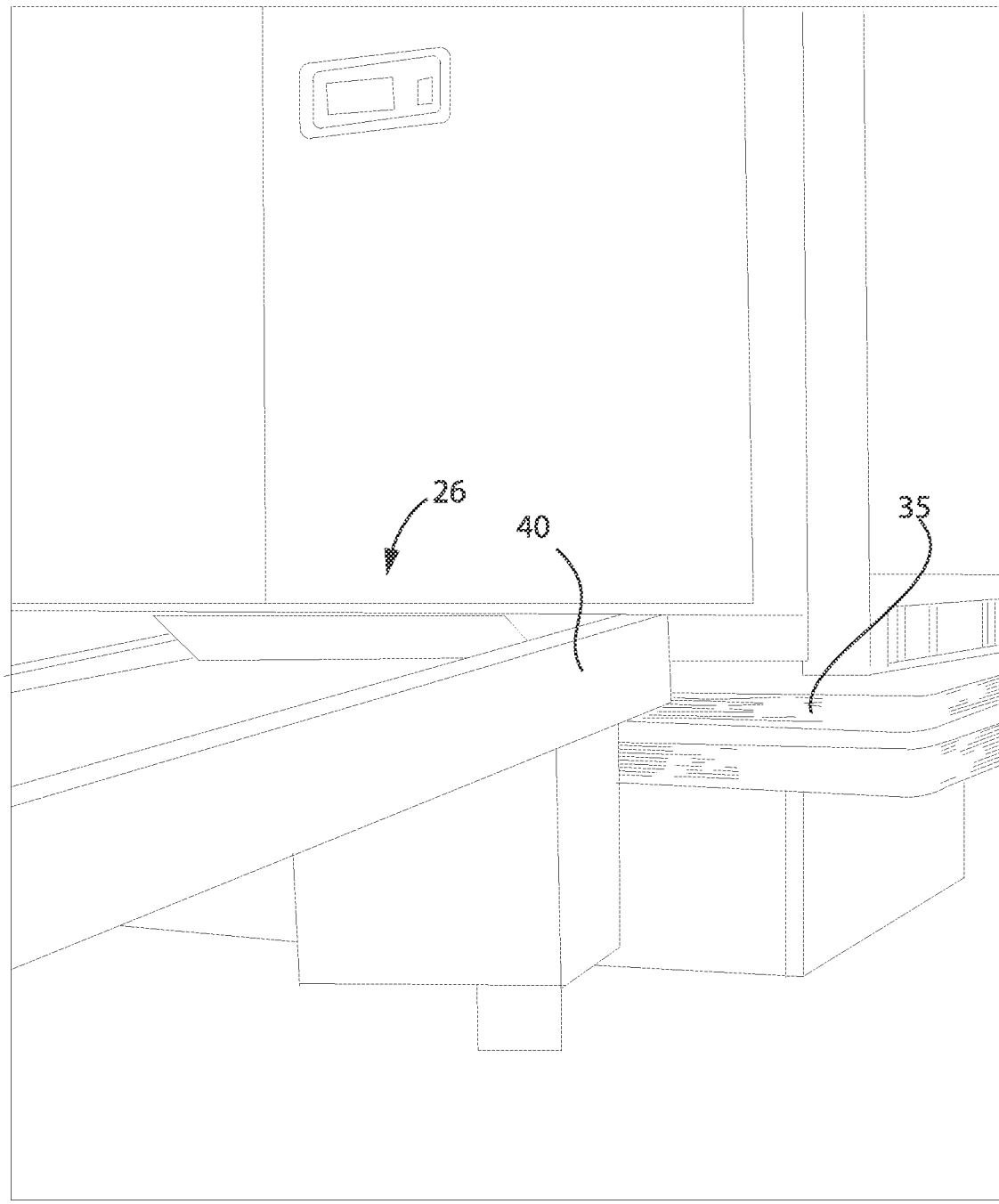
FIG. 27 is yet another enlarged perspective view of the ramp lowered to a horizontal position at the cargo container doors at a rear of the vehicle, in accordance with a non-limiting exemplary embodiment of the present disclosure.
Figure 28:
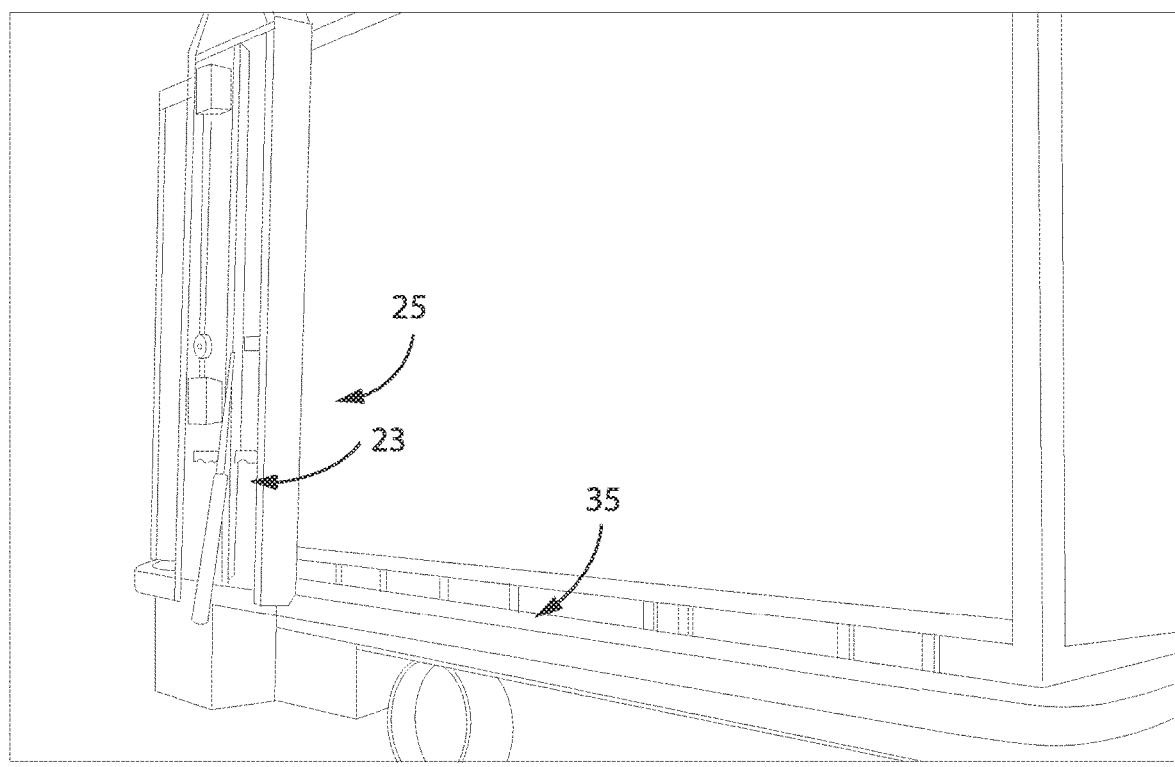
FIG. 28 is yet another enlarged perspective view of the ramp displaced along the perimeter of the guide rail away from its resting location, in accordance with a non-limiting exemplary embodiment of the present disclosure.
Figure 29:
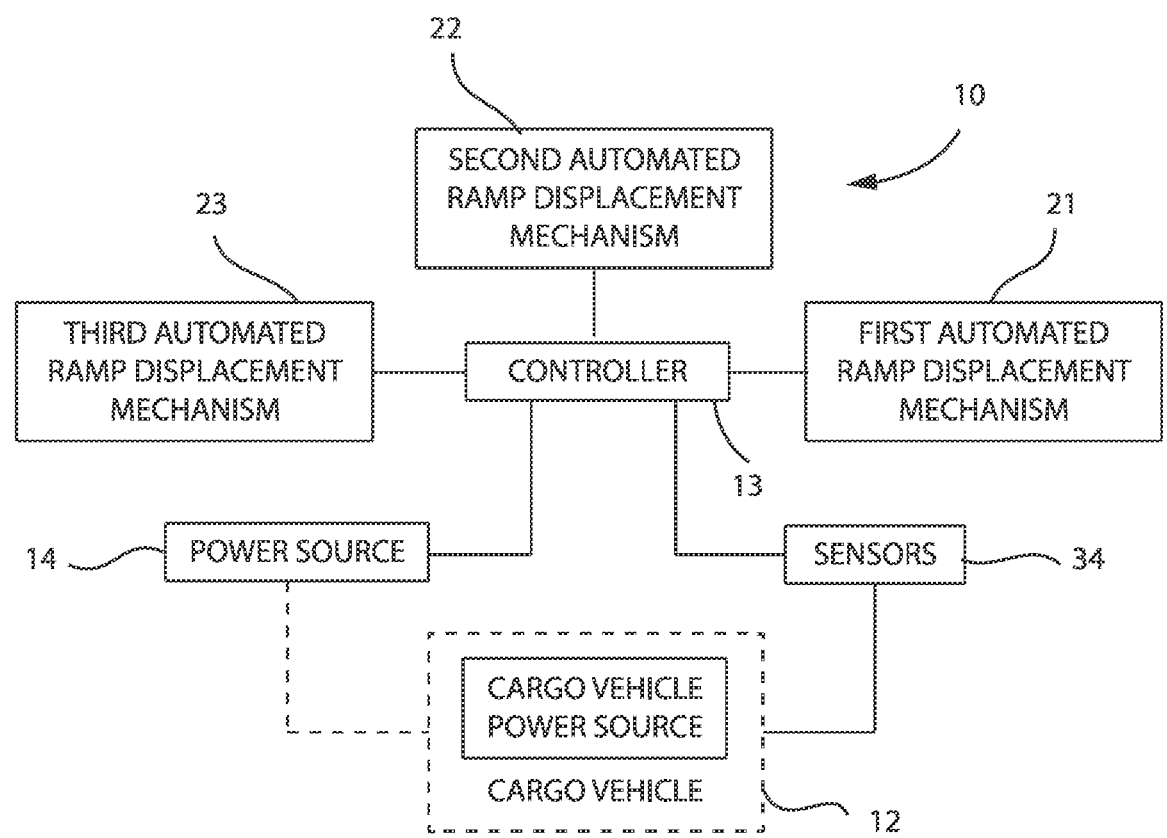
FIG. 29 is block diagram illustrating the interrelationship between some of the major electronic components, in accordance with a non-limiting exemplary embodiment of the present disclosure.
Figure 30:
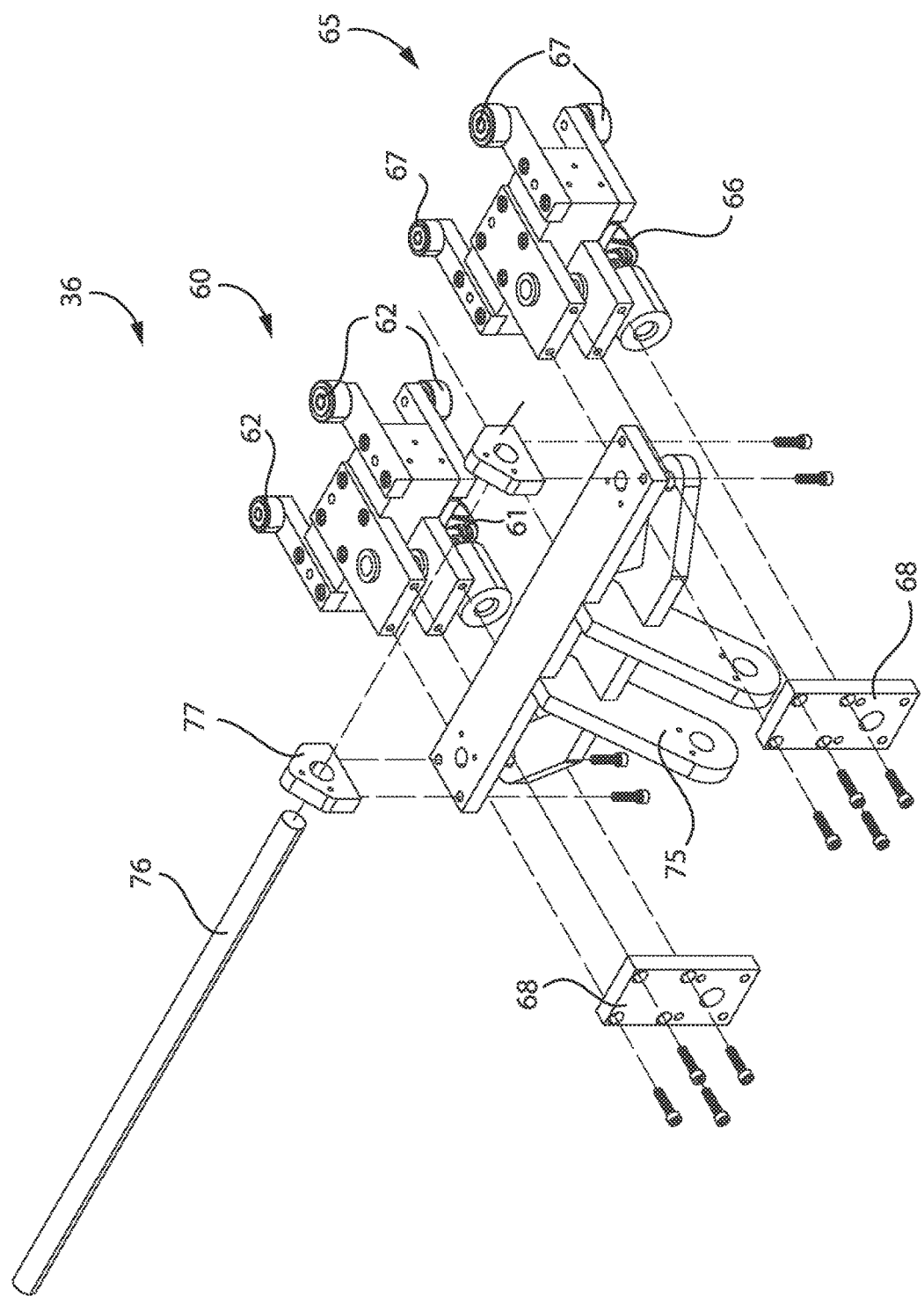
FIG. 30 is an exploded view of the trolley, in accordance with a non-limiting exemplary embodiment of the present disclosure.

The non-limiting exemplary embodiment(s) is/are referred to generally in FIGS. 1-101 and is/are intended to provide a multi-functional cargo transport vehicle 12 including an automated ramp deployment system 10 for facilitating a ramp 11 to traverse at least a portion bed of cargo transport vehicle 12 from a passenger side front, to a rear, to a driver side front and back, to a docking station behind the vehicle 12 on the passenger side. The ramp 11 is preferably electrically operated and rechargeable from a 120 v power source. The ramp 11 is preferably telescopic and can extend and retract from 8 ft to 13 ft in length, for example. The ramp 11 may be built from 100% aluminum.

In a non-limiting exemplary embodiment, the cargo transport vehicle 12 will not start if the ramp 11 is not secured into the docking station behind the cab of the truck 12. The ramp 11 will not traverse left/right after being lowered until returned to its upright position. The ramp 11 surface is non-slip for safe loading. The ramp 11 will not extend until it is below parallel to the ground to reduce risk of hitting overhead objects (e.g., trees, power lines etc.). When raising the ramp 11 up, it will also auto retract, again eliminating the risk of hitting objects overhead. Once the ramp 11 touches the ground, safety lights mounted and the top and bottom of the ramp 11 will flash to ensure visibility at night.

Non-limiting exemplary embodiments of the present disclosure are referred to generally in FIGS. 1-101 and is intended to provide an automated cargo vehicle 12 ramp 11 deployment system 10 for configured to selectively displace a ramp 11 11 along a perimeter of a cargo vehicle 12 12 during loading and unloading operating conditions. It should be understood that the exemplary embodiment(s) may be used with a variety of cargo vehicles 12 (trucks, vans, etc.), and should not be limited to any particular cargo vehicle 12 described herein.

Referring to FIGS. 1-101 in general, in a non-limiting exemplary embodiment(s), the automated cargo vehicle 12 may be employed by a self-storage service provider. For example, when a customer is ready to store cargo, simply schedule a time to come pick up a cargo vehicle 12, with the size storage unit you want, from a closest service provider. Access the self-service lot with a personalized gate code and your vehicle 12 with storage unit will be there waiting for the customer. The cargo vehicles 12 have driver assist safety features, so you'll feel safe and confident on the road. Simply drive home the cargo vehicle 12, load it up, lock it up, and bring it back to the service provider lot. A monitoring system notifies the service provider when you've returned, and they come right away and take your cargo unit to an indoor climate controlled central storage facility. Customers can visit their stuff whenever they like. Just let the service provider know and they will bring it out to the self-service lot so the customer can spend some quality time. When the customer is finally ready to pick up and unload the cargo unit, just schedule a time and the service provider will have it all ready for the customer at a closest service provider lot. Drive it home, unload and bring it back.

Referring to FIGS. 1-101 in general, the automated cargo vehicle ramp deployment system 10 selectively displaces a ramp 11 along a perimeter of an existing cargo vehicle 12 during loading and unloading operating conditions. Such an automated cargo vehicle ramp deployment system 10 includes a controller 13 and a power source 14 connected thereto, a ramp 11 located at the existing cargo vehicle 12, a first automated ramp displacement mechanism 21 for configured to selectively displace the ramp 11 from a first position 24 to a second position 25 defined along a perimeter of the existing cargo vehicle 12 while the ramp 11 is maintained at a vertically oriented position (upright), a second automated ramp displacement mechanism 22 for configured to selectively displace the ramp 11 from one of the first position 24 and the second position 25 to a third position 26 (lowered position), and a third automated ramp displacement mechanism 23 for selectively adjusting a longitudinal length of the ramp 11 while the ramp is statically disposed at a third position 26. Such a third position 26 is a non-vertically oriented position (e.g., horizontal or declined position). Advantageously, each of the first automated ramp displacement mechanism 21, the second automated ramp displacement mechanism 22, and the third automated ramp displacement mechanism 23 is operatively coupled to the controller 13 and the power source 14.

In a non-limiting exemplary embodiment, a first automated ramp displacement mechanism 21 is configured to displace the ramp 11 along a first travel path 31 defined along a perimeter of the existing cargo vehicle 12. Advantageously, the second automated ramp displacement mechanism 22 is configured to articulate the ramp 11 along a second travel path 32 defined about a fulcrum axis 45. Advantageously, third automated ramp displacement mechanism 23 is configured to displace the ramp 11 along a third travel path 33 defined along a longitudinal length of the ramp 11.

In a non-limiting exemplary embodiment, the controller 13 includes a plurality of sensors 34 operably coupled to the existing cargo vehicle 12 and the ramp 11. Such sensors 34 are configured to detect operating parameters (drive, park, neutral) at the existing cargo vehicle 12 and thereby generate and transmit corresponding notification signals to the controller 13. Advantageously, the controller 13 is configured to enable and disable the user interface upon receiving a corresponding one of the notification signals, respectively, such that each of the first automated ramp displacement mechanism 21, the second automated ramp displacement mechanism 22, and the third automated ramp displacement mechanism 23 are enabled and disabled, respectively.

In a non-limiting exemplary embodiment, the controller 13 may include programmable software 90 that is launched on a portable electronic device (e.g., mobile phone) for receiving the user input and operating the system 10. A user interface may be displayed at the controller 13, such as a graphical user interface.

In a non-limiting exemplary embodiment, the power source 14 is operably coupled to an existing power source (e.g., battery, generator, alternator, etc.) of the existing cargo vehicle 12 such that the power source 14 can be recharged as needed.

In a non-limiting exemplary embodiment, the first automated ramp displacement mechanism 21 includes a guide rail 35 suitably sized and shaped to extend along a perimeter of the existing cargo vehicle 12, a trolley (car) 36 operably attached to the ramp 11 and having a plurality of rollers 37 rotatably engaged with the guide rail 35, and at least one winch 38 having an associated cable 39 operably coupled thereto and positioned along the guide rail 35. Advantageously, the at least one winch 38 is coupled to the car 36. In this manner, the at least one winch 38 is configured to wind and unwind the associated cable 39 and thereby displace the car 36 in a corresponding direction along the guide rail 35, which is extended along the perimeter of the existing cargo vehicle 12. Advantageously, the trolley 36 and the ramp 11 are simultaneously displaced between the first position 24 and the second position 25.

In a non-limiting exemplary embodiment, a motorized gear and chain mechanism or self-propelled mechanism may be employed to displace the ramp along the perimeter of the cargo vehicle 12. It is noted that the true spirit and scope of the present disclosure should not be limited by any particular drive mechanism for displacing the ramp 11 along the guide rail 35. The drive mechanism may be powered or manual, but preferably powered so that safety protocols can be programmed at the controller for limiting unsafe ramp displacement.

In a non-limiting exemplary embodiment, the at least one winch 38 includes a first winch 38a and a second winch 38b in communication therewith. Advantageously, the associated cable 39 includes a first associated cable 39a and a second associated cable 39b in communication therewith and configured in a substantially figure-eight pattern for pulling the car 36 in opposed directions along the guide rail 35 while prohibiting the first associated cable 39a and the second associated cable 39b from being undesirably tangled.

In a non-limiting exemplary embodiment, the guide rail 35 is extended along at least one side of the cargo vehicle 12.

In a non-limiting exemplary embodiment, the guide rail 35 is extended along at least two sides of the cargo vehicle 12.

In a non-limiting exemplary embodiment, the guide rail 35 is extended along at least three sides of the cargo vehicle 12.

In a non-limiting exemplary embodiment, the second automated ramp displacement mechanism 22 further includes an articulation mechanism (e.g., actuator, hydraulic or pneumatic piston, etc.) operably coupled to the car 36 and the ramp 11 for selectively articulating the ramp 11 between the vertically oriented raised position and the non-vertically oriented position defined below (e.g., declined to the ground surface) a horizontal position relative to the vertically oriented raised position.

In a non-limiting exemplary embodiment, the ramp includes a female section 40 and a male section 41 slidably engaged therewith. Advantageously, the third automated ramp displacement mechanism 23 including a ram operably engaged with the female section 40 and the male section 41 and configured to selectively extend and retract the longitudinal length of the ramp 11.

The present disclosure further includes a method of utilizing an automated cargo vehicle ramp deployment system 10 for configured to selectively displace a ramp 11 along a perimeter of an existing cargo vehicle 12 during loading and unloading operating conditions. Such a method includes the steps of: providing a controller 13 and a power source 14 connected thereto; providing and locating a ramp 11 at the existing cargo vehicle 12; providing a first automated ramp displacement mechanism 21; providing a second automated ramp displacement mechanism 22; providing a third automated ramp displacement mechanism 23; operatively coupling each of the first automated ramp displacement mechanism 21, the second automated ramp displacement mechanism 22, and the third automated ramp displacement mechanism 23 to the controller 13 and the power source 14; the first automated ramp displacement mechanism 21 configured to selectively displace the ramp 11 from a first position 24 to a second position 25 defined along a perimeter of the existing cargo vehicle 12 while the ramp is maintained at a vertically oriented position; the second automated ramp 11 displacement mechanism 22 configured to selectively displace the ramp 11 from one of the first position 24 and the second position 25 to a third position 26, wherein the third position 26 is a non-vertically oriented position; and the third automated ramp displacement mechanism 23 selectively adjusting a longitudinal length of the ramp 11 while the ramp 11 is statically disposed at a third position 26.

During experimentation, many configurations and ramp manufacturers were considered until it was finally decided to design a proprietary ramp 11 and associated displacement mechanisms 21, 22, 23. The biggest challenge was making it easy for anyone in any physical condition to both deploy and stow the ramp. In particular, the system 10 stows the ramp 11 in a vertical position behind the cab behind the passenger's seat but it could also be stored behind the driver's side of the cab. The operator is presented with a security keypad, primarily intended to make the system 10 child safe. Once the correct code is entered, the operator can transition the ramp 11 in front of a cargo vehicle 12 door of his/her choosing. There are numerous safety features incorporated into the system 10. For instance, once the ramp 11 is initially moved, the vehicle can no longer be started. Additionally, once the ramp 11 starts to be lowered it can no longer traverse to the next-door position. And of course, there are warning lights and audible signals that activate when appropriate. All of this results in the safe and effortless movement of the ramp 11.

To accomplish displacement of the ramp 11 in a variety of directions, a guide rail 35 and car 36 was developed that could traverse a two-hundred pound plus ramp 11 around a perimeter of the cargo vehicle 12 (vehicle bed) including the corners. The system 10 allows the two-hundred-pound ramp 11 to telescope out to about 14 feet while remaining parallel to the ground, all of which exerts tremendous leverage against the system 10. To displace, and raise or lower the ramp 11, hydraulic, pneumatic, gear, and/or ram mechanisms may be employed. It is noted that the specific mechanisms to articulate and extend the ramp 11 is not intended to limit the true scope and spirit of the present disclosure. Of course, a variety of ramp lengths can be employed such as a ramp 11 that can range between twelve and sixteen feet.

In a non-limiting exemplary embodiment, the two-hundred-pound telescoping ramp 11 may be extendable from about seven to fourteen feet in longitudinal length. Power-actuated and automated car 36 and rail 35 mechanism 21 displaces the ramp 11 along at least a portion and preferably an entire perimeter of the cargo vehicle 12 is also advantageous. The controller 13 includes a user interface for receiving a plurality of user inputs that instruct various components of the system 10 to operate in a desired mode. For example, the controller 13 deploys the ramp 11 along the perimeter of the vehicle 12 and to a desired position adjacent to the vehicle 12 loading doors, which may be located at one or more sides of the vehicle 12. Selective powered displacement of the ramp 11 enables loading and unloading of cargo relative to the vehicle 12.

In a non-limiting exemplary embodiment, the ramp 11 is fully automated by a cable-driven car 36 mechanism or other mechanism (first displacement mechanism) along a guide rail 35, and a telescopically actuated ram mechanism extends and retracts the ramp 11 between minimum and maximum longitudinal lengths, respectively.

In a non-limiting exemplary embodiment, winch 38 cables are connected to the other components. For example, the winch cable 39 is positioned along the guide rails 35 and attached to the car 36, which has rollers 37 wheels that roll along the guide rails 35.

In a non-limiting exemplary embodiment, a ramp 11 ram (third displacement mechanism) is operated by 12-volt linear actuators to extend and retract the longitudinal length of the ramp 11. Such components simplify the installation and maintenance while also giving a much cleaner presentation to the consumer. Of course, various displacement mechanisms (e.g., hydraulic pistons, pneumatic pistons, worm gears, pulleys, etc.) may be employed without departing from the true spirit and scope of the present disclosure.

Advantageously, while ramp 11 is docked, the cargo vehicle 12 will start and the ramp 11 is connected to a proprietary automatic, shock proof, charging system 10 as shown in the figures. Keypad code entry is required to activate the various ramp 11 displacement mechanisms. This provides a child safety feature. The keypad and system 10 deactivate in about 4.5 min+/−. The access code needs to be reentered every time the ramp 11 position is changed. Once activated, the ramp 11 will only move out of the docking station, all other buttons are inactive. When any button is pressed, the lights will flash, and the horn will sound warning bystanders.

Once the ramp 11 exits the docking station, all buttons begin to work. The automatic, proprietary, charging system 10 disconnects and deactivates. Now, the cargo vehicle 12 will no longer start. The ramp 11 can be traversed around the entire vehicle bed but will automatically stop prior to reaching the end nearest the driver's door. The ramp 11 can be lowered at any position along the vehicle bed. Once the ramp 11 begins to lower, it can no longer traverse. It cannot be extended until it is approximately level with the ground. Once the ramp 11 is approximately level with the ground, it may be extended to the desired length. While on the ground, a second set of lights at the tip of the ramp 11 start to flash, warning of a trip hazard. If the customer tries to "ride" the ramp 11 or lift a heavy item, the hydraulic unit will sense it and bypass the system 10. The deployment process should be reversed to return the ramp 11 to its docking station. However, if the customer attempts to raise the ramp 11 prior to retracting it, the ramp 11 will automatically retract. Once the ramp 11 is fully raised it can be traversed back to is docking station. The ramp 11 will automatically stop when docked and reconnect itself to the charging station. The vehicle will now start.

In a non-limiting exemplary embodiment, the controller 13 may be programmed to automatically dock the ramp 11 via a single user input (e.g., single button).

Referring to FIGS. 1-101 in general, a cargo transport vehicle 12 is disclosed, which includes at least one cargo transport container 55, a ramp 11, a ramp deployment system 10 operably coupled to the ramp 11 and configured to selectively displace the ramp 11 along a perimeter 56 of the at least one cargo transport container 55, a controller 13, and a power source 14 in communication with the ramp deployment system 10. Advantageously, the ramp deployment system 10 is configured to selectively displace the ramp 11 along at least one of a first travel path 31 defined along a perimeter 56 of the at least one cargo transport container 55, a second travel path 32 defined about a fulcrum pivot axis 45 adjacent to the at least one cargo transport container 55, and a third travel path 33 defined along a longitudinal length of the ramp 11 and exterior of the at least one cargo transport container 55. Such a structural configuration provides the new, useful, and unexpected result of enabling a user to safely and succinctly displace the ramp 11 to a desired position along a perimeter of the cargo transport container 55 proximate to an access door 98 thereof, as well as lower the ramp 11 and extend/retract the ramp 11, as needed, and without exerting undue energy.

In a non-limiting exemplary embodiment, the ramp deployment system 10 includes a first ramp displacement mechanism 21 configured to selectively displace the ramp 11 from a first position 24 to a second position 25 defined along the first travel path 31. For example, the ramp 11 may be displaced from an initial resting position to a final position in front of an access door 98. As another non-limiting example, ramp 11 may be displaced from around a corner segment of the guide rail 35 to a linear segment of the guide rail 35. The ramp 11 is preferably in a vertical orientation during displacement between positions 24 and 25. Such a structural configuration provides the new, useful, and unexpected result of enabling a user to safely and succinctly displace the ramp 11 to a desired position along a perimeter of the cargo transport container 55 proximate to an access door 98 thereof while the ramp is in a vertical position (e.g., from a left side to a rear of the cargo transport container).

In a non-limiting exemplary embodiment, the ramp deployment system 10 further includes a second ramp displacement mechanism 22 configured to selectively displace the ramp 11 from one of the first position 24 and the second position 25 to a third position 26 (e.g., non-vertical position such as horizontal and declined positions) defined along the second travel path 32. Such a structural configuration provides the new, useful, and unexpected result of enabling a user to safely and succinctly displace the ramp 11 to a desired position along a perimeter of the cargo transport container 55 proximate to an access door 98 thereof, (e.g., lower the ramp 11 from a vertical position to a lowered position for loading/unloading cargo), as needed, and without exerting undue energy.

In a non-limiting exemplary embodiment, the ramp deployment system 10 further includes a third ramp displacement mechanism 23 configured to selectively adjust a longitudinal length of the ramp 11 along the third travel path 33 while the ramp 11 is disposed at the third position 26 (e.g., lengthen/shorten the ramp 11 for uneven ground surfaces such as when the ramp 11 is rested on a stairway, street curb, unloading dock, etc.). Such a structural configuration provides the new, useful, and unexpected result of enabling a user to safely and succinctly extend/retract the ramp 11, as needed, and without exerting undue energy.

Notably, each of the first ramp displacement mechanism 21, the second ramp displacement mechanism 22, and the third ramp displacement mechanism 23 is operatively coupled to the controller 13 and the power source 14, such that a user is able to selectively control the movement of the ramp 11 as desired at the cargo transport container 55. The controller 13 preferably includes a processor and memory containing software instructions executable by the processor in response to a user input. The guide rail 35 may have a support frame 85 that sits on the vehicle 12 chassis or bed for receiving and supporting at least one cargo transport container 55 thereon via a fastening mechanism 86 (e.g., ratchets, anchor bars, straps, etc.). Of course, a variety of suitable fastening mechanism may be employed to anchor the cargo transport container 55 to the support frame 85. Such a structural configuration provides the new, useful, and unexpected result of enabling a user to safely and remotely control ramp 11 movement, as needed, and without exerting undue energy.

In a non-limiting exemplary embodiment, the first ramp displacement mechanism 21 includes a guide rail 35 attached to at least a portion of a perimeter 56 of the existing cargo transport vehicle 12 (via support frame 85), a trolley 36 operably attached to the ramp 11 and having a plurality of rollers 37 rotatably engaged with the guide rail 35, and at least one drive motor 58 operably coupled to the trolley 36 and positioned along the guide rail 35. Advantageously, the at least one drive motor 58 is configured to displace the trolley 36 in a forward and opposed rearward direction along the guide rail 35. Such a structural configuration provides the new, useful, and unexpected result of enabling a user to safely and succinctly displace the ramp 11 to a desired position along a perimeter of the cargo transport container 55 proximate to an access door 98 thereof, (e.g., displace the ramp around a corner of the guide rail), as needed, and without exerting undue energy.

In a non-limiting exemplary embodiment, the guide rail 35 includes an upper rail 35a and a lower rail 35b each operably coupled to the trolley 36. Such a structural configuration provides the new, useful, and unexpected result of enabling a user to maintain the trolley 36 securely engaged with the ramp 11.

Figure 31:
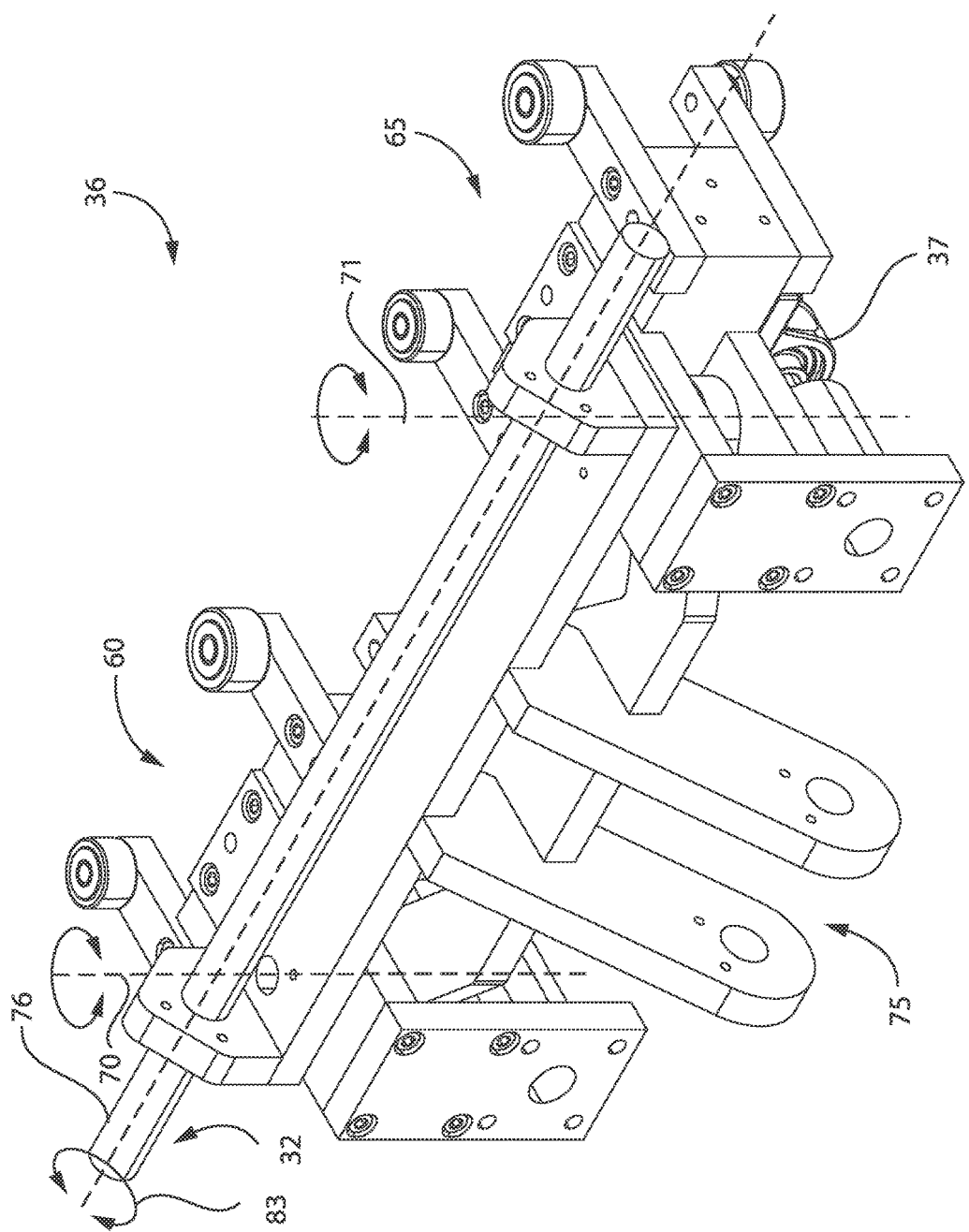
FIG. 31 is a perspective view of the trolley shown in FIG. 30, in accordance with a non-limiting exemplary embodiment of the present disclosure.
Figure 32:
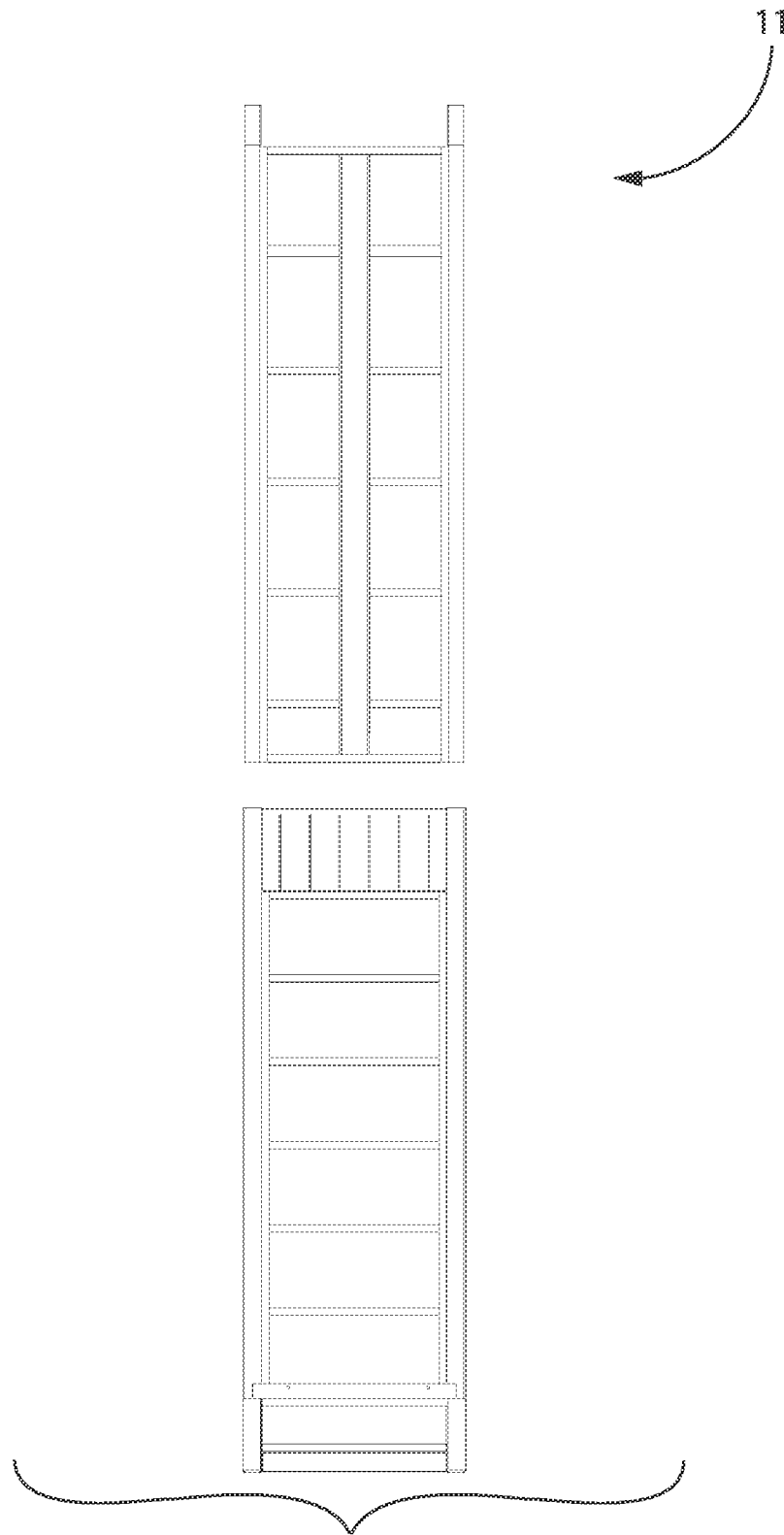
FIG. 32 is an exploded view showing a bottom side of the ramp, in accordance with a non-limiting exemplary embodiment of the present disclosure.
Figure 33:
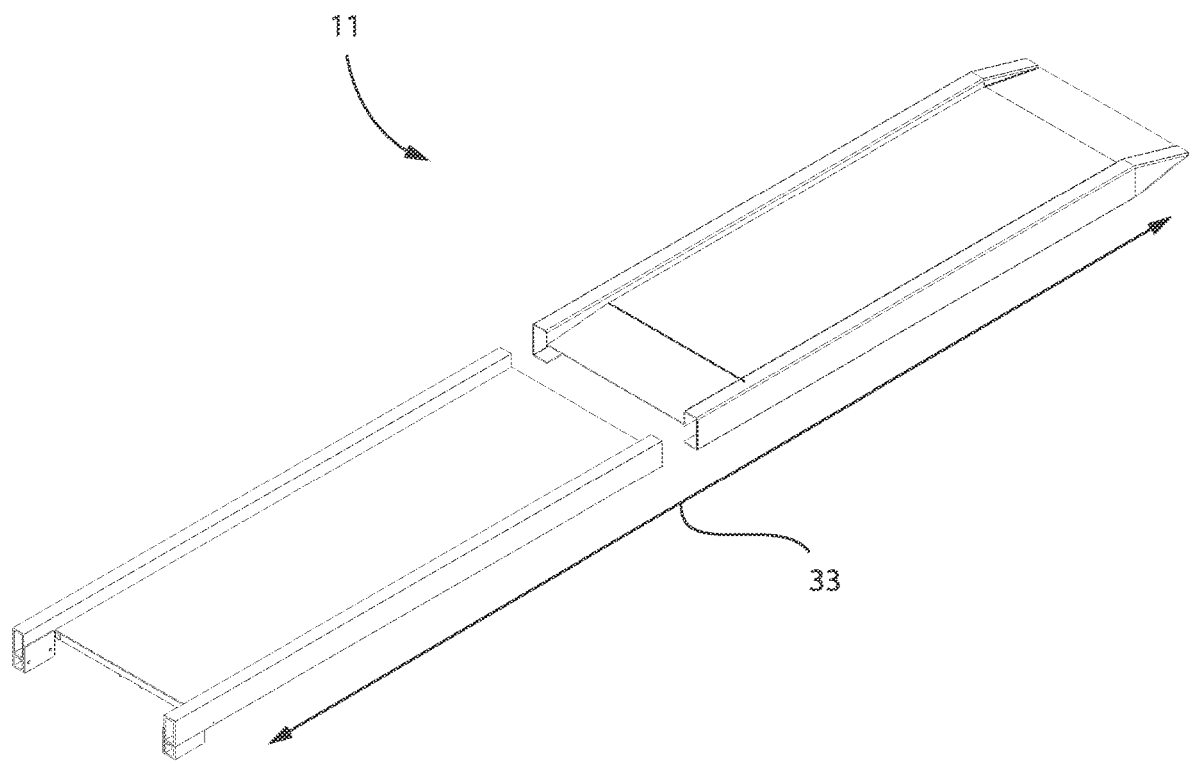
FIG. 33 is an exploded view showing a top side of the ramp, in accordance with a non-limiting exemplary embodiment of the present disclosure.
Figure 34:
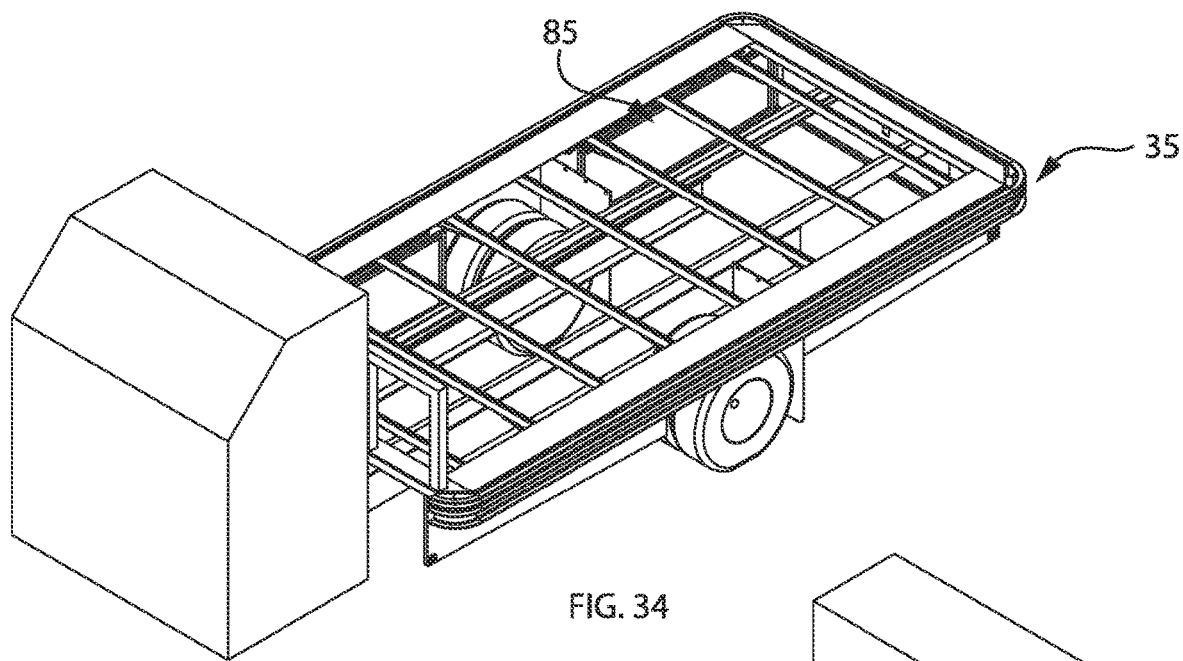
FIG. 34 is a perspective view of the guide rail attached to a perimeter of the cargo transport vehicle support frame, in accordance with a non-limiting exemplary embodiment of the present disclosure.
Figure 35:
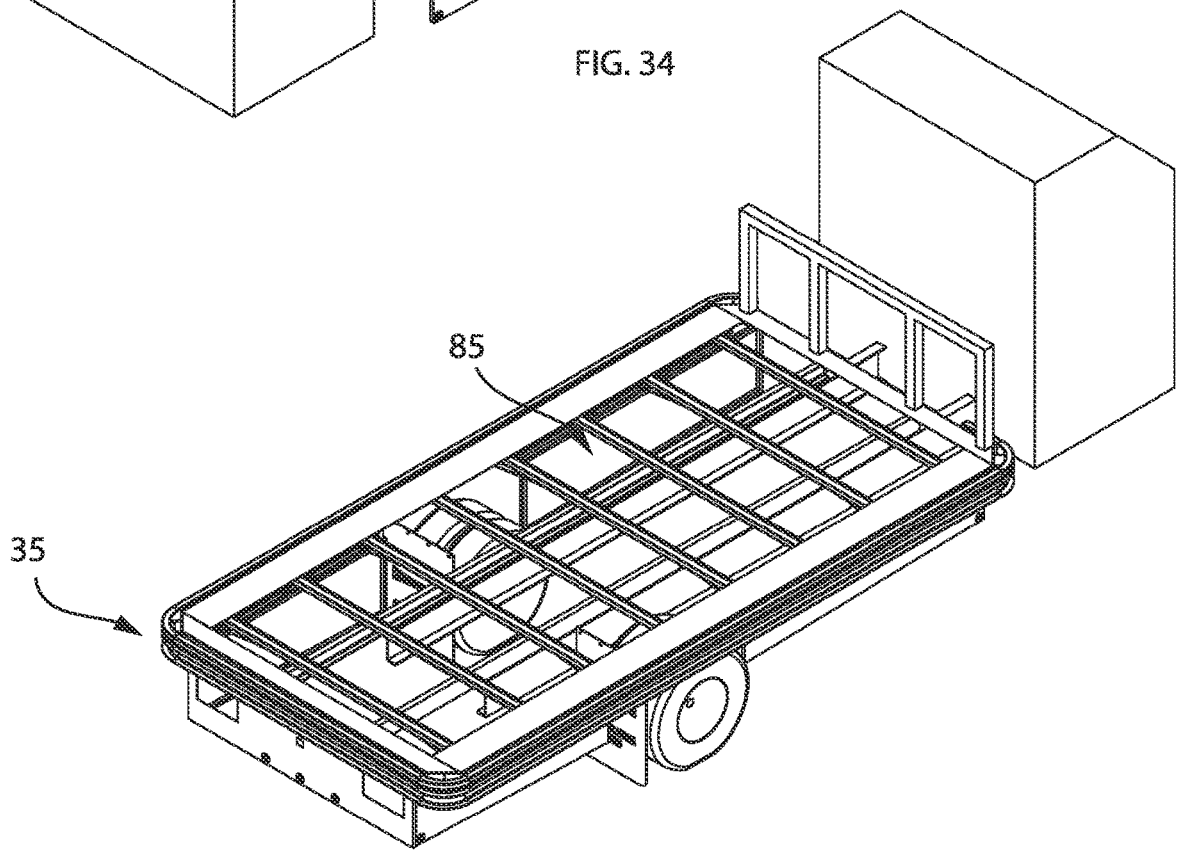
FIG. 35 is another perspective view of the guide rail attached to a perimeter of the cargo transport vehicle support frame, in accordance with a non-limiting exemplary embodiment of the present disclosure.
Figure 37:
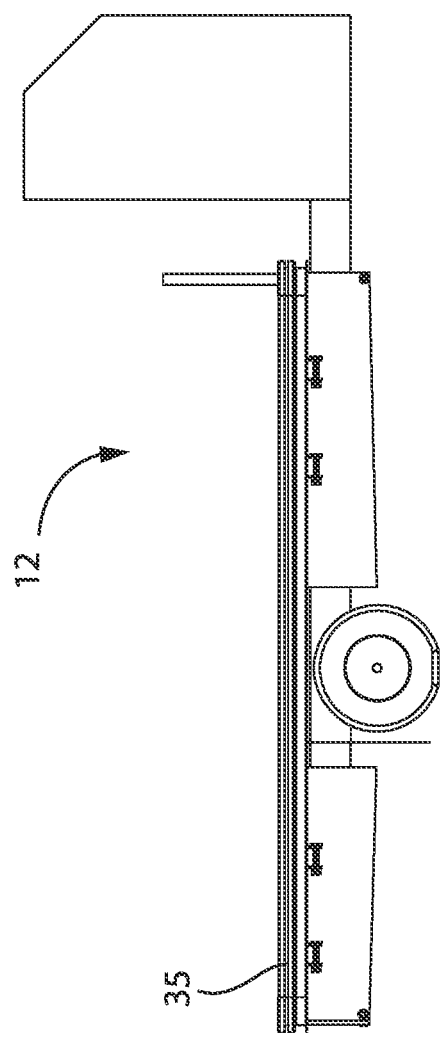
FIG. 37 is a side elevational view of the guide rail attached to a perimeter of the cargo transport vehicle support frame, in accordance with a non-limiting exemplary embodiment of the present disclosure.
Figure 36:
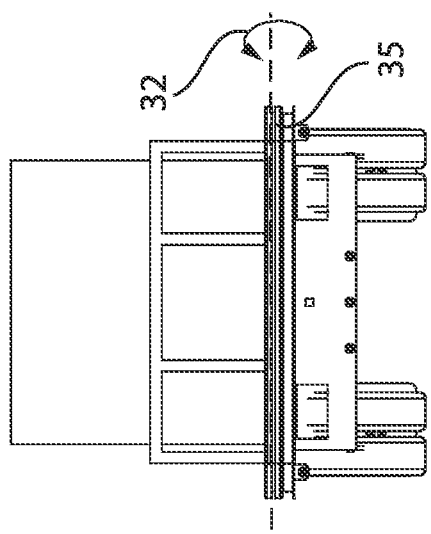
FIG. 36 is a rear elevational view of the guide rail attached to a perimeter of the cargo transport vehicle support frame, in accordance with a non-limiting exemplary embodiment of the present disclosure.
Figure 38:
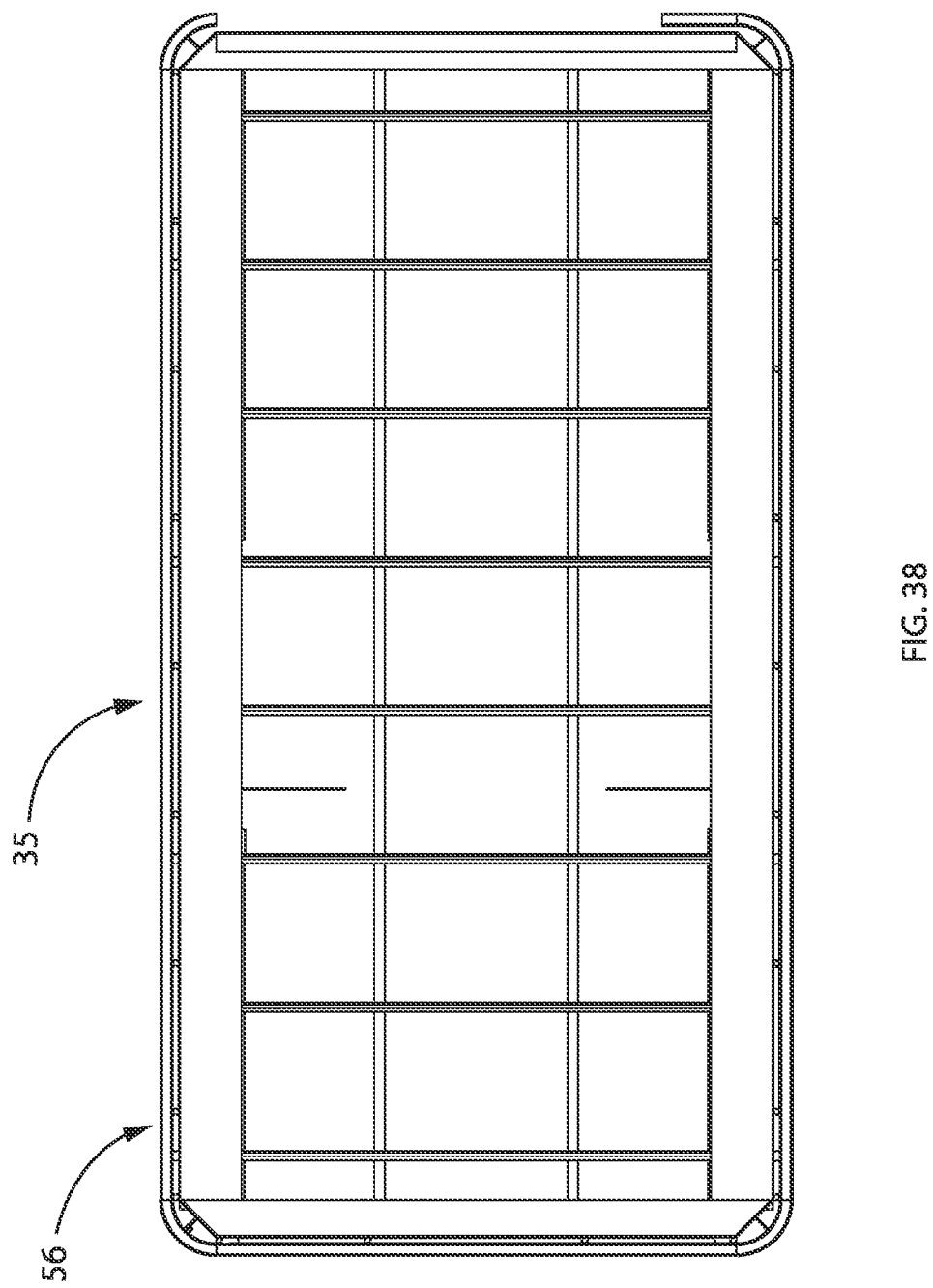
FIG. 38 is a top plan view of the guide rail attached to a perimeter of the cargo transport vehicle support frame, in accordance with a non-limiting exemplary embodiment of the present disclosure.
Figure 40:
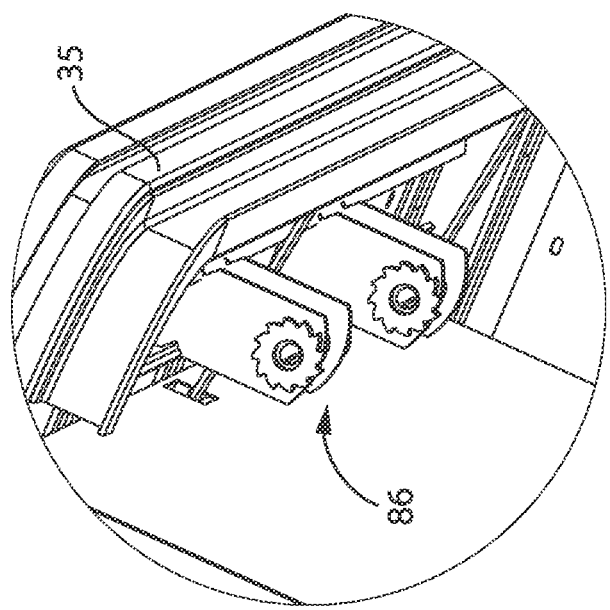
FIG. 40 is an enlarged view of section 40 taken in FIG. 39, in accordance with a non-limiting exemplary embodiment of the present disclosure.
Figure 39:
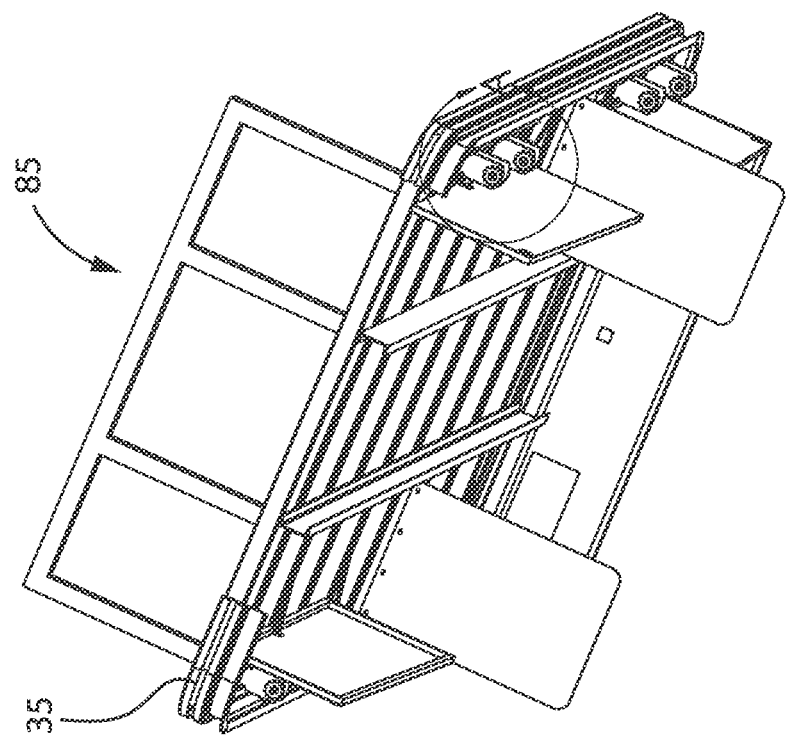
FIG. 39 is another perspective view of the guide rail attached to a perimeter of the cargo transport vehicle support frame, wherein ratchets and anchor bars are position underneath the support frame, in accordance with a non-limiting exemplary embodiment of the present disclosure.
Figure 41:
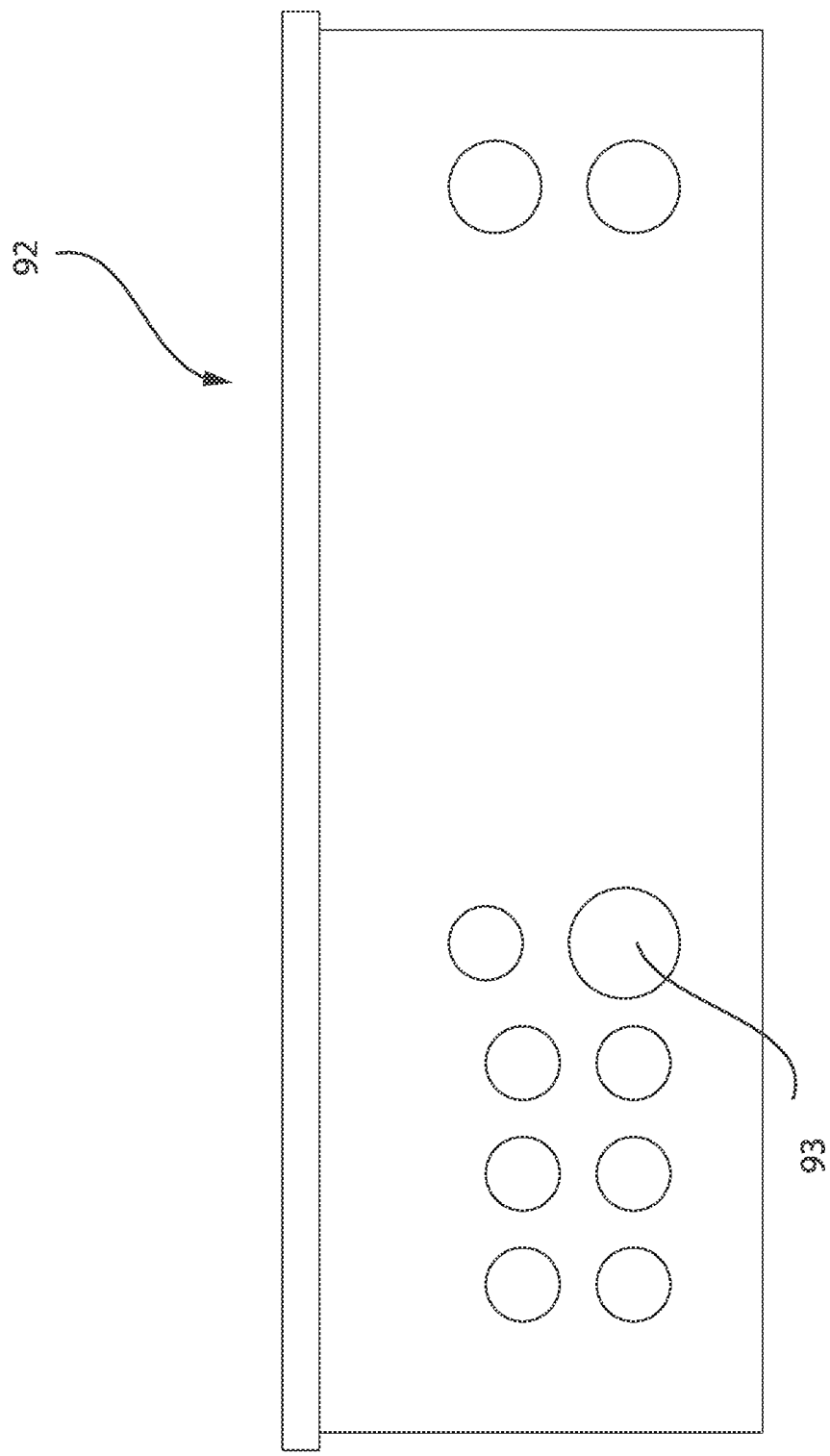
FIG. 41 is a side elevational view of a housing having apertures for receiving channeling electrical circuitry to various portions of the automated cargo transport system, in accordance with a non-limiting exemplary embodiment of the present disclosure.
Figure 98:
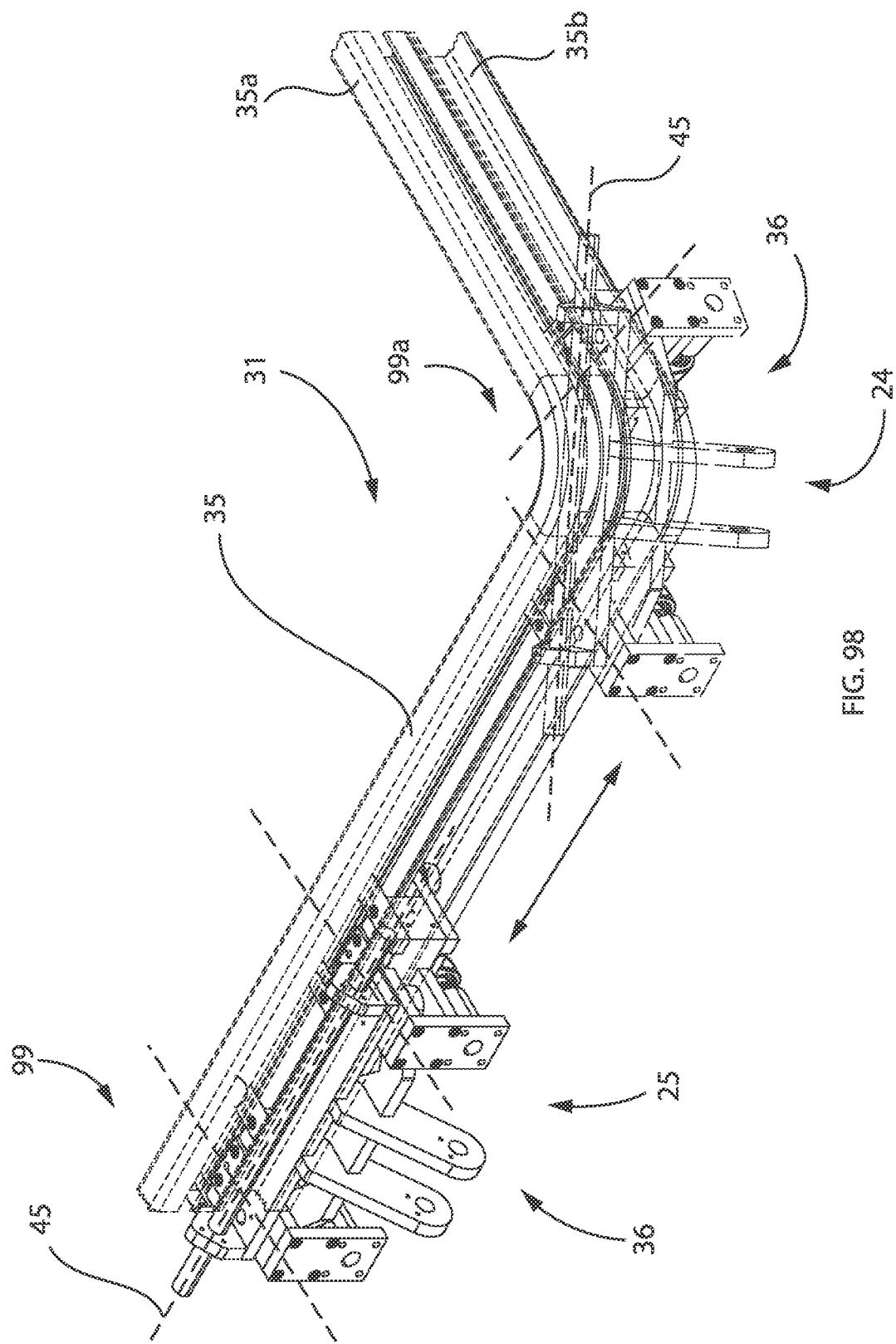
FIG. 98 is a perspective view showing an initial structure of the trolley as it travels along the linear portion of the guide rail relative to a morphed structure of the trolley as it travels along the curvilinear portion (corner) of the guide rail, in accordance with a non-limiting exemplary embodiment of the present disclosure.

In a non-limiting exemplary embodiment, the trolley 36 includes a first roller assembly 60 having a plurality of first bearings 61 and a plurality of first rollers 62, a second roller assembly 65 having a plurality of second bearings 66 and a plurality of second rollers 67, and a plurality of motor-mounting plates 68. Advantageously, the first roller assembly 60 and the second roller assembly 65 are independently pivoted along a first rotation axis 70 and a second rotation axis 71, respectively, while traveling around a corner of the guide rail 35 along the first travel path 31 (see FIGS. 31, 97-98). Notably, the first roller assembly 60 and second roller assembly 65 are registered orthogonal 99 relative to the fulcrum pivot axis 45 when the trolley 36 travels along a linear portion of the guide rail 35. Alternately, the first roller assembly 60 and second roller assembly 65 are registered at oblique angles 99a relative to the fulcrum pivot axis 45 when the trolley 36 travels along a curvilinear portion (corner) of the guide rail 35. Such a morphed shaped of trolley 36 allows the ramp 11 to travel along curvilinear and space-limited travel paths (e.g., the corner of the guide rail 35). Such a structural configuration provides the new, useful, and unexpected result of enabling a user to safely and succinctly displace the ramp 11 to a desired position along a perimeter of the cargo transport container 55 proximate to an access door 98 thereof, (e.g., displace the ramp around a corner of the guide rail), as needed, and without exerting undue energy.

In a non-limiting exemplary embodiment, the trolley 36 includes a center link bracket 75 intermediately disposed between the first roller assembly 60 and the second roller assembly 65. Such a structural configuration provides the new, useful, and unexpected result of enabling a user to safely and succinctly displace the ramp 11 to a desired position along a perimeter of the cargo transport container 55 proximate to an access door 98 thereof, (e.g., displace the ramp around a corner of the guide rail), as needed, and without exerting undue energy.

In a non-limiting exemplary embodiment, the second ramp displacement mechanism 22 includes a ramp pivot shaft 76 pivotally coupled to the trolley 36, a plurality of ramp pivot blocks 77 engaged with the ramp pivot shaft 76, a turn buckle 78 operably coupled to the center link bracket 75, and at least one actuator 79 (motor) operably coupled to the turn buckle 78. Advantageously, the ramp 11 is connected to the turn buckle 78 and the ramp pivot shaft 76 and rotates in clockwise and counterclockwise directions 83 about the fulcrum pivot axis 45 along the second travel path 32 for raising and lowering the ramp 11 between vertical and declined positions, respectively. Such a structural configuration provides the new, useful, and unexpected result of enabling a user to safely and succinctly displace the ramp 11 to a desired position along a perimeter of the cargo transport container 55 proximate to an access door 98 thereof, (e.g., lower the ramp 11 from a vertical position to a lowered position for loading/unloading cargo), as needed, and without exerting undue energy.

In a non-limiting exemplary embodiment, the third ramp displacement mechanism 23 includes a plurality of telescopically adjustable support legs 80 attached to the ramp 11, and a power-drive piston (motor) 82 operably coupled to the telescopically adjustable support legs 80. Advantageously, the telescopically adjustable support legs 80 are configured to selectively extend and retract a longitudinal length of the ramp 11 along the third travel path 33 upon receiving a user input at the controller 13. Such a structural configuration provides the new, useful, and unexpected result of enabling a user to safely and succinctly extend/retract the ramp 11 when the vehicle 12 is position on a non-horizontal surface, as needed, and without exerting undue energy.

Figure 42:
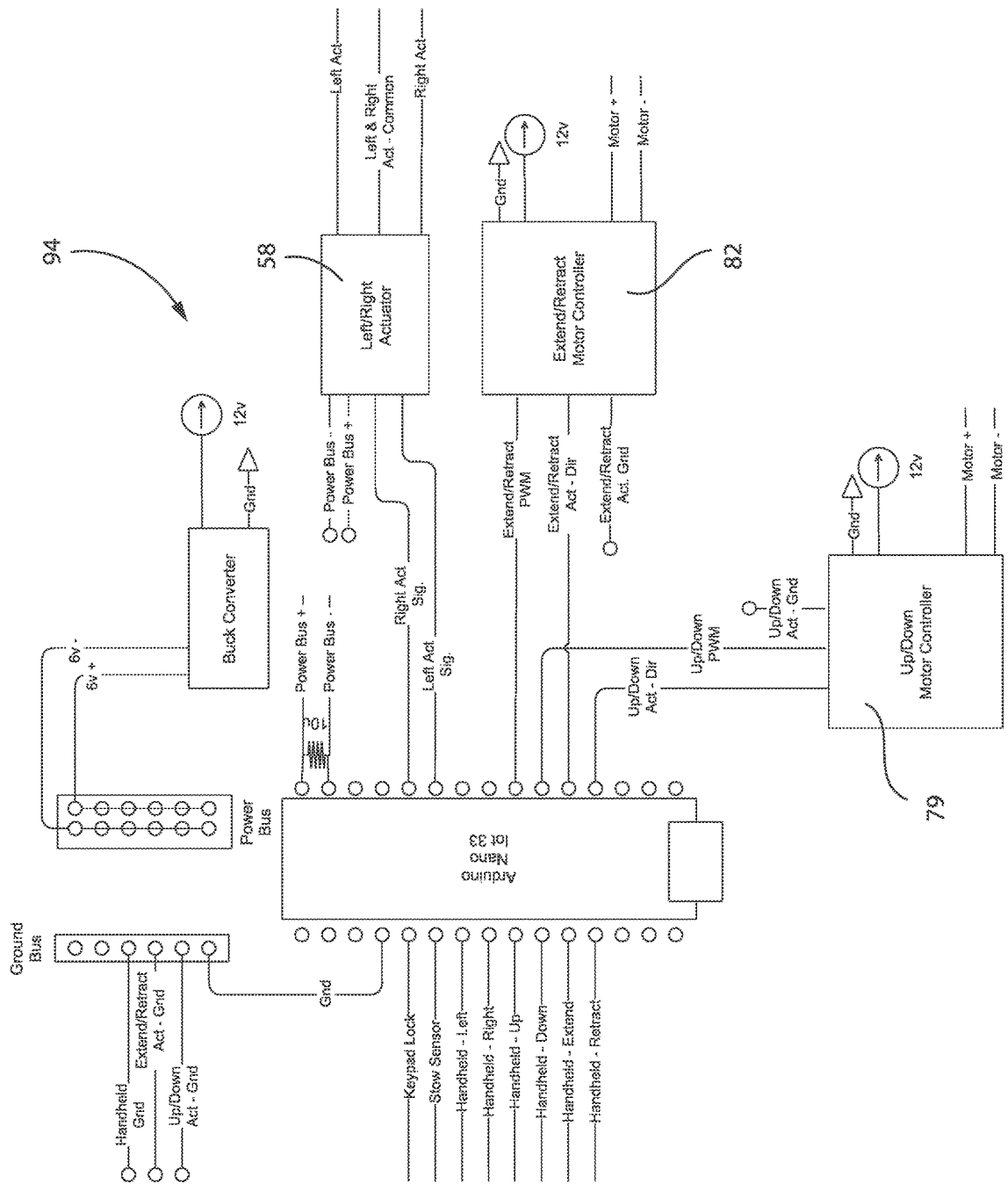
FIG. 42 is an electrical schematic diagram showing the interrelationship between some of the electrical wiring employed by the automated cargo transport system, in accordance with a non-limiting exemplary embodiment of the present disclosure.
Figure 43:
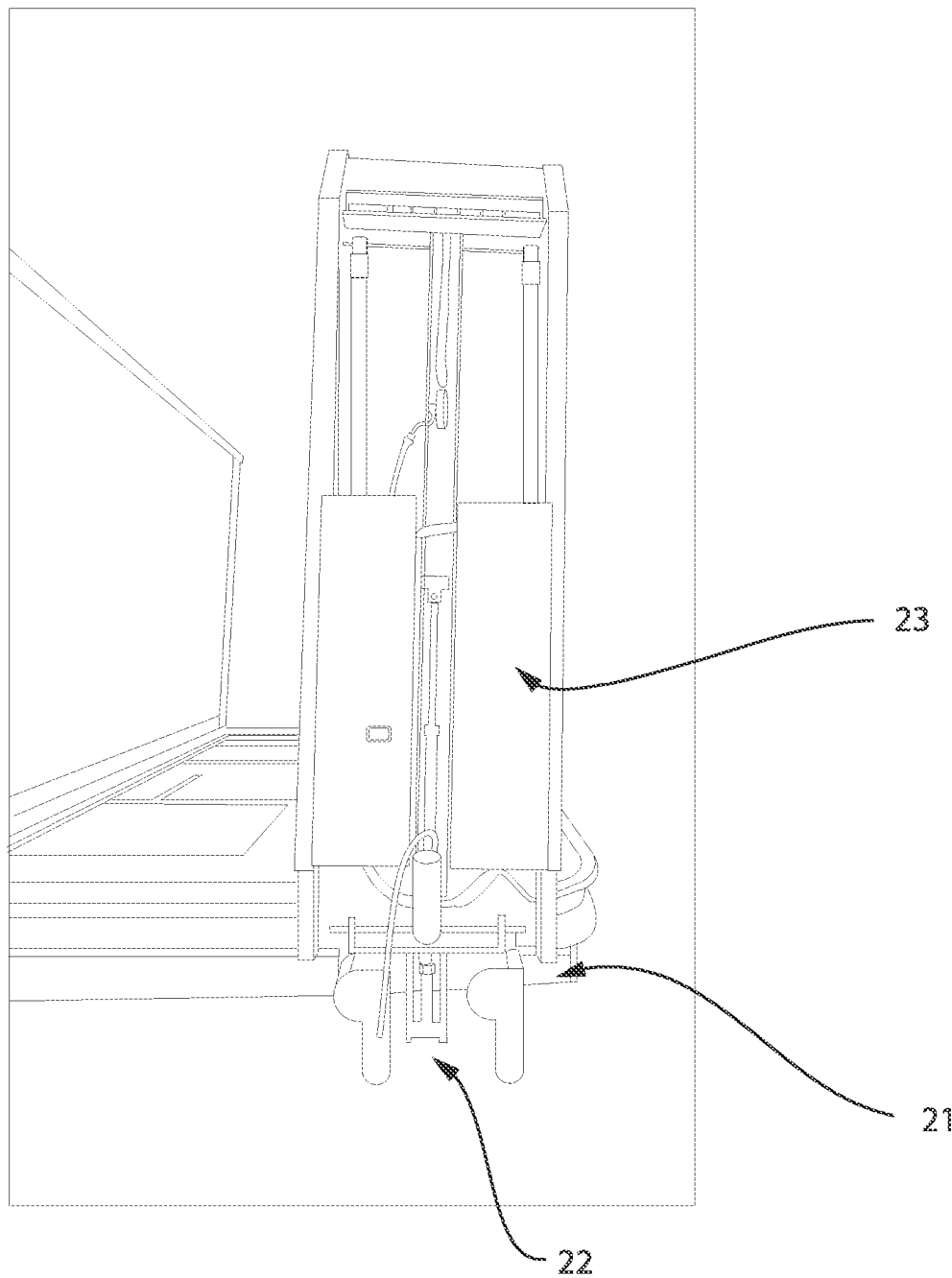
FIG. 43 is a side elevational view showing the ramp attached to the guide rail wherein a cargo container has been removed from the cargo transport vehicle support frame, in accordance with a non-limiting exemplary embodiment of the present disclosure.
Figure 44:
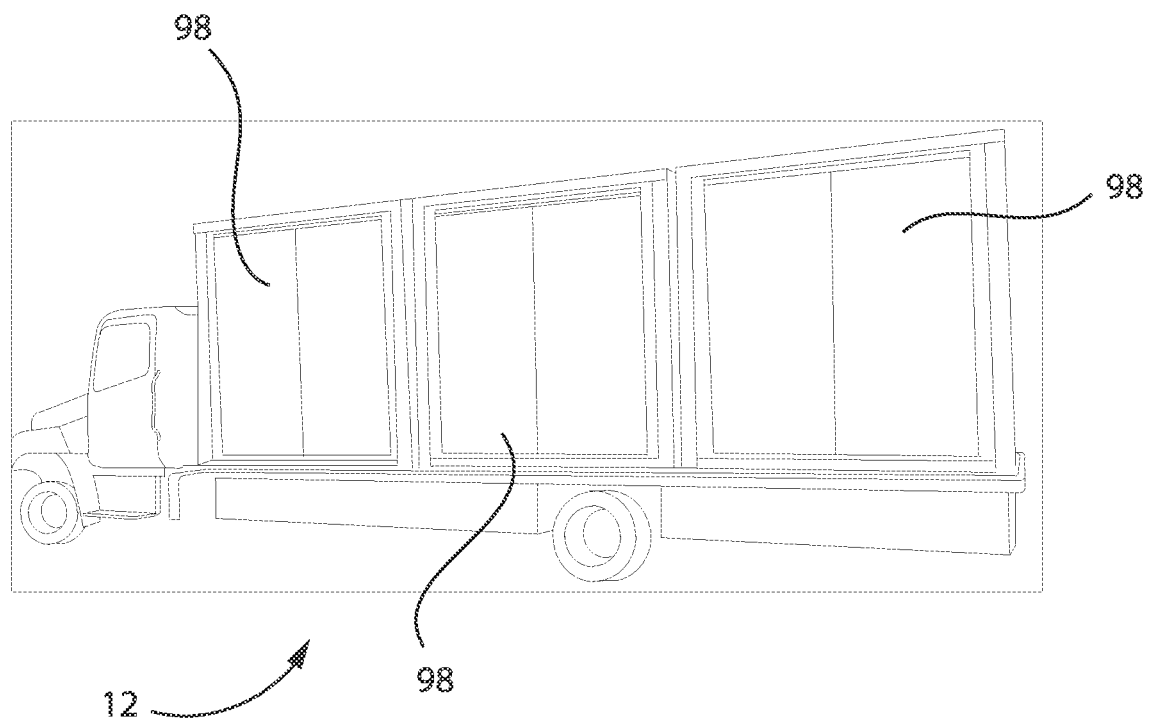
FIG. 44 is a side elevational view of the cargo transport vehicle supporting three cargo transport containers, in accordance with a non-limiting exemplary embodiment of the present disclosure.
Figure 45:
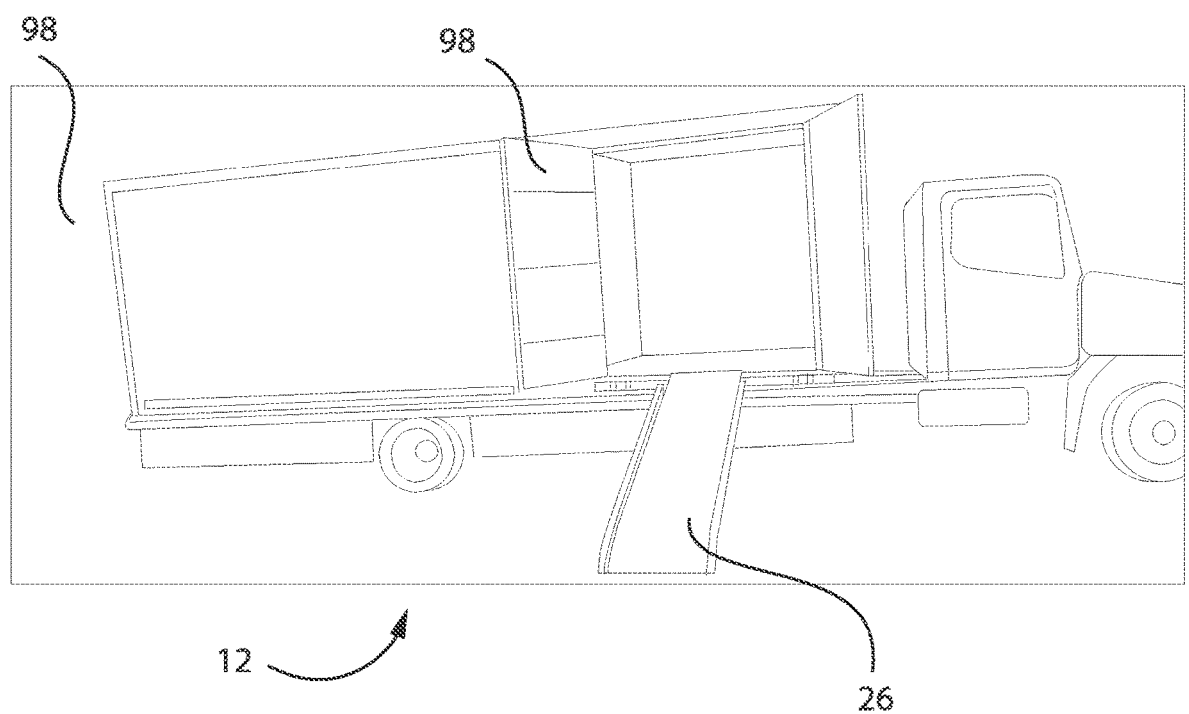
FIG. 45 is a side elevational view of the cargo transport vehicle shown in FIG. 44 wherein at least one cargo transport container is open with the ramp deployed to a lowered position, in accordance with a non-limiting exemplary embodiment of the present disclosure.
Figure 46:
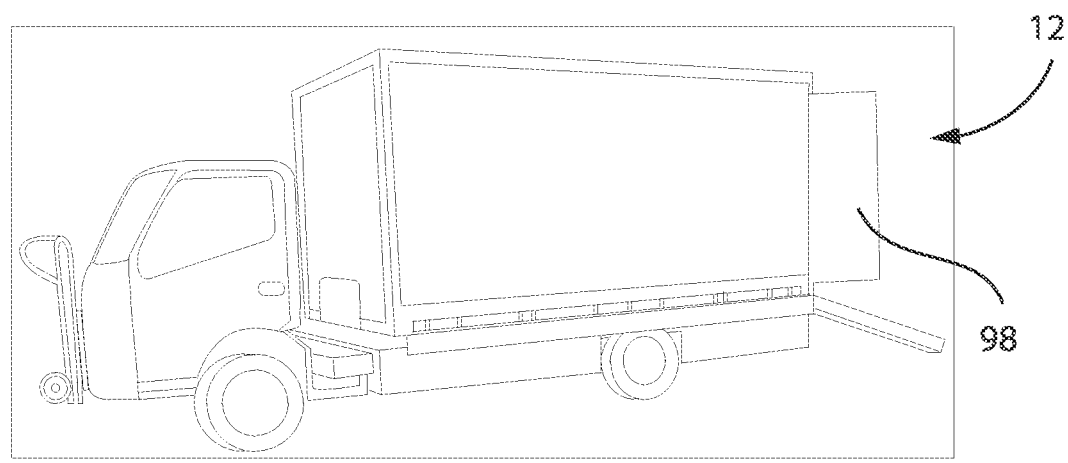
FIG. 46 is a perspective view of another cargo transport vehicle supporting one cargo transport container, in accordance with a non-limiting exemplary embodiment of the present disclosure.
Figure 47:
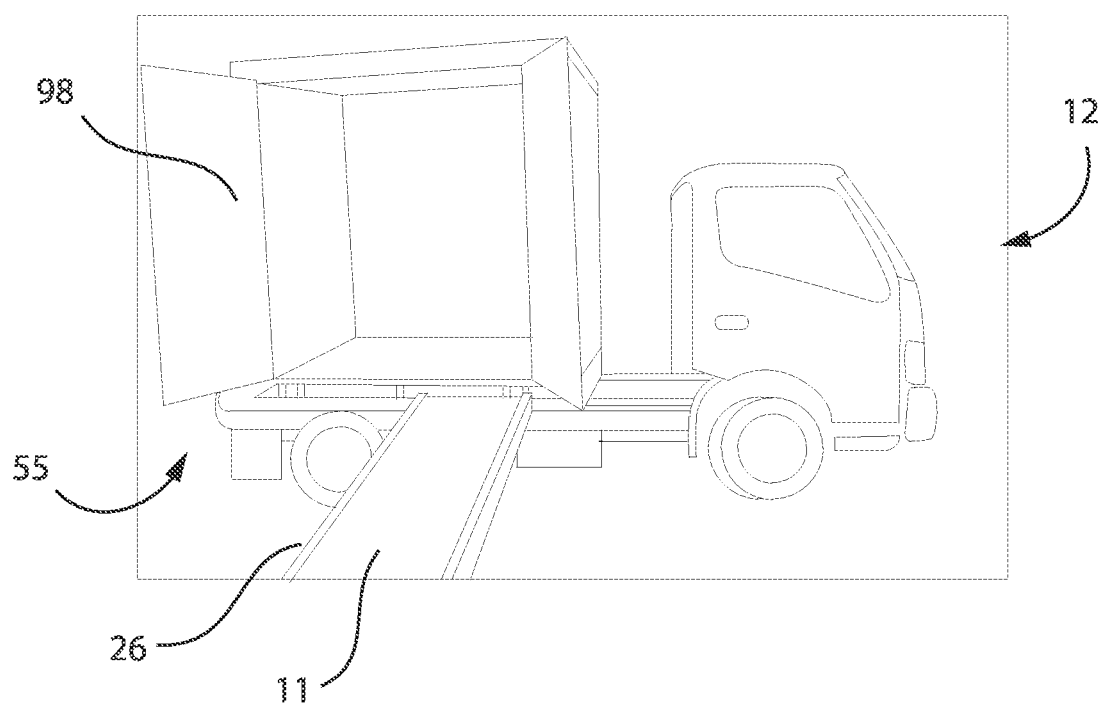
FIG. 47 is a side elevational view of another cargo transport vehicle supporting one cargo transport container, in accordance with a non-limiting exemplary embodiment of the present disclosure.
Figure 48:
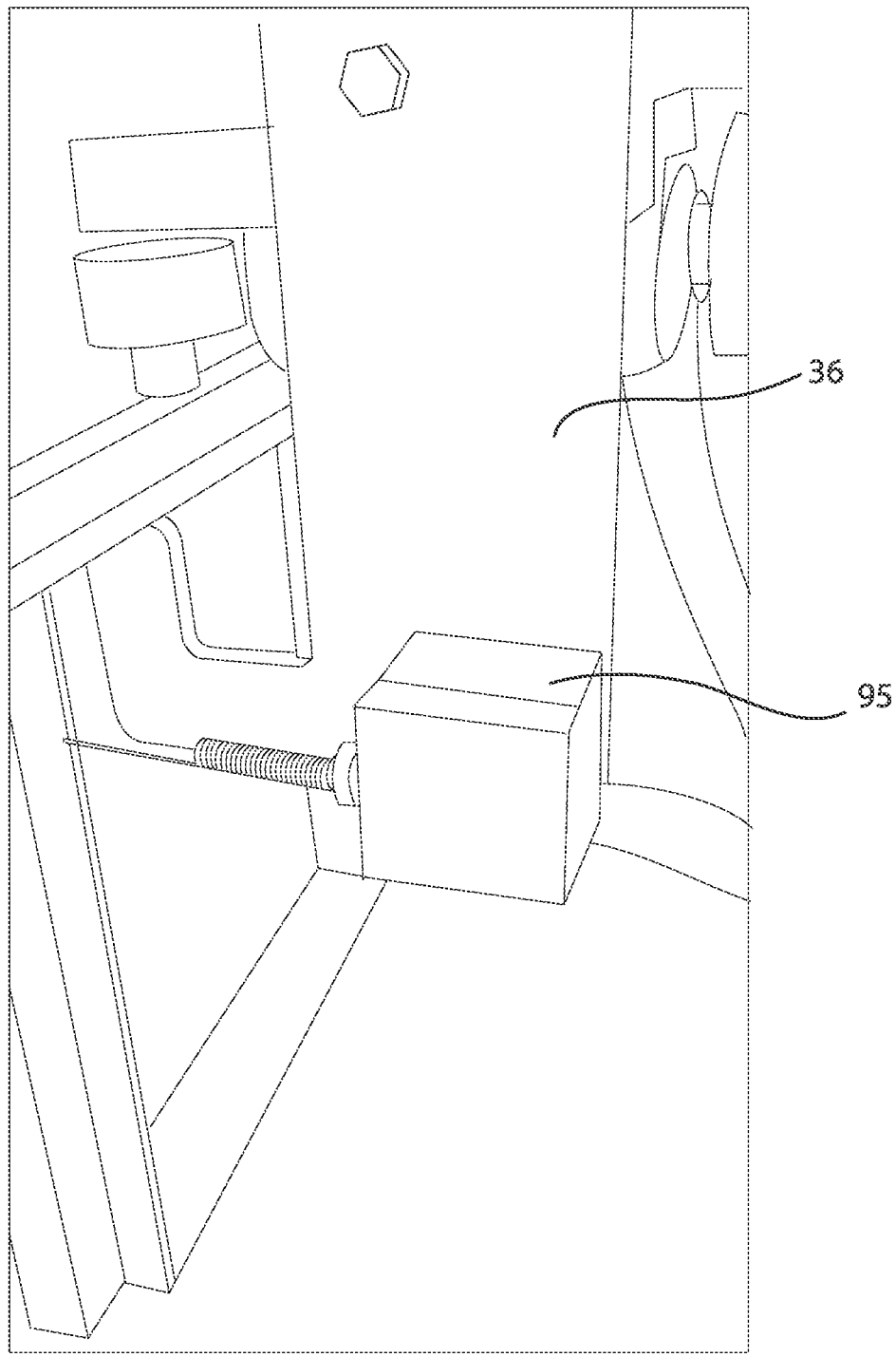
FIG. 48 is an enlarged perspective view of transceiver (sensor) attached to the trolley, in accordance with a non-limiting exemplary embodiment of the present disclosure.
Figure 49:
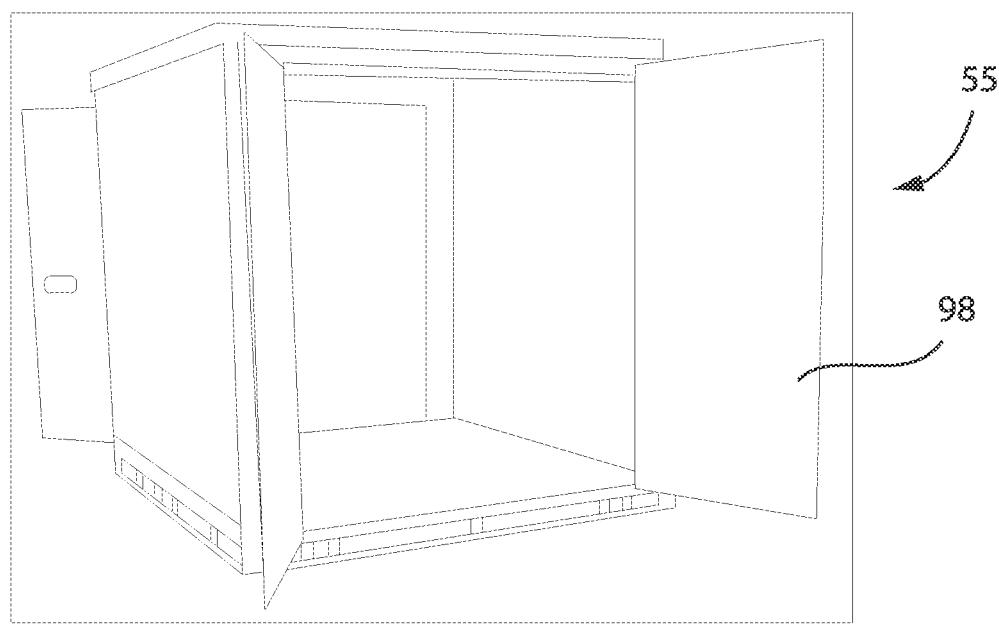
FIG. 49 is a perspective view of a cargo transport container removed from the vehicle support frame, in accordance with a non-limiting exemplary embodiment of the present disclosure.
Figure 50:
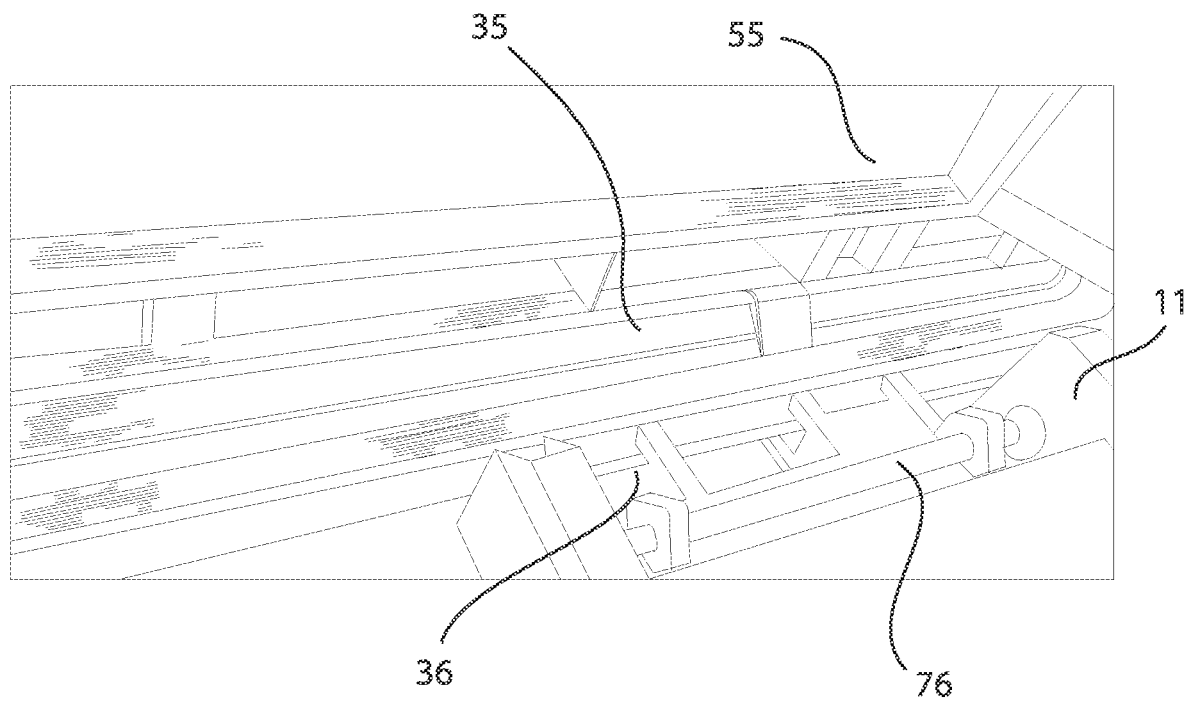
FIG. 50 is another perspective view showing the interrelationship between the ramp, the trolley, and the guide rail, in accordance with a non-limiting exemplary embodiment of the present disclosure.
Figure 51:
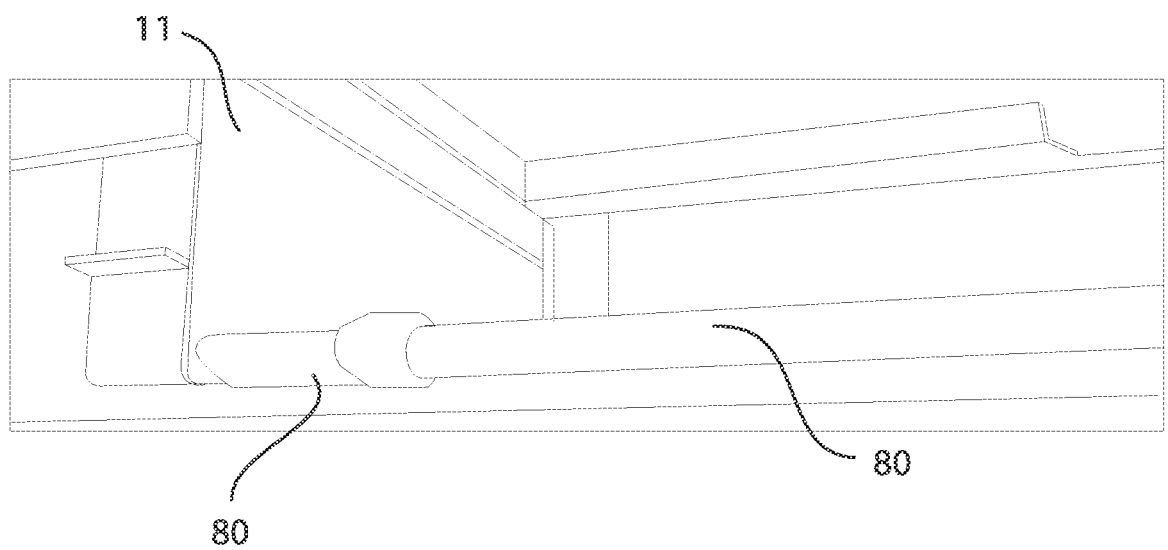
FIG. 51 is a perspective view showing an underside of the ramp and a portion of the third ramp deployment mechanism, in accordance with a non-limiting exemplary embodiment of the present disclosure.
Figure 52:
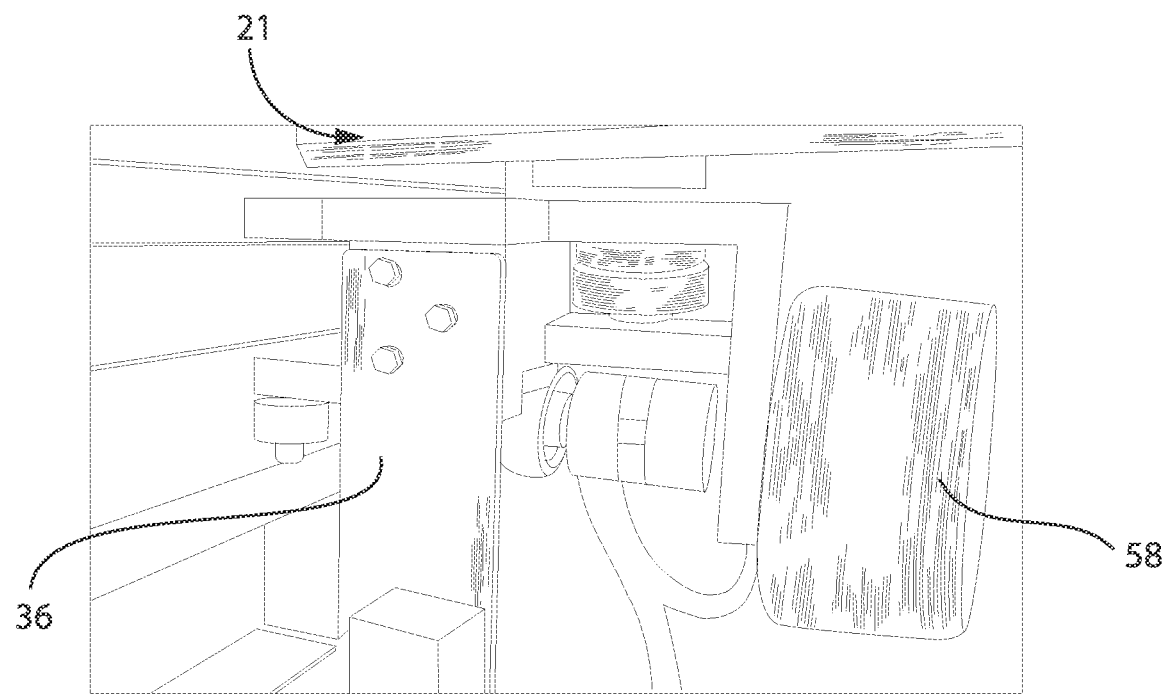
FIG. 52 is a perspective view showing the interrelationship between the trolley, guide rail, ramp, and a portion of the second ramp deployment mechanism, in accordance with a non-limiting exemplary embodiment of the present disclosure.
Figure 53:
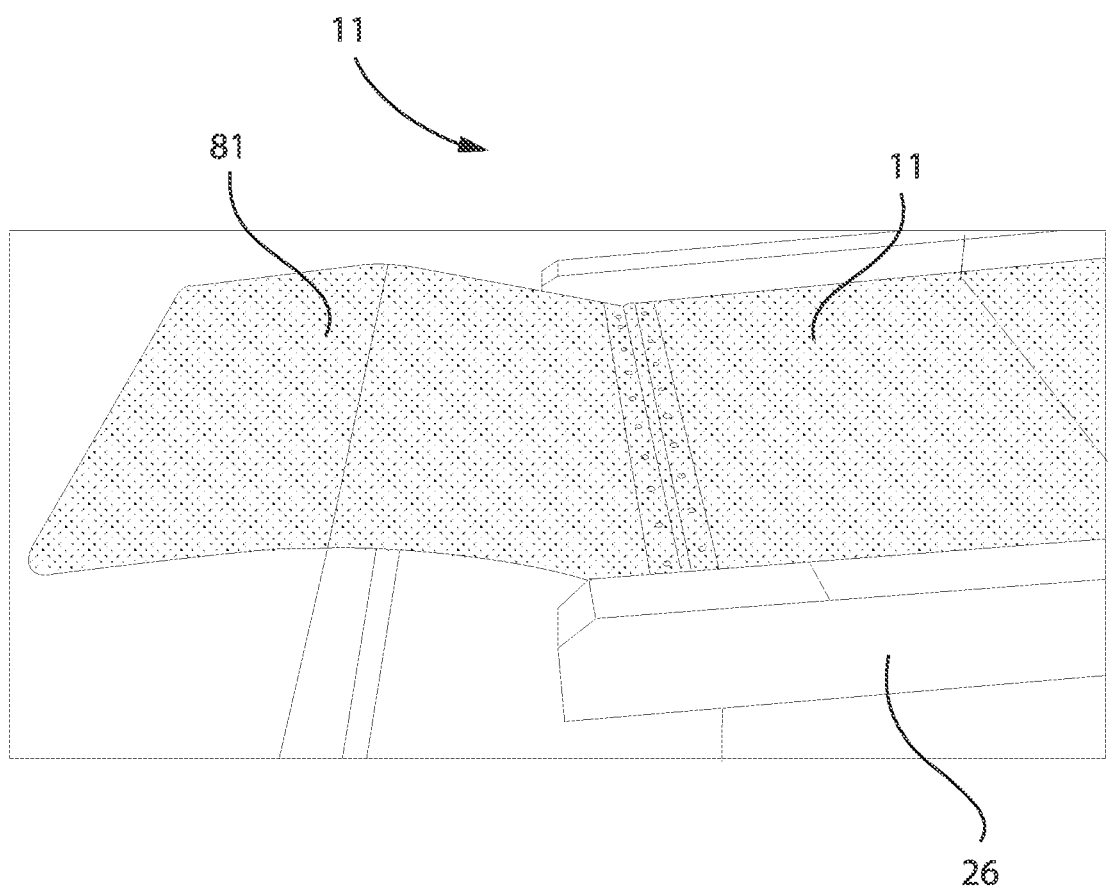
FIG. 53 is a perspective view showing an extension of the ramp position over a transition threshold leading into the cargo transport container, in accordance with a non-limiting exemplary embodiment of the present disclosure.
Figure 54:
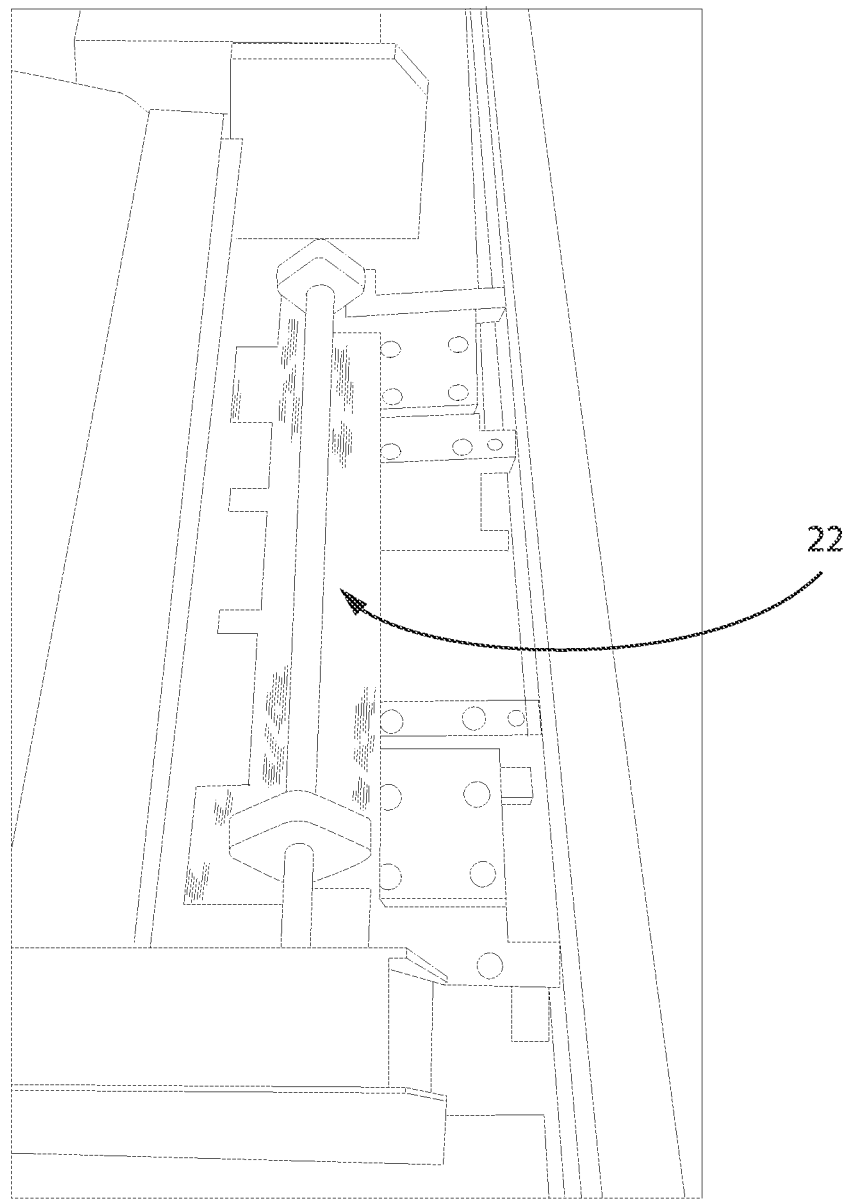
FIG. 54 is a perspective view showing the interrelationship between the trolley, guide rail, ramp, and a portion of the second ramp deployment mechanism, in accordance with a non-limiting exemplary embodiment of the present disclosure.
Figure 55:
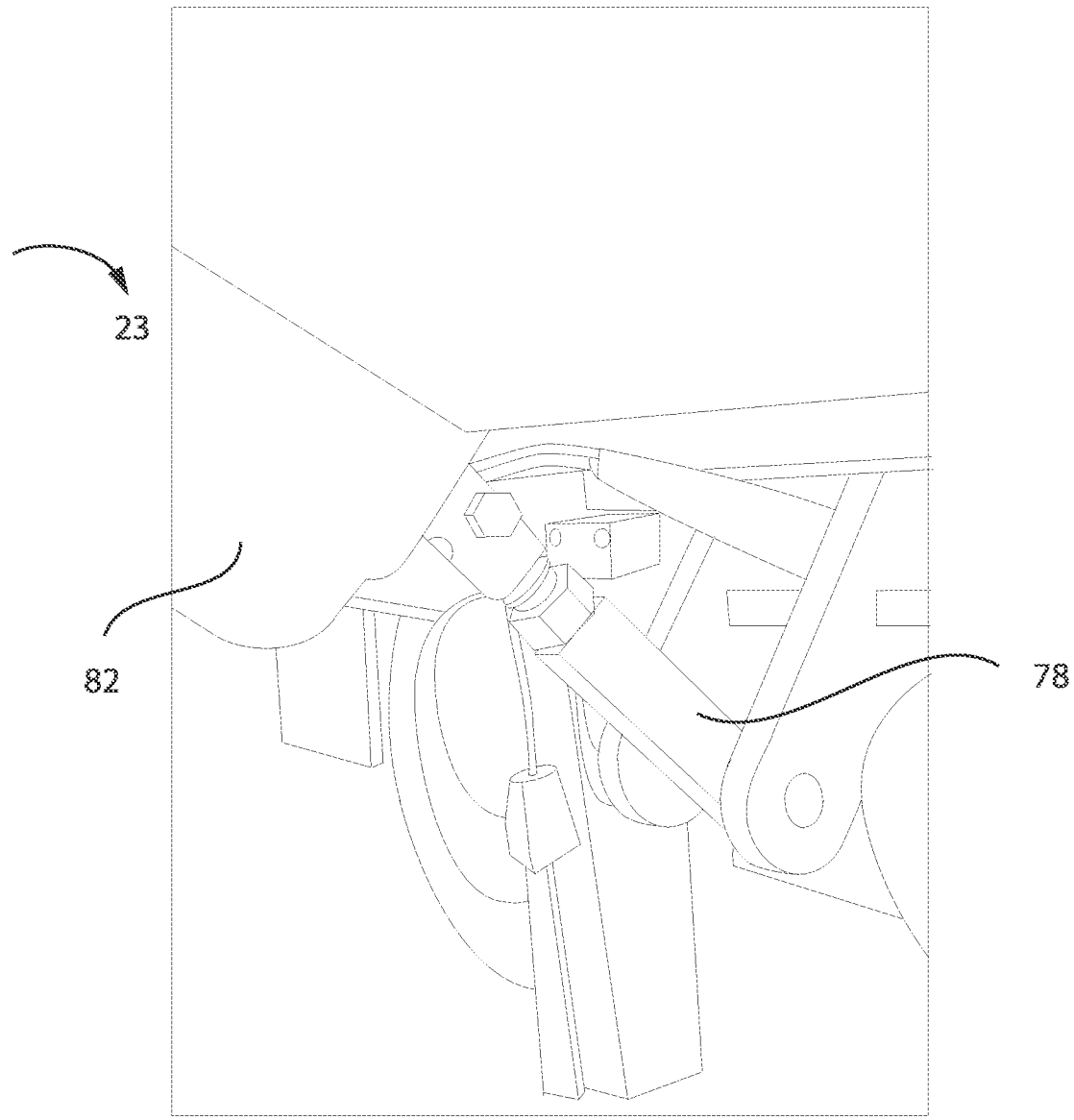
FIG. 55 is a perspective view showing the interrelationship between the trolley, guide rail, ramp, and a portion of the second ramp deployment mechanism, in accordance with a non-limiting exemplary embodiment of the present disclosure.
Figure 56:
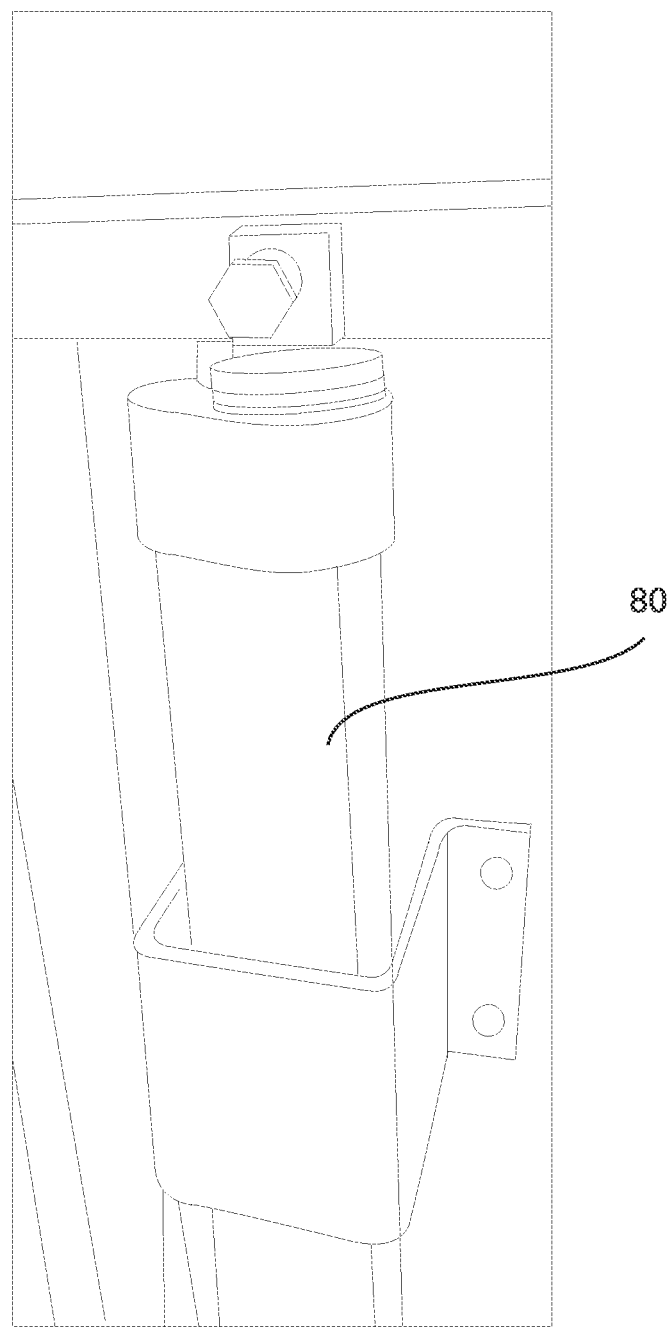
FIG. 56 is a perspective view showing a portion of the third ramp deployment mechanism, in accordance with a non-limiting exemplary embodiment of the present disclosure.
Figure 57:
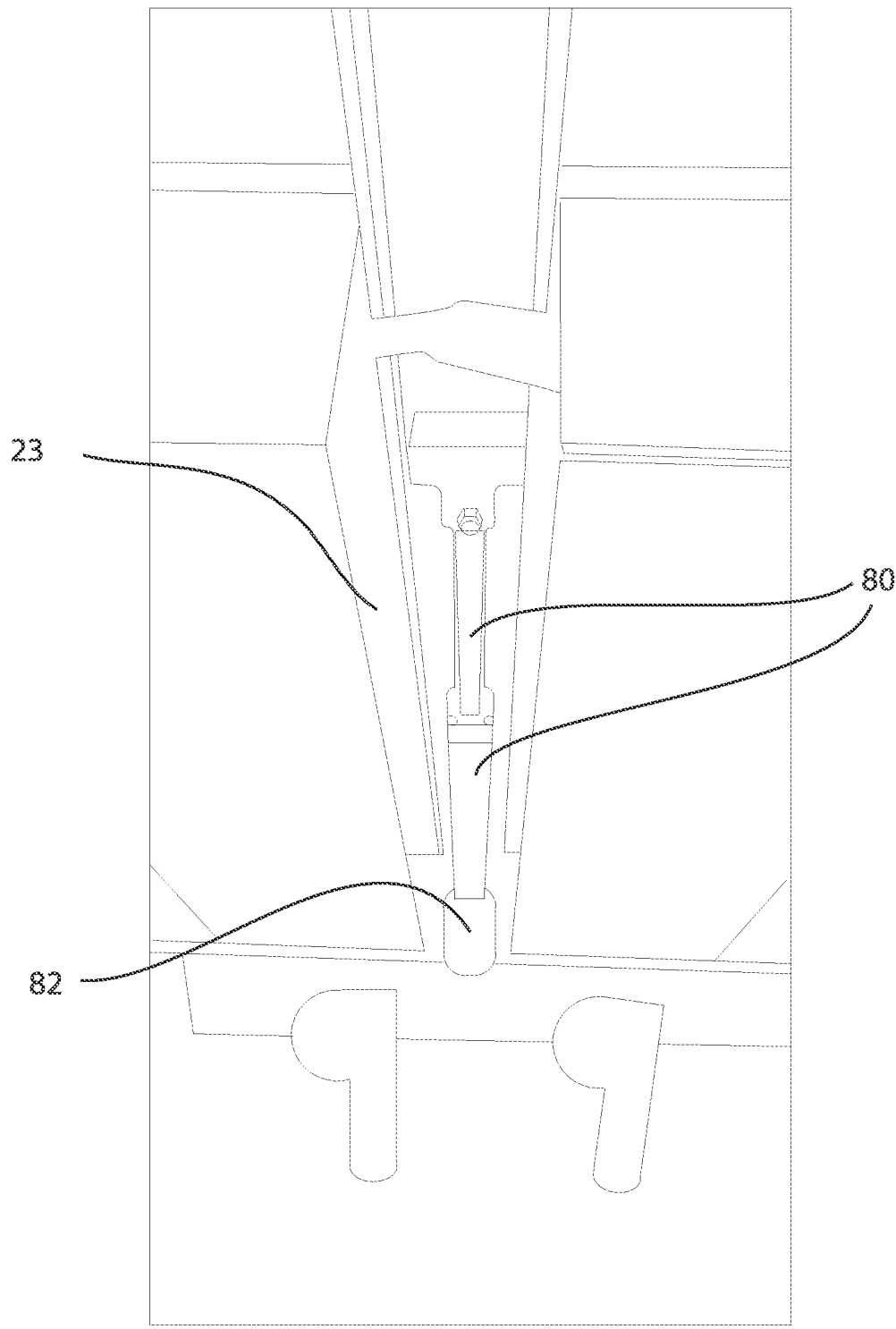
FIG. 57 is a perspective view showing an underside of the ramp and a portion of the third ramp deployment mechanism, in accordance with a non-limiting exemplary embodiment of the present disclosure.
Figure 58:
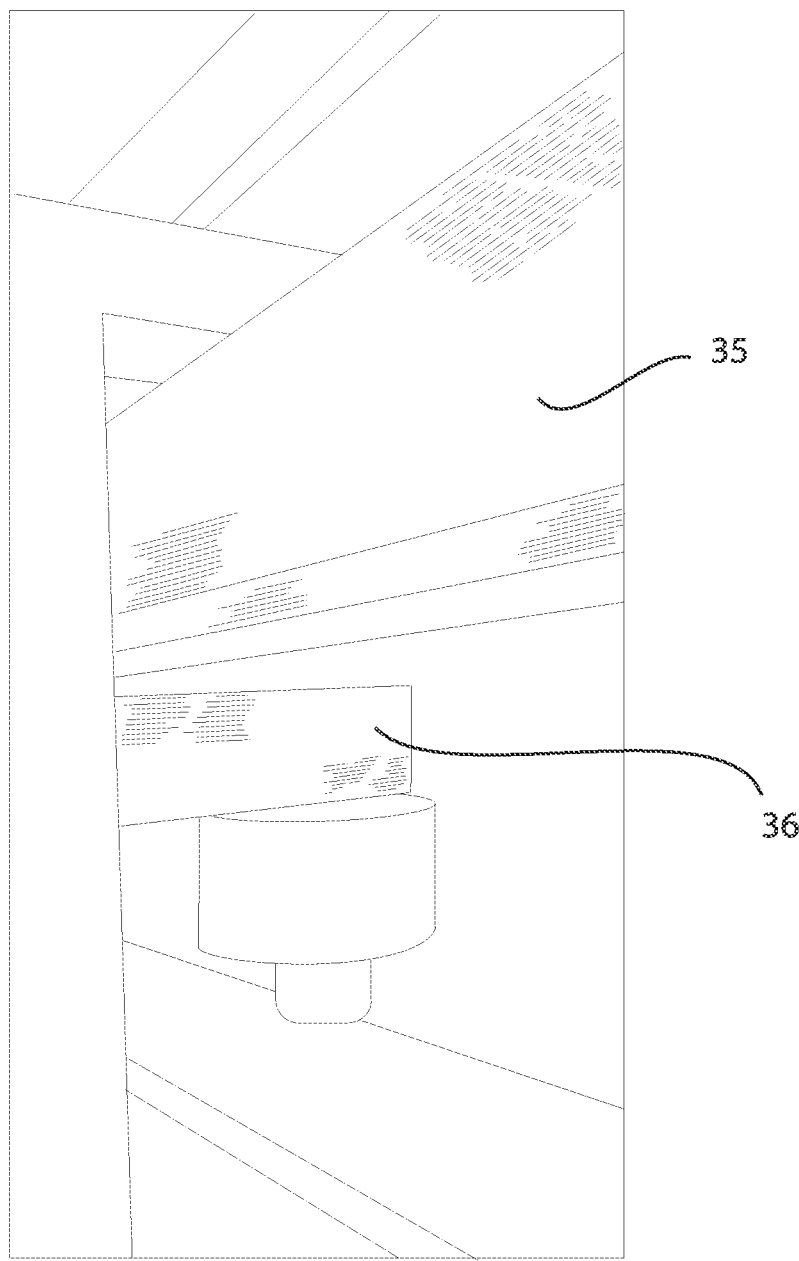
FIG. 58 is yet another perspective view showing the interrelationship between the trolley and the guide rail, in accordance with a non-limiting exemplary embodiment of the present disclosure.
Figure 59:
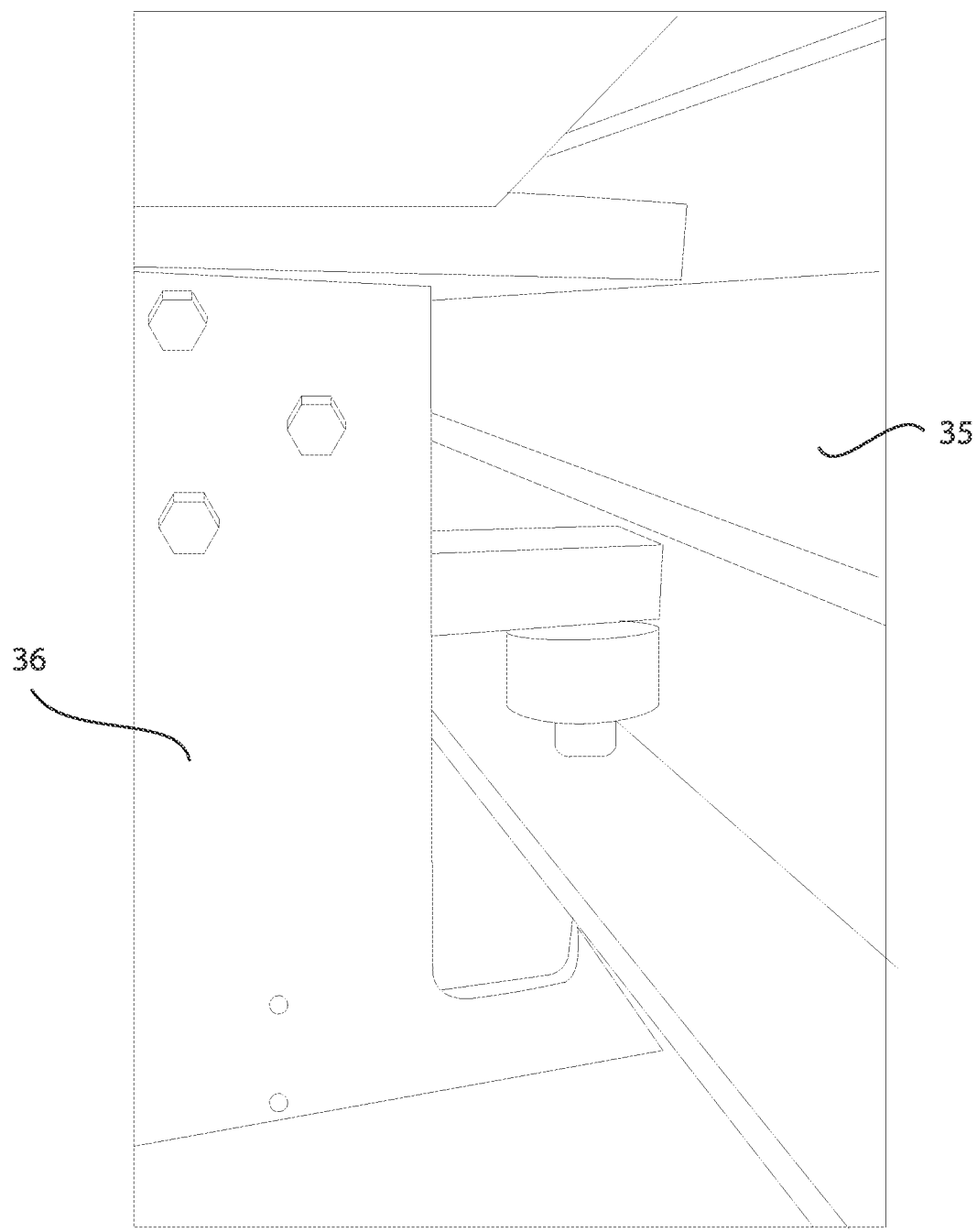
FIG. 59 is yet another perspective view showing the interrelationship between the trolley and the guide rail, in accordance with a non-limiting exemplary embodiment of the present disclosure.
Figure 60:
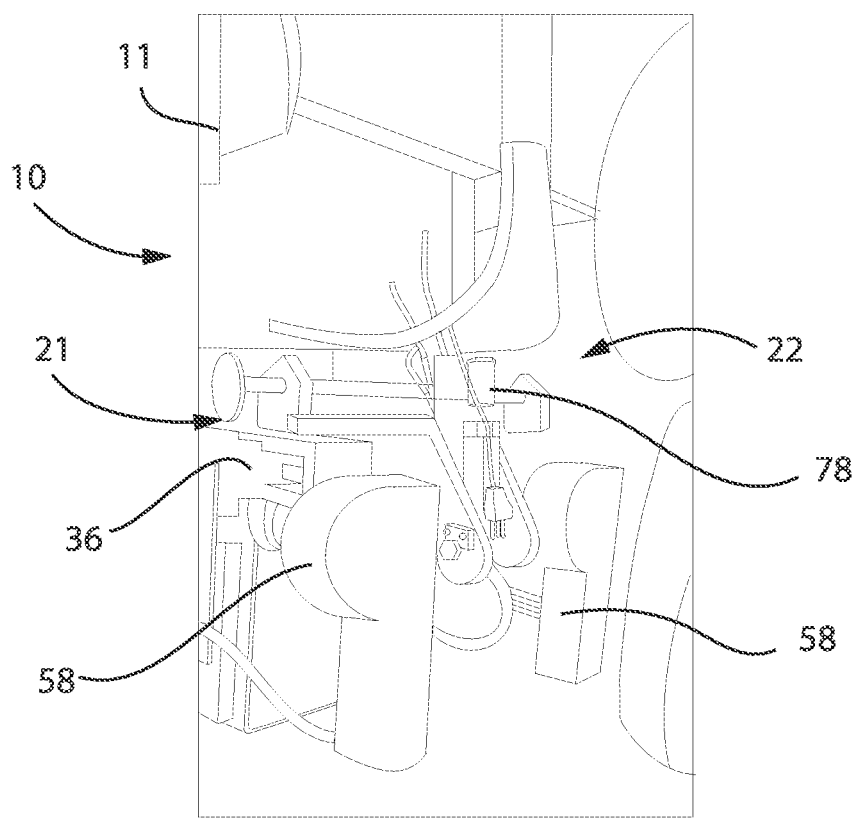
FIG. 60 is yet another perspective view showing the interrelationship between the trolley, the ramp, the first ramp deployment mechanism, and the second ramp deployment mechanism, in accordance with a non-limiting exemplary embodiment of the present disclosure.
Figure 61:
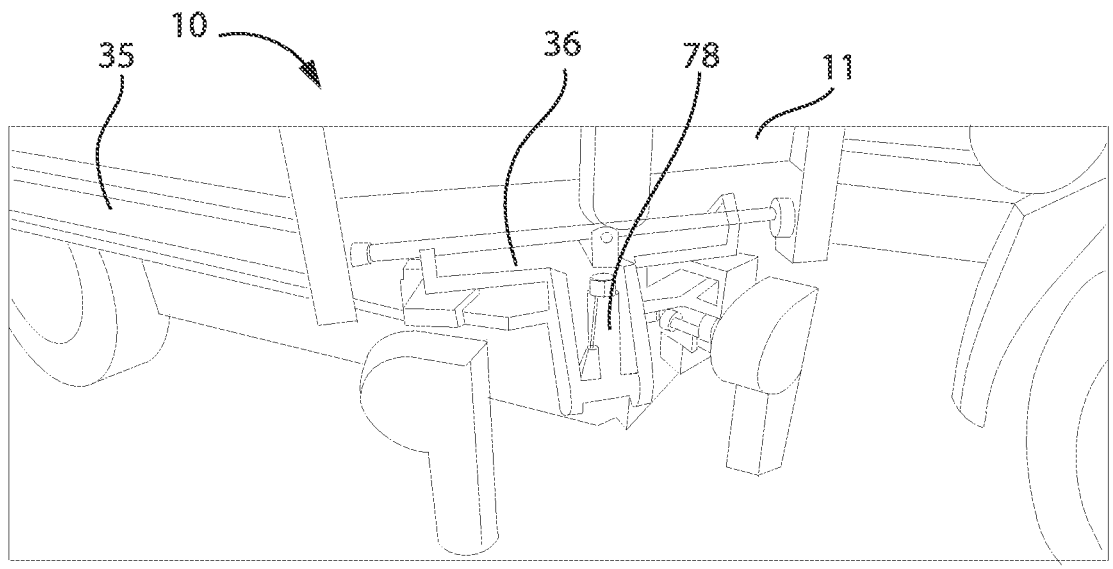
FIG. 61 is a perspective view showing the independent pivoting motions of a first roller assembly and second roller assembly of the trolley when traveling around a corner along a perimeter of the guide rail, in accordance with a non-limiting exemplary embodiment of the present disclosure.
Figure 63:
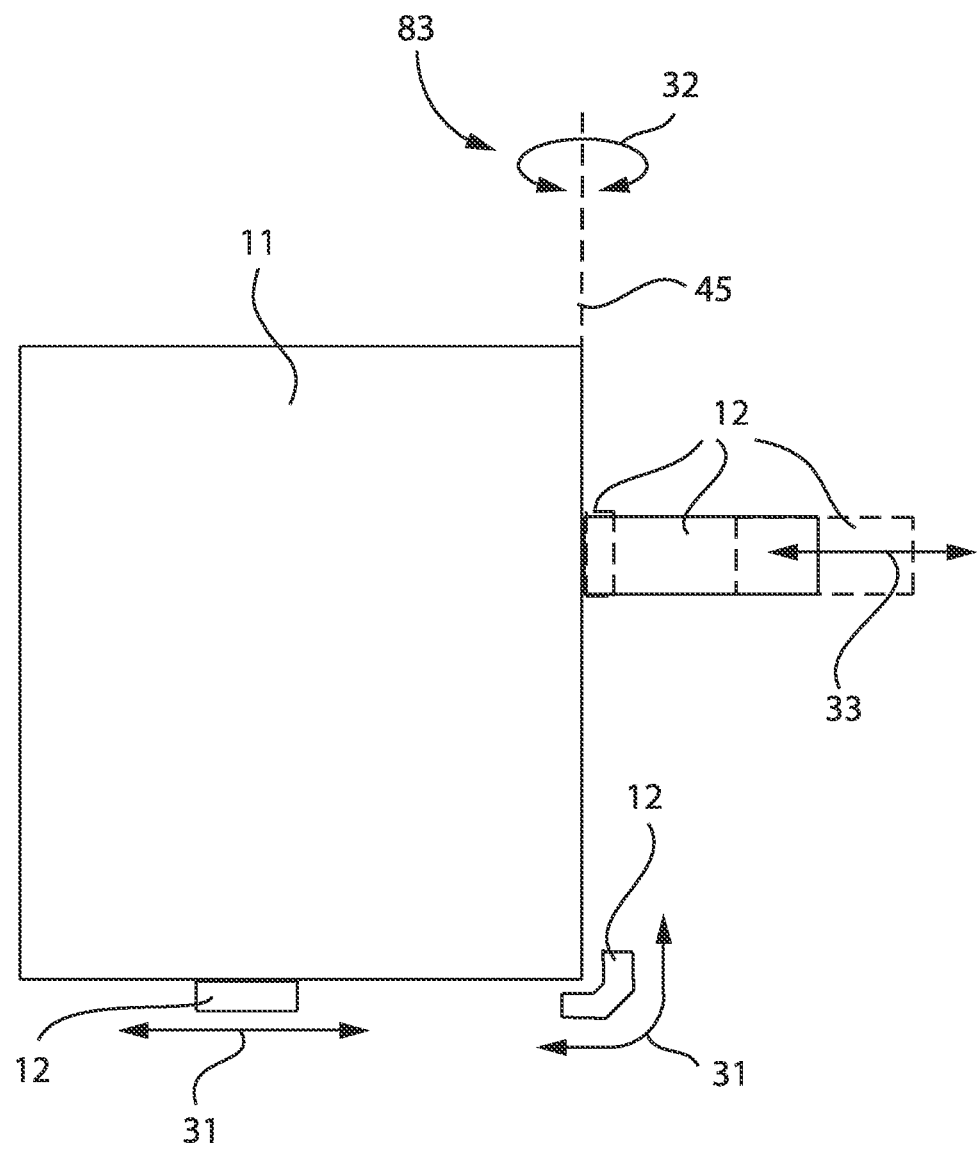
FIG. 63 is a block diagram showing a top plan view of the ramp displaced along the first travel path, second travel path and third travel path, in accordance with a non-limiting exemplary embodiment of the present disclosure.
Figure 64:
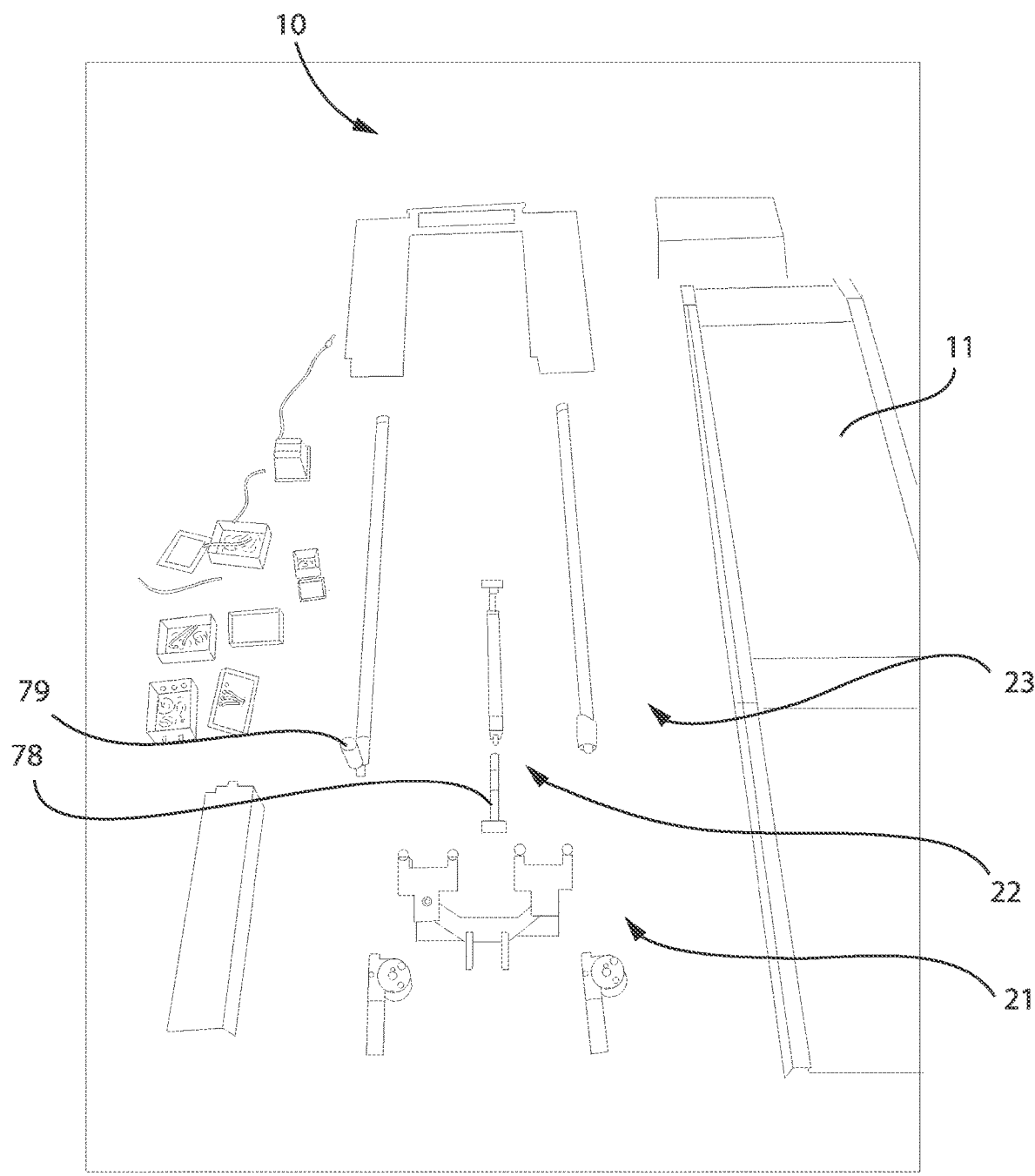
FIG. 64 is an exploded view of the ramp, trolley, some components of the first ramp displacement mechanism, some of the components of the second ramp displacement mechanism, and some of the components of the third ramp displacement mechanism, the interrelationship between the trolly and the guide rail, in accordance with a non-limiting exemplary embodiment of the present disclosure.
Figure 65:
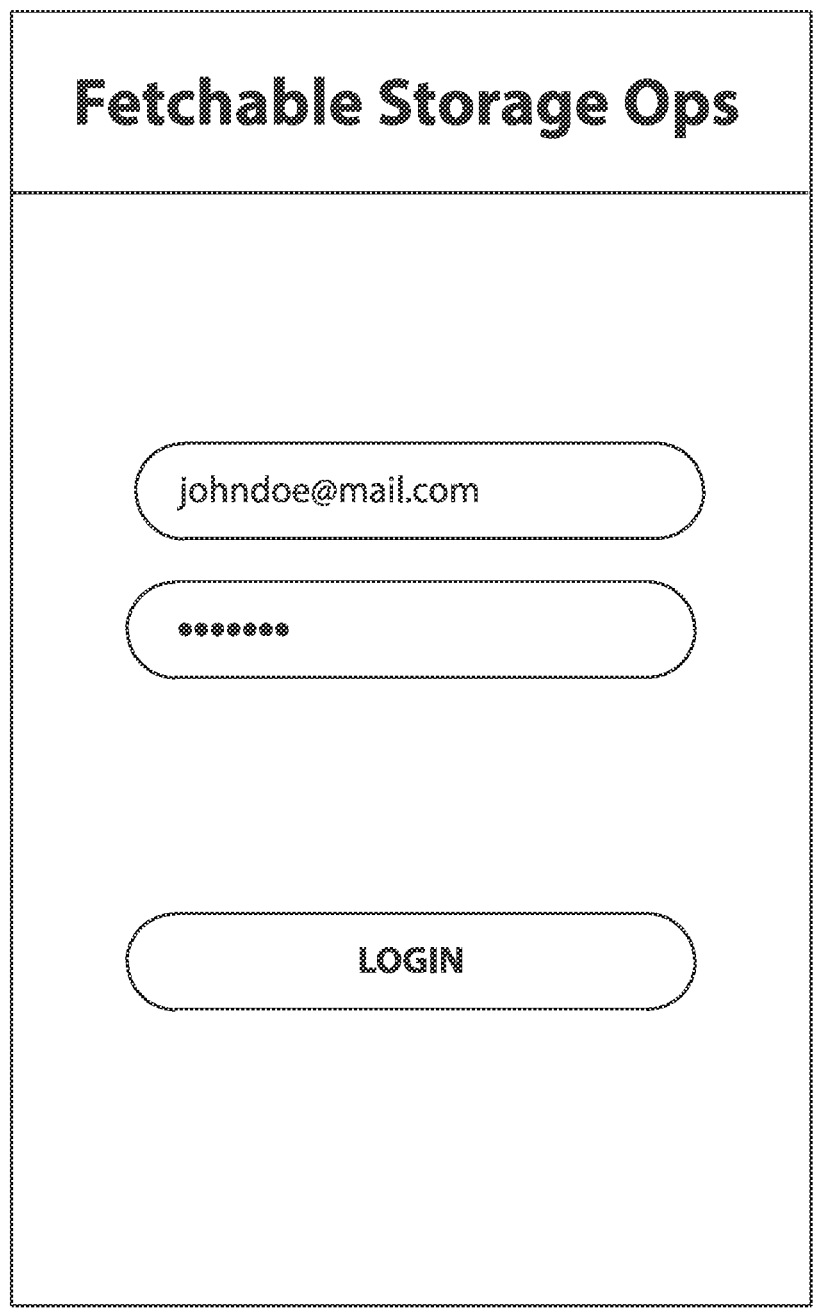
Figure 66:
Figure 67:
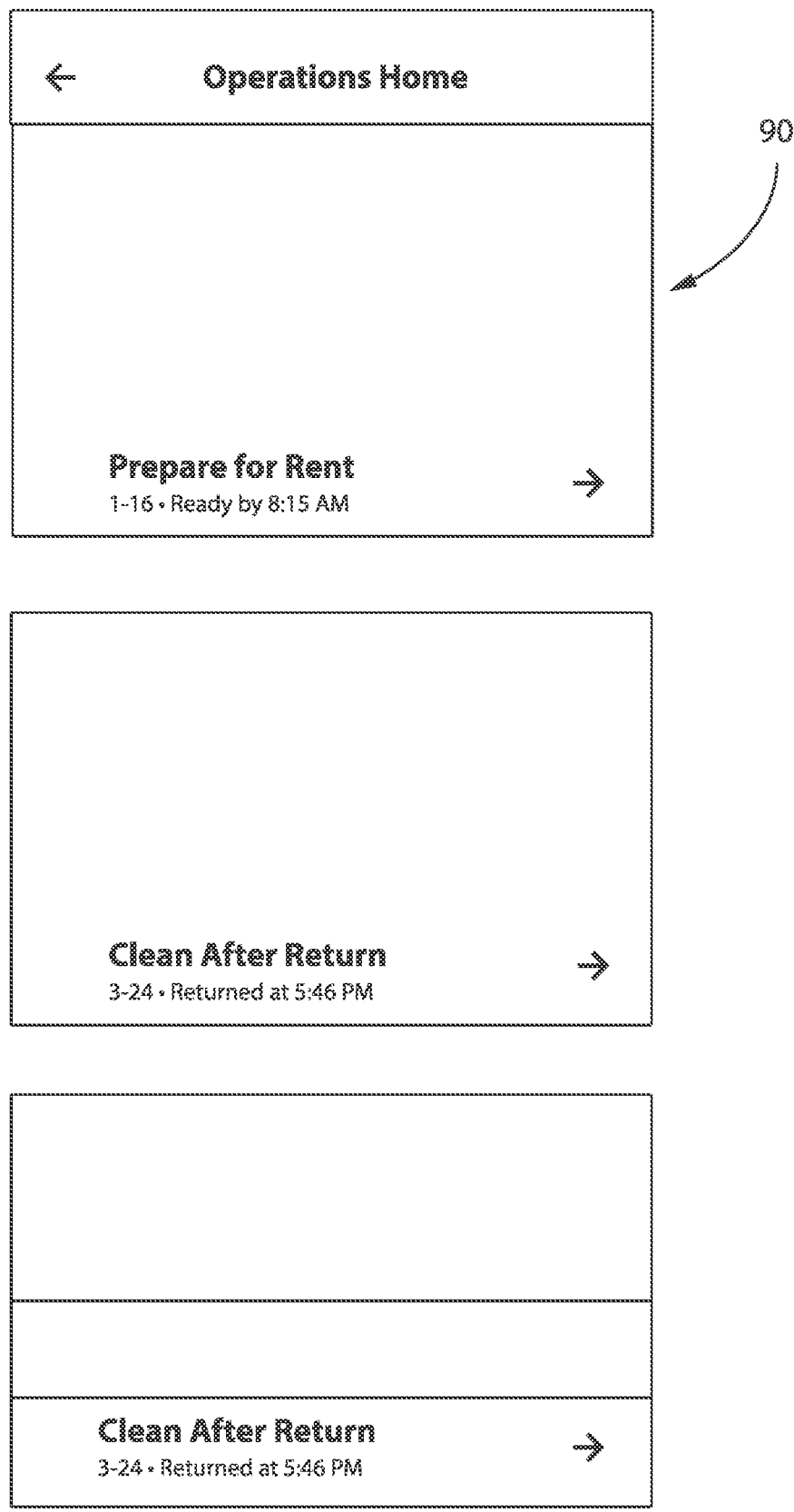
Figure 68:
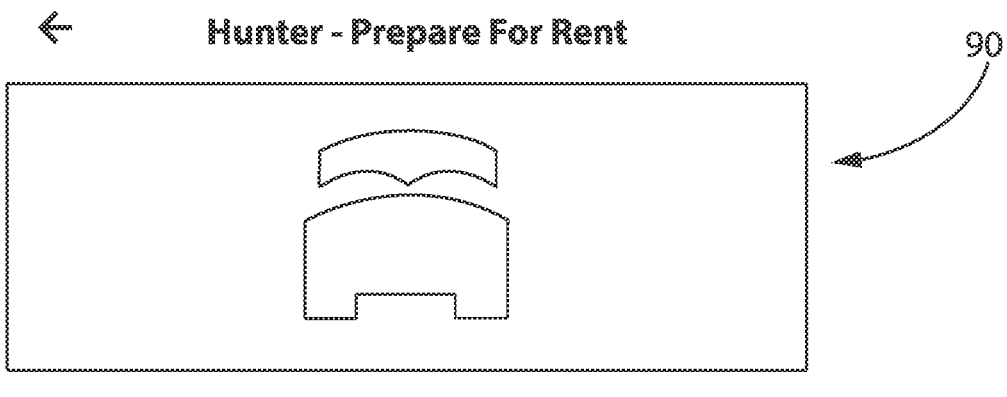
Figure 69:
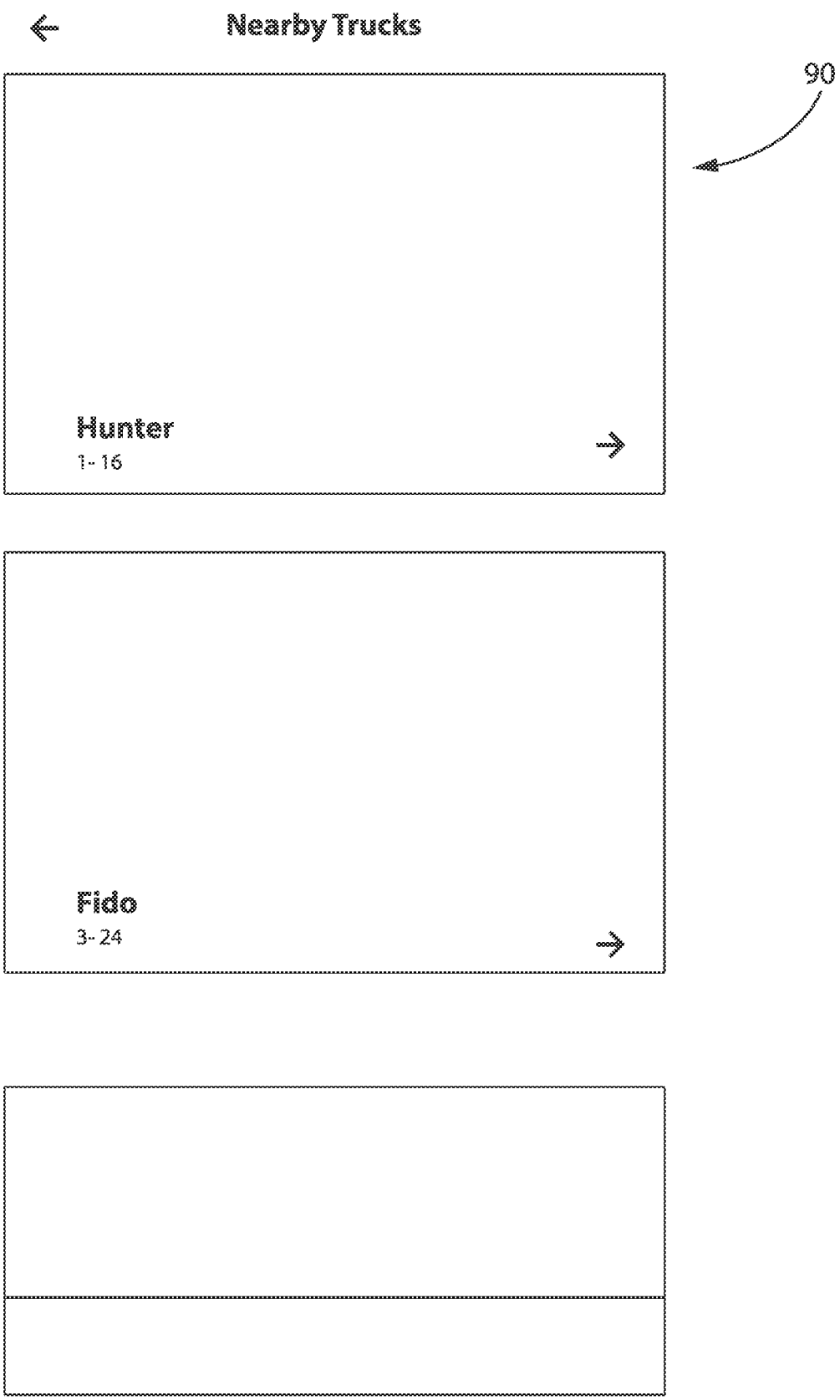
Figure 70:
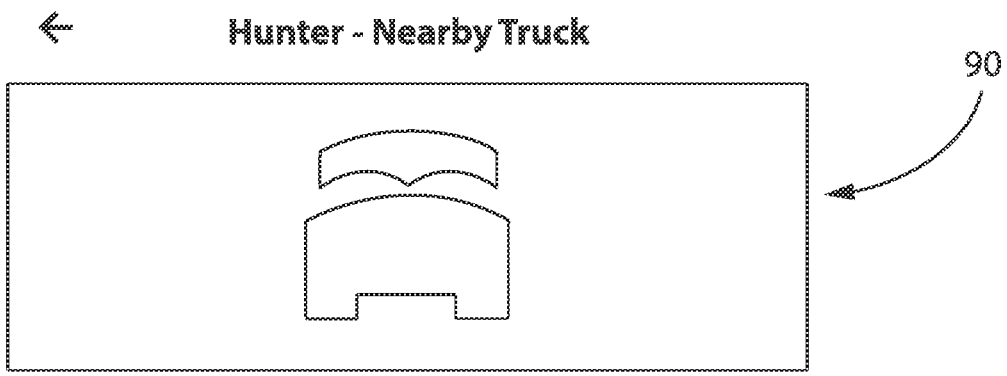
Figure 71:
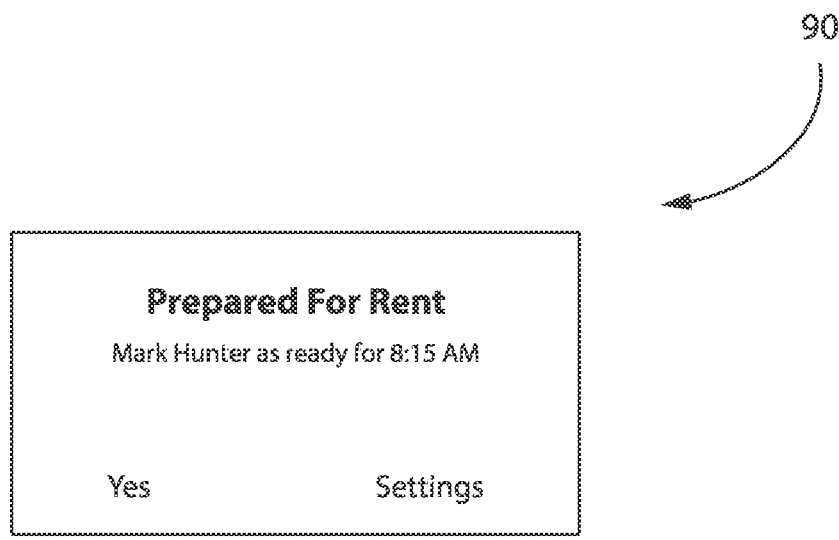
Figure 73:
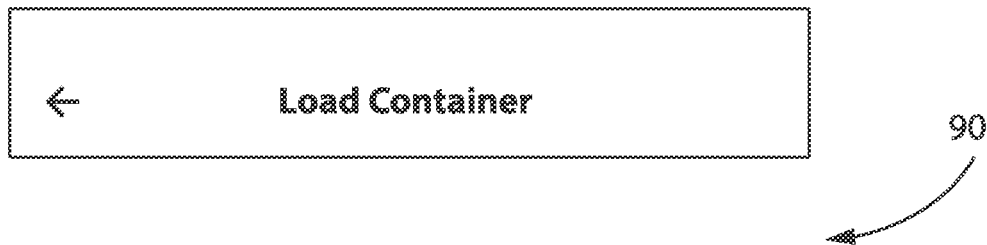
Figure 74:
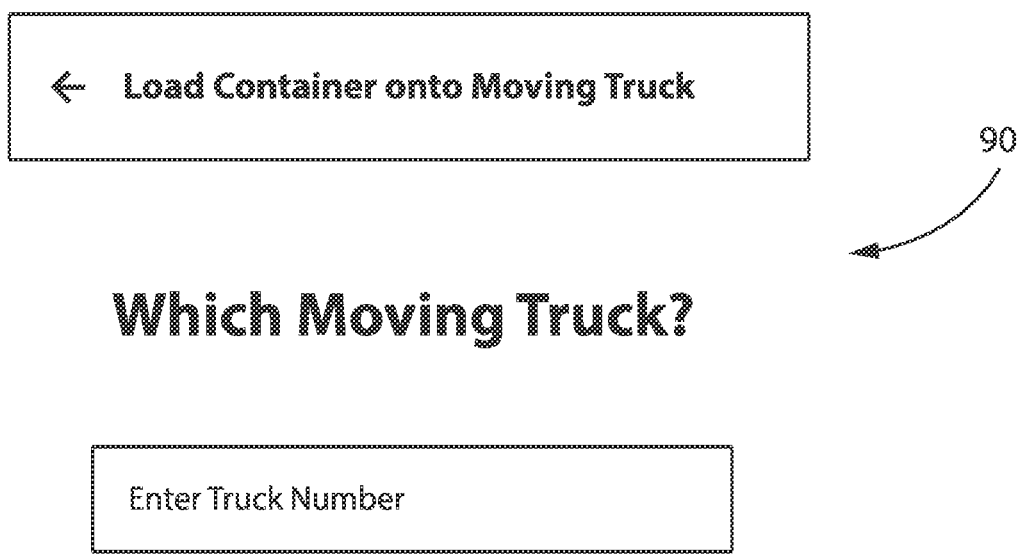
Figure 76:
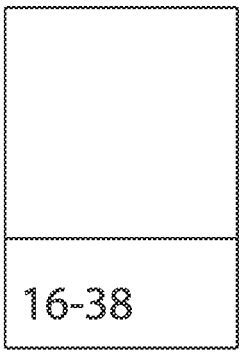
Figure 77:
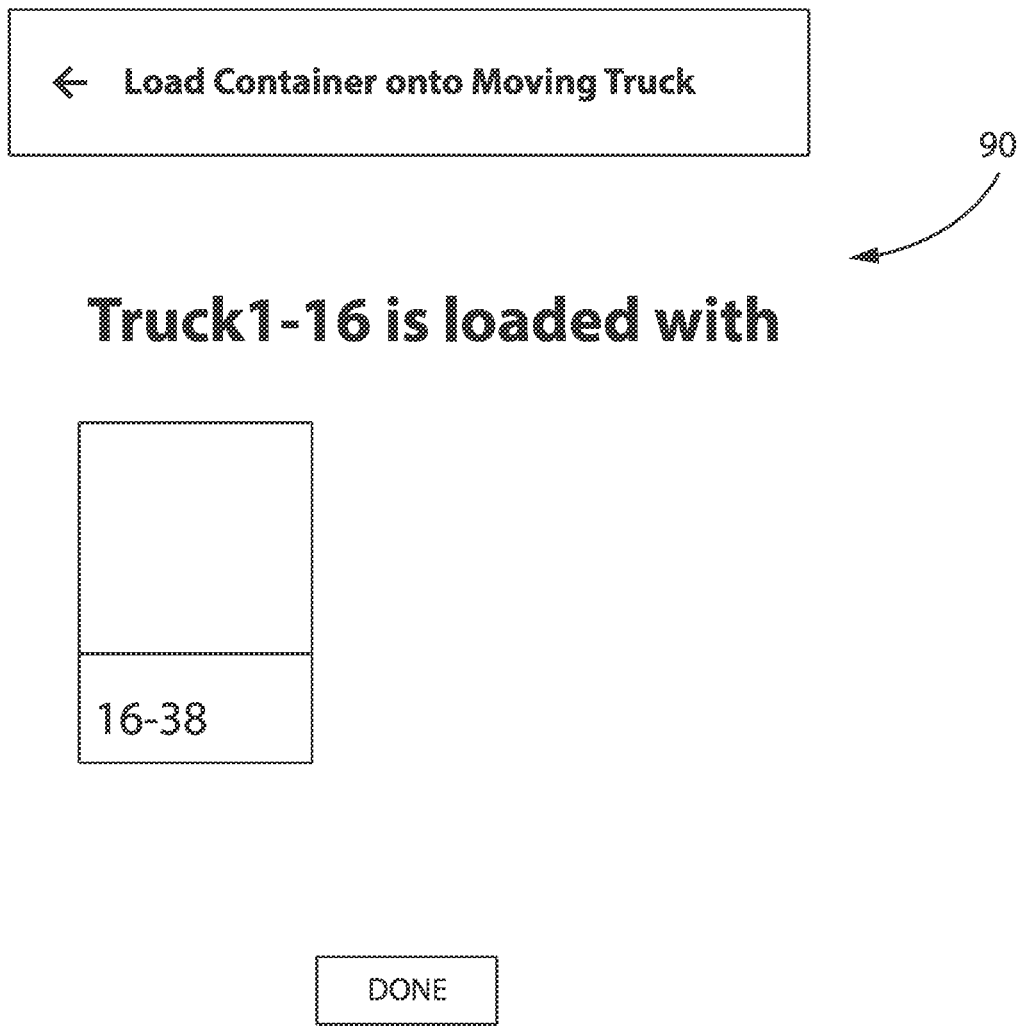
Figure 78:
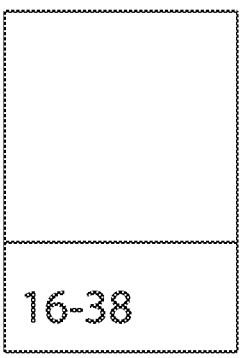
Figure 79:
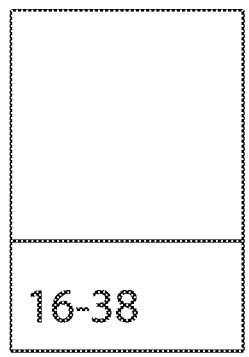
Figure 80:
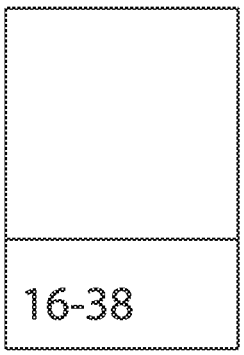
Figure 82:
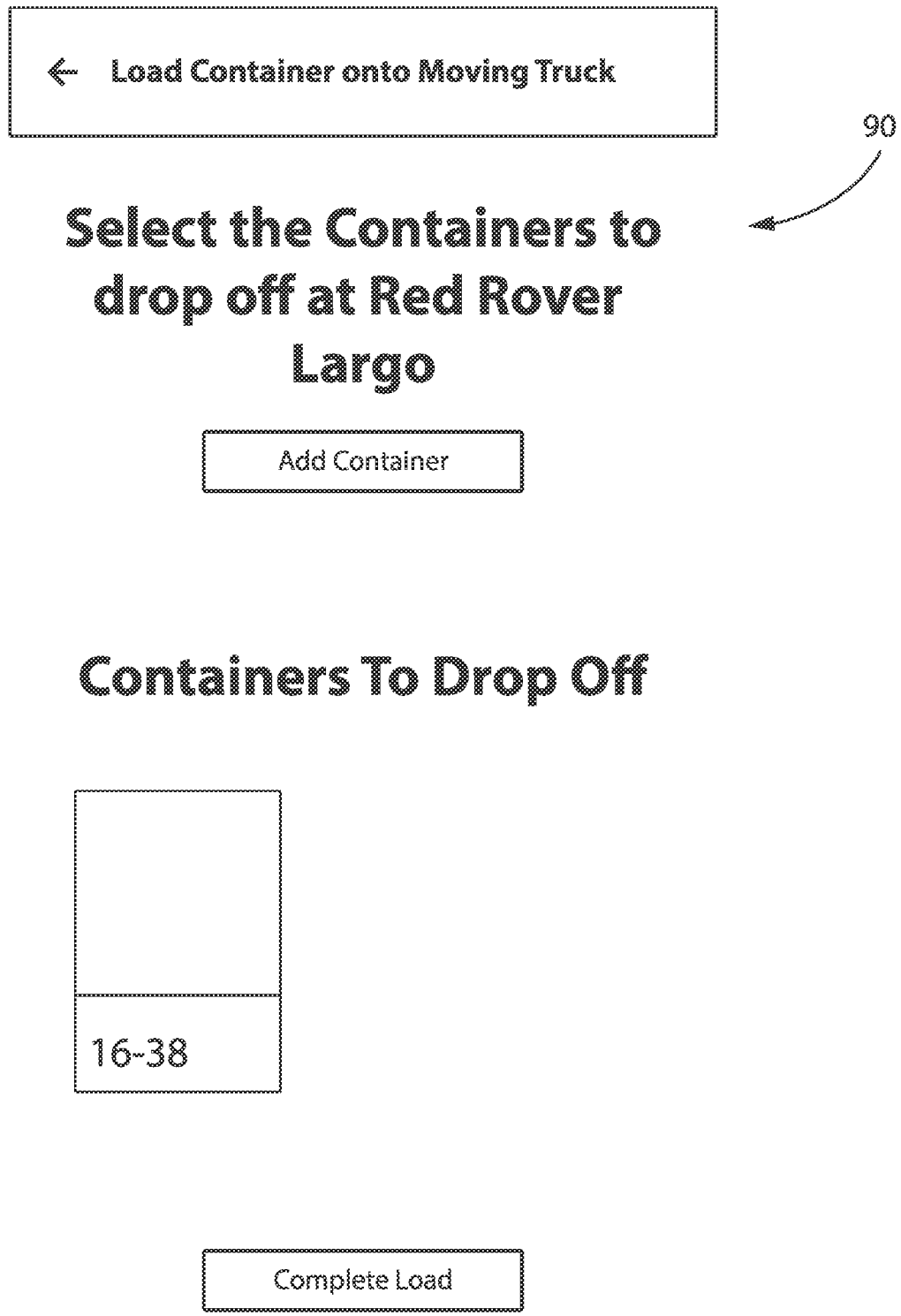
Figure 84:
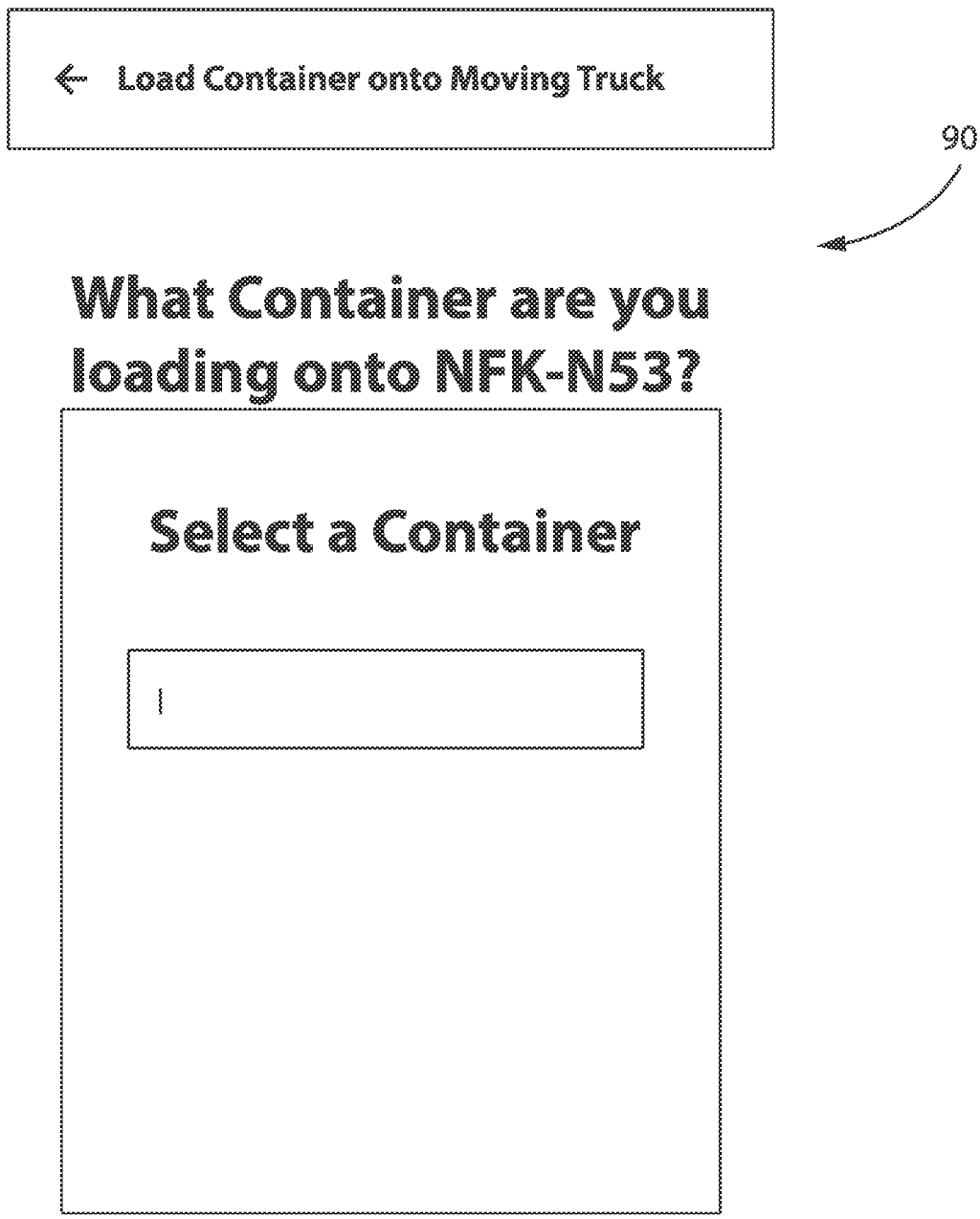
Figure 85:
Figure 86:
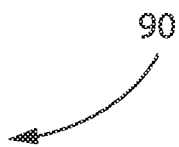
Figure 87:
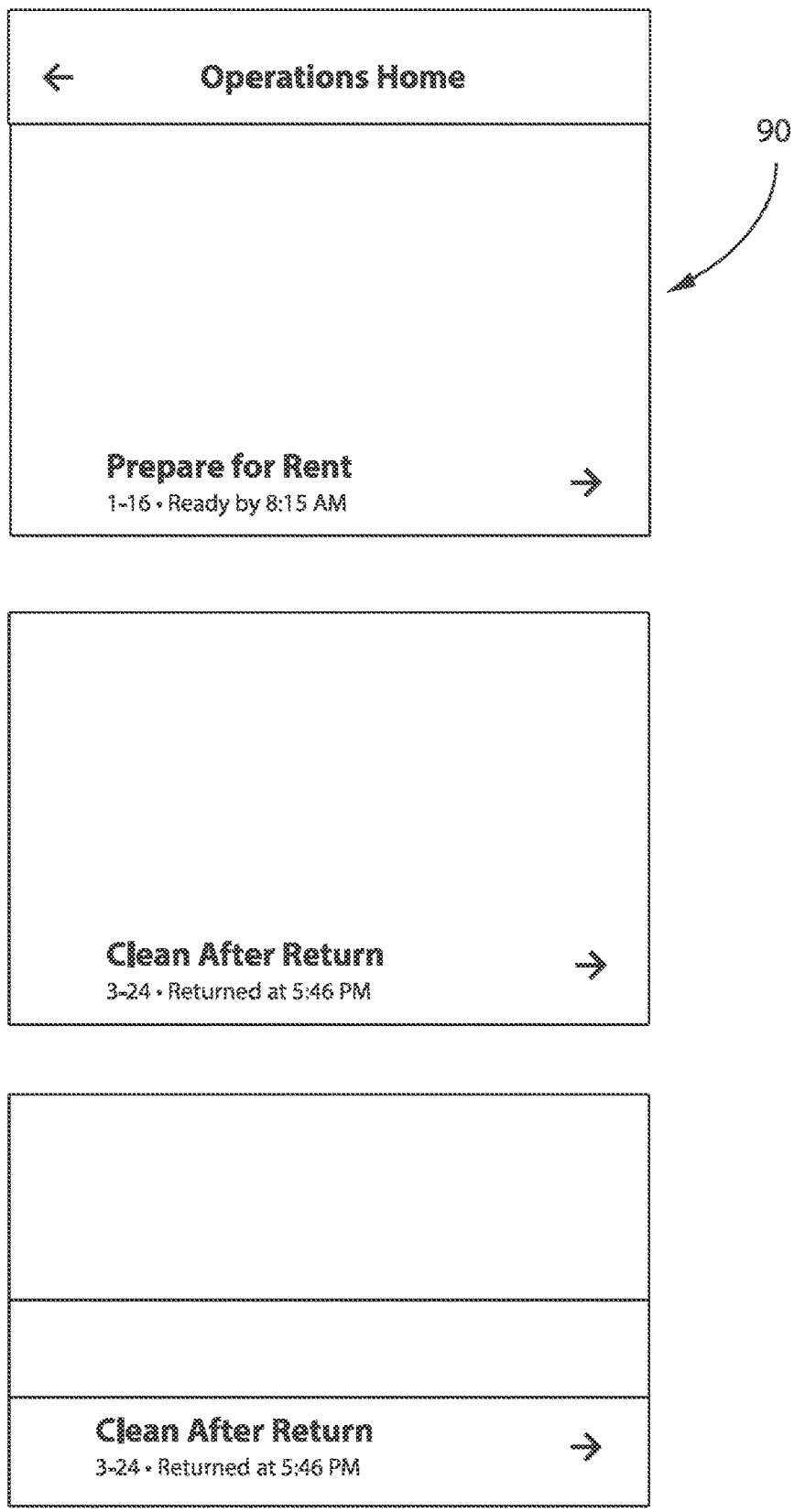
Figure 88:
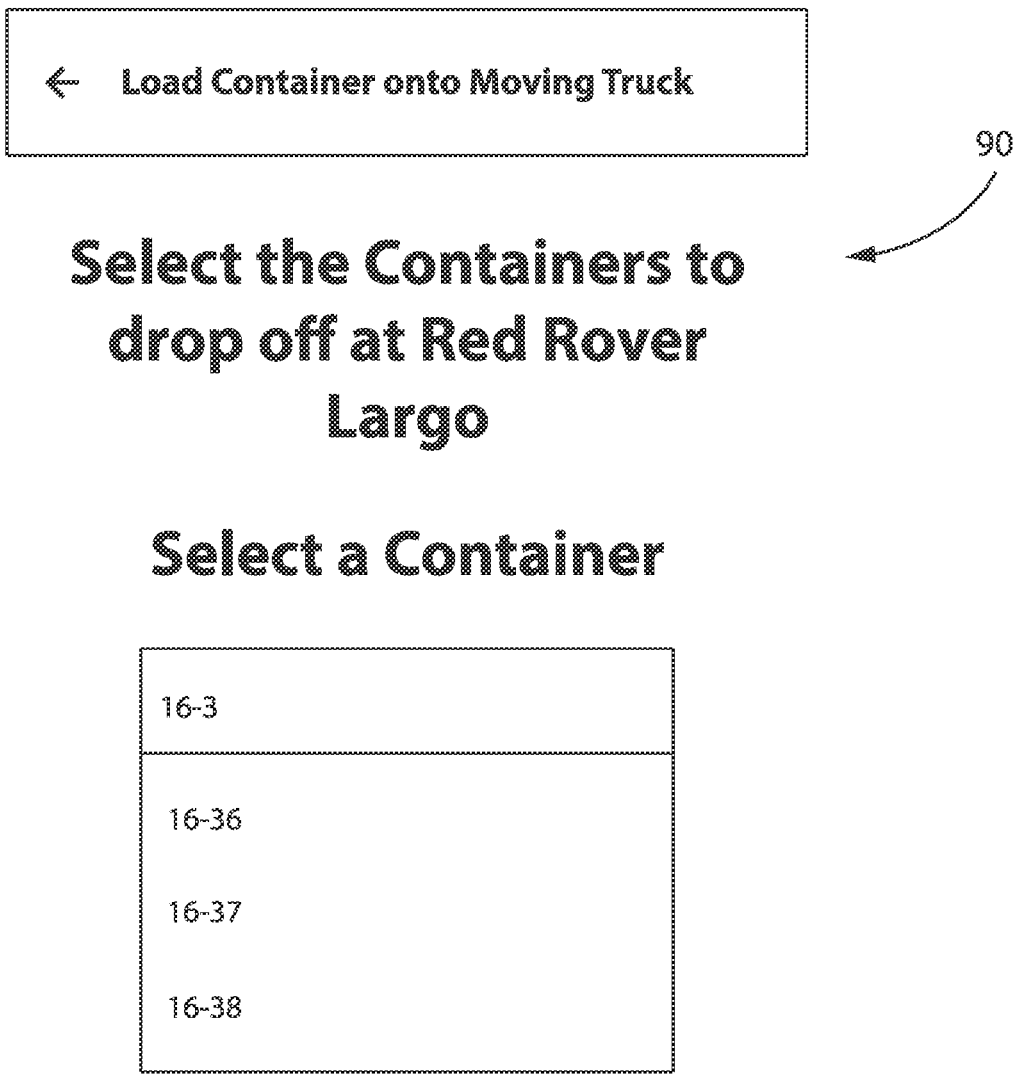
Figure 89:
Figure 91:
Figure 93:
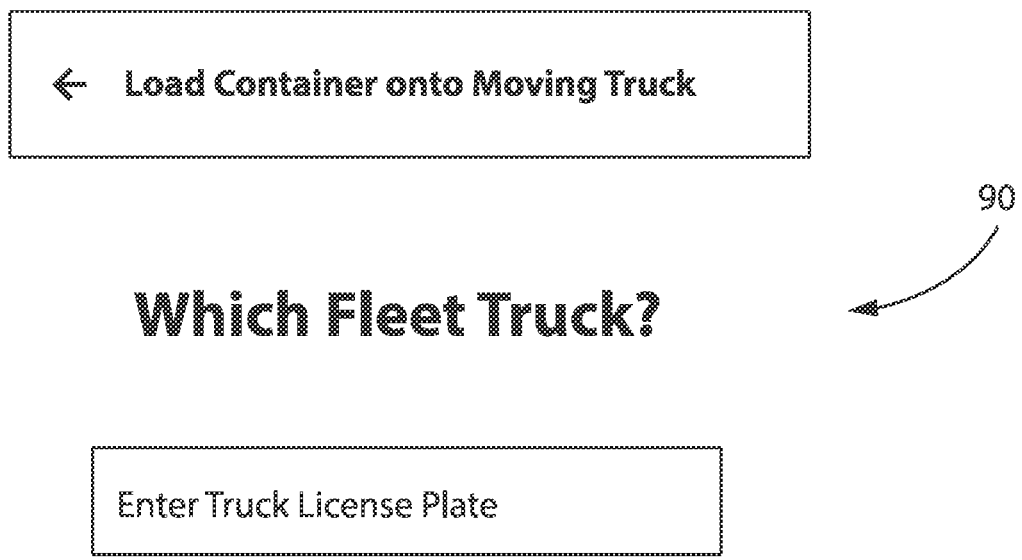
Figure 94:
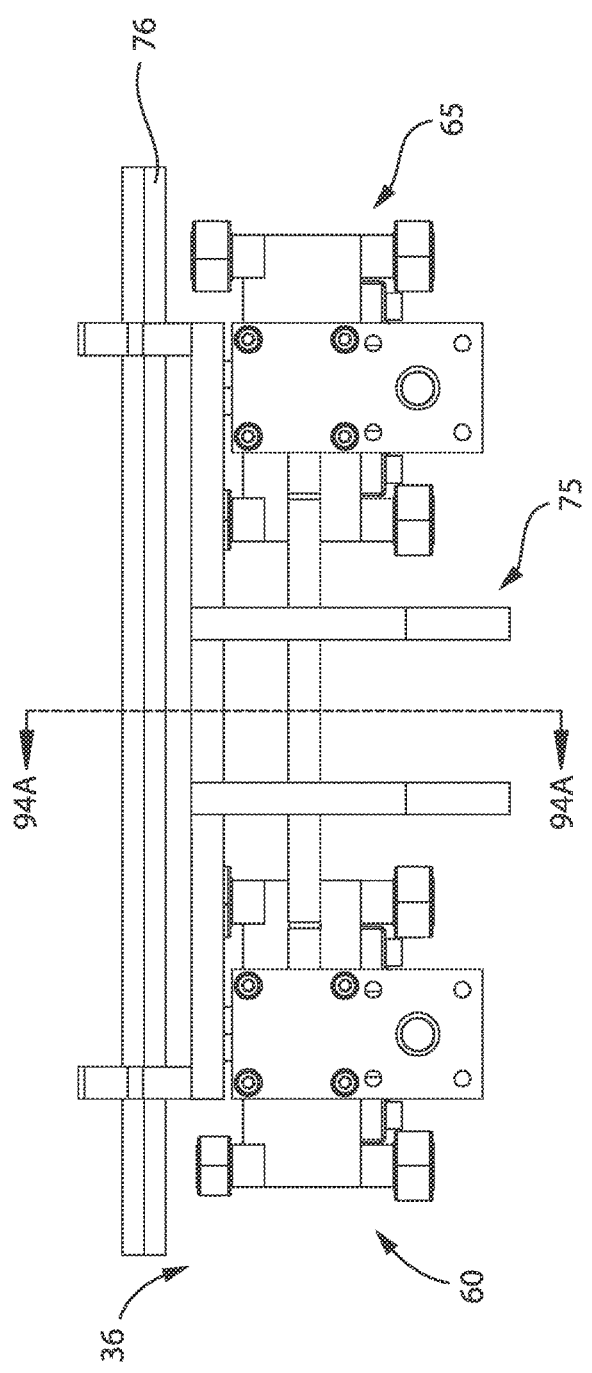
FIG. 94 is a front elevational view of the trolley, in accordance with a non-limiting exemplary embodiment of the present disclosure.
Figure 95:
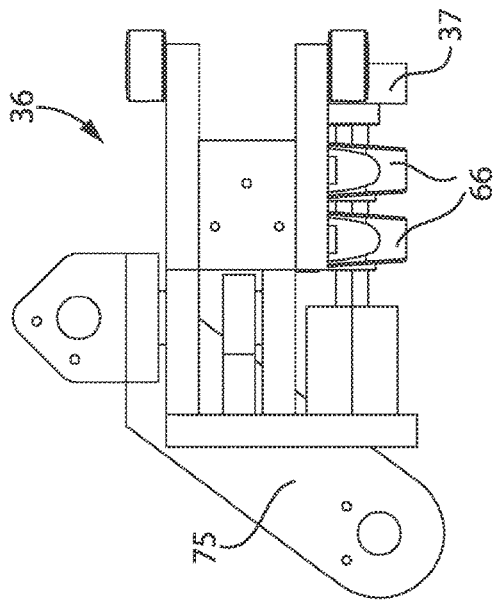
FIG. 95 is a side elevational view of the trolley shown in FIG. 94, in accordance with a non-limiting exemplary embodiment of the present disclosure.
Figure 94A:
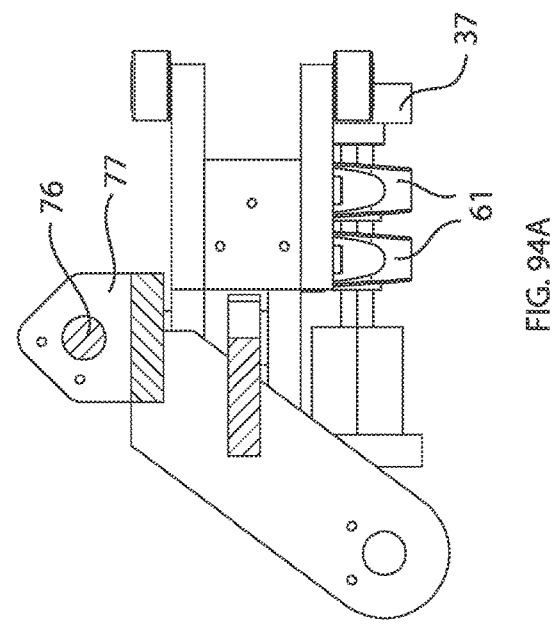
FIG. 94A is a cross-sectional view taken along line 94A-94A in FIG. 94, in accordance with a non-limiting exemplary embodiment of the present disclosure.

In a non-limiting exemplary embodiment, the controller 13 contains suitably circuitry, (e.g., 94 at FIG. 42), in communication with electronic equipment such motors, actuators, power sources, user interfaces, lights, alarms, cameras, transceivers, transducers, etc. thereby enabling a user to safely and succinctly operate the system 10. A housing 92 is provided with apertures 93 to pass through electrical wiring as needed. Transceiver 95 communicates operating parameters data to and from the controller 13.

In a non-limiting exemplary embodiment, ramp 11 may have a pivotal flap, bridge, or extension 81 for covering a gap (threshold) transition between the ramp 11 and cargo transport container 55.

Referring to FIGS. 99-101, in a non-limiting exemplary embodiment, an optional vertical ramp lifting mechanism 110 is illustrated, which can be attached to the guide rail 35 and/or linked to the trolley 36. Alternately, the vertical ramp lifting mechanism 110 may be independently operated, from the trolley 36, along guide rail 35. The vertical ramp lifting mechanism 110 may include an anchor plate 112 securely affixed to the vehicle 13 (via guide rail 35 and/or trolley 36) and preferably spaced from the cargo transport container 55. A rectilinear crossbar 113 is statically mated to the anchor plate 112 and has axially opposed ends positioned anterior of the anchor plate 12. The crossbar 113 has a longitudinal length at least as wide as the ramp 11. A pair of lift assemblies 114, 115 are operably connected to the axially opposed ends of the crossbar 113. Each of the lift assemblies 114, 115 may include an actuator 116 suitably sized and shaped to vertically lift a combined weight of the ramp 11 and cargo supported thereon. Suitable actuators 116 may include drive motors, worm gears, hydraulic pistons, pneumatic pistons, pulleys, beveled gears, and chains, for example. The specific configuration of the suitable actuators 116 is not intended to limit the true spirit and scope of the lift assemblies 114, 115. Notably, as the ramp 11 is vertically lifted, the bridge 81 automatically falls into place and covers the threshold transition between the ramp 11 and the cargo transport container 55.

The vertical ramp lifting mechanism 110 may be power operated via the same power source as the ramp deployment system 10 or may operate under a separate dedicated power source. Of course, the vertical ramp lifting mechanism 110 may be manually operated without the need to drive it via a power source.

In a non-limiting exemplary embodiment, the ramp 11 may be retrofitted with a conveyor belt mechanism 117 for easily and succinctly transporting cargo along a longitudinal length of the ramp 11. Such a conveyor belt mechanism 117 may operate by using two motorized pulleys that loop over a long stretch of thick, durable material. When motors in the pulleys operate at the same speed and spin in the same direction, the belt moves between the two. The conveyor belt mechanism 117 may be power operated via the same power source as the ramp deployment system 10 or may operate under a separate dedicated power source In a non-limiting exemplary embodiment, each of the vertical ramp lifting mechanism 110 and conveyor belt mechanism 117 may be operated via the controller 13 (e.g., software app) upon receiving a user input.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A cargo transport vehicle comprising:
   at least one cargo transport container;
   a ramp;
   a ramp deployment system operably coupled to said ramp and configured to selectively displace said ramp; and
   a trolley engaged with said ramp;
   wherein said trolley and said ramp are contemporaneously displaced along a curvilinear corner of said at least one cargo transport container,
   wherein said ramp deployment system is configured to selectively displace said ramp along:
      a first travel path defined along a perimeter of said at least one cargo transport container;
      a second travel path defined about a fulcrum pivot axis adjacent to said at least one cargo transport container, and
      a third travel path defined along a longitudinal length of said ramp and exterior of said at least one cargo transport container,
   wherein the cargo transport vehicle further comprises:
      a controller and a power source in communication with said ramp deployment system;
   wherein said ramp deployment system further comprises:
      a first ramp displacement mechanism configured to selectively displace said ramp from a first position to a second position defined along said first travel path,
      a second ramp displacement mechanism configured to selectively displace said ramp from one of said first position and said second position to a third position defined along said second travel path,
a third ramp displacement mechanism configured to selectively adjust a longitudinal length of said ramp along said third travel path while said ramp is disposed at said third position;
wherein each of said first ramp displacement mechanism, said second ramp displacement mechanism, and said third ramp displacement mechanism is operatively coupled to said controller and said power source,
wherein said second ramp displacement mechanism comprises:
a ramp pivot shaft pivotally coupled to said trolley;
a plurality of ramp pivot blocks engaged with said ramp pivot shaft;
a turn buckle operably coupled to a center link bracket; and
at least one actuator operably coupled to said turn buckle;
wherein said ramp is connected to said turn buckle and said ramp pivot shaft and rotates in clockwise and counterclockwise directions about said fulcrum pivot axis along said second travel path.

2. The cargo transport vehicle of claim 1, wherein said controller comprises:
a user interface;
a plurality of sensors operably coupled to the vehicle and said ramp, said sensors being configured to detect operating parameters at the vehicle and thereby generate and transmit corresponding notification signals to said controller;
wherein said controller is configured to enable and disable said user interface upon receiving a corresponding one of said notification signals, respectively, such that each of said first ramp displacement mechanism, said second ramp displacement mechanism, and said third ramp displacement mechanism are independently enabled and disabled, respectively.

3. The cargo transport vehicle of claim 1, wherein said power source is operably coupled to an existing power source of the vehicle such that said power source can be recharged as needed.

4. The cargo transport vehicle of claim 1, wherein said second ramp displacement mechanism includes an articulation mechanism operably coupled to said trolley and said ramp for selectively articulating said ramp between a vertically oriented raised position and a non-vertically oriented position defined below a horizontal position relative to said vertically oriented raised position.

5. The cargo transport vehicle of claim 1, wherein said ramp comprises: a female section and a male section slidably engaged therewith, said third ramp displacement mechanism including an actuator operably engaged with said female section and said male section and configured to selectively extend and retract the longitudinal length of said ramp.

6. The cargo transport vehicle of claim 1, wherein said first ramp displacement mechanism comprises:
a guide rail attached to at least a portion of a perimeter of the vehicle;
said trolley being operably attached to said ramp and having a plurality of rollers rotatably engaged with said guide rail; and
at least one drive motor operably coupled to said trolley and positioned along said guide rail;
wherein said at least one drive motor is configured to displace said trolley in a forward and opposed rearward direction along said guide rail;
wherein said guide rail includes an upper rail and a lower rail each operably coupled to said trolley.

7. The cargo transport vehicle of claim 1, wherein said third ramp displacement mechanism comprises:
a plurality of telescopically adjustable support legs attached to said ramp; and
a power-drive piston operably coupled to said telescopically adjustable support legs;
wherein said telescopically adjustable support legs are configured to selectively extend and retract a longitudinal length of said ramp along said third travel path upon receiving a user input at said controller.

* * * * *